(12) United States Patent
Kaneda et al.

(10) Patent No.: US 9,176,367 B2
(45) Date of Patent: Nov. 3, 2015

(54) ILLUMINATION DEVICE AND DISPLAY UNIT INCLUDING A LIGHT SOURCE SECTION, FIRST AND SECOND UNIFORMIZATION OPTICAL MEMBERS, AN OPTICAL DEVICE, AND A DRIVE SECTION

(71) Applicant: Sony Corporation, Tokyo (JP)

(72) Inventors: Kazumasa Kaneda, Kanagawa (JP); Koji Miura, Tokyo (JP); Toshifumi Yasui, Kanagawa (JP); Kazuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 13/851,649

(22) Filed: Mar. 27, 2013

(65) Prior Publication Data
US 2013/0258294 A1    Oct. 3, 2013

(30) Foreign Application Priority Data

Apr. 2, 2012   (JP) ................................. 2012-083559
Dec. 14, 2012  (JP) ................................. 2012-273305

(51) Int. Cl.
| | |
|---|---|
| *G03B 21/14* | (2006.01) |
| *H04N 5/74* | (2006.01) |
| *F21V 13/00* | (2006.01) |
| *G02B 27/10* | (2006.01) |
| *G03B 21/20* | (2006.01) |
| *G02B 27/48* | (2006.01) |
| *G02F 1/1335* | (2006.01) |
| *H04N 13/02* | (2006.01) |
| *H04N 9/31* | (2006.01) |
| *G02B 27/09* | (2006.01) |
| *G02B 3/00* | (2006.01) |

(52) U.S. Cl.
CPC ............ *G03B 21/2033* (2013.01); *F21V 13/00* (2013.01); *G02B 3/0062* (2013.01); *G02B 27/0905* (2013.01); *G02B 27/0927* (2013.01); *G02B 27/0933* (2013.01); *G02B 27/0961* (2013.01); *G02B 27/10* (2013.01); *G02B 27/48* (2013.01); *G02F 1/133526* (2013.01); *G03B 21/14* (2013.01); *G03B 21/208* (2013.01); *G03B 21/2053* (2013.01); *H04N 5/74* (2013.01); *H04N 9/315* (2013.01); *H04N 9/3152* (2013.01); *H04N 9/3161* (2013.01); *H04N 13/0232* (2013.01)

(58) Field of Classification Search
CPC .......... G03B 21/2033; G03B 21/2053; G03B 21/14; G03B 21/208; G02F 1/133526; H04N 13/0232; H04N 9/3161; H04N 9/3152; H04N 9/315; H04N 5/74; F21V 13/00; G02B 27/10; G02B 27/0905; G02B 27/0961; G02B 27/0927; G02B 3/0062; G02B 27/48; F21K 9/58
USPC ........................... 353/31, 38; 359/20; 349/62
See application file for complete search history.

(56) References Cited

U.S. PATENT DOCUMENTS

| 4,769,750 A | * | 9/1988 | Matsumoto et al. | .......... 362/268 |
| 6,563,567 B1 | * | 5/2003 | Komatsuda et al. | ............ 355/71 |
| 2010/0053565 A1 | * | 3/2010 | Mizushima et al. | ............ 353/38 |

FOREIGN PATENT DOCUMENTS

| JP | 2002-311382 | 10/2002 |
| JP | 2012-008549 | 1/2012 |

*Primary Examiner* — Toan Ton
*Assistant Examiner* — Magda Cruz
(74) *Attorney, Agent, or Firm* — K&L Gates LLP

(57) ABSTRACT

An illumination device includes: a light source section including a laser light source; a first uniformization optical member receiving light from the light source section; a second uniformization optical member receiving light from the first uniformization optical member; an optical device disposed on an optical path of outgoing light from the light source section; and a drive section vibrating the optical device.

25 Claims, 41 Drawing Sheets

COMBINATION OF L2a AND L2d
(ANGLE BETWEEN WAVEFRONTS: 6θ)

COMBINATION OF L2a AND L2c
(ANGLE BETWEEN WAVEFRONTS: 4θ)

COMBINATION OF L2b AND L2c
(ANGLE BETWEEN WAVEFRONTS: 2θ)

COMBINATION OF L2c AND L2d
(ANGLE BETWEEN WAVEFRONTS: 2θ)

| INTERFERENCE FRINGE PITCH CALCULATION EXAMPLE | Single EXAMPLE 1 (n=10) | Double EXAMPLE 1 | | Single EXAMPLE 2 (n=20) | Double EXAMPLE 2 | |
|---|---|---|---|---|---|---|
| | | FEL151 | FEL152 | | FEL151 | FEL152 |
| WAVELENGTH: $\lambda$ [nm] | 532 | 532 | 532 | 532 | 532 | 532 |
| EPD [mm] | 6 | 6 | 6 | 6 | 6 | 6 |
| FOCAL LENGTH OF CONDENSER LENS: fc [mm] | 12 | 18 | 12 | 18 | 24 | 18 |
| F-NUMBER: F | 2.0 | 3.0 | 2.0 | 3.0 | 4.0 | 3.0 |
| NA | 0.25 | 0.17 | 0.25 | 0.17 | 0.13 | 0.17 |
| UNIT CELL NUMBER OF FEL: n | 10 | 10 | 10 | 20 | 10 | 20 |
| UNIT CELL PITCH OF FEL: Pf [μm] | 600 | 600 | 600 | 300 | 600 | 300 |
| LENS MAGNIFICATION OF UNIT CELL OF FEL: M | 1 | 8.1 | 1 | 1 | 16.2 | 1 |
| SIZE OF REFLECTIVE LIQUID CRYSTAL DEVICE [inch] | 0.22 | 0.22 | 0.22 | 0.22 | 0.22 | 0.22 |
| INTERFERENCE FRINGE PITCH p (ON REFLECTIVE LIQUID CRYSTAL DEVICE) [μm] | 10.6 | 16.0 | 10.6 | 31.9 | 21.3 | 31.9 |
| INTERFERENCE FRINGE PITCH p (ON SCREEN) [mm] | 1.2 | 14.7 | 1.2 | 3.6 | 39.3 | 3.6 |

FIG. 12

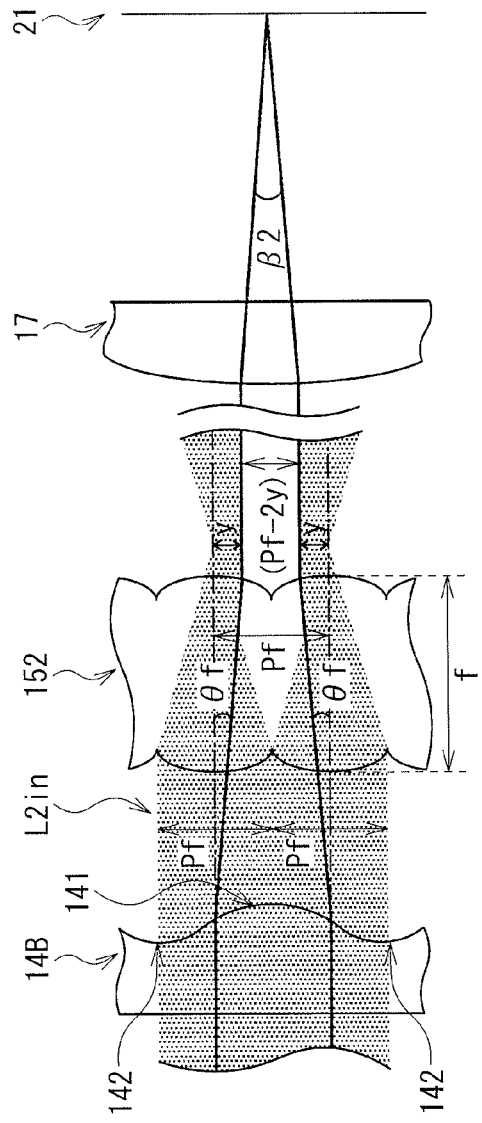
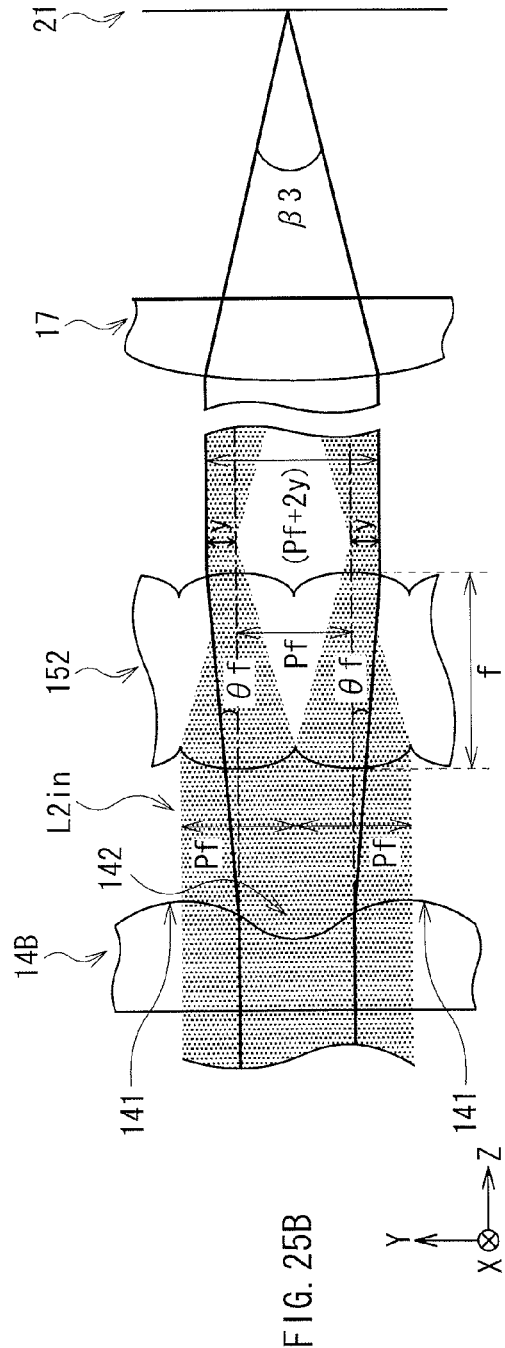
FIG. 25A
FIG. 25B

| RECEIVED LIGHT AMOUNT (LIGHT AMOUNT AT THE TIME OF EMISSION FROM LASER LIGHT SOURCE:100%) | GREEN LASER LIGHT (11G) | | | RED AND BLUE LASER LIGHT (11R, 11B) | | |
|---|---|---|---|---|---|---|
| | COMPARATIVE EXAMPLE 3 (FIG. 37) | EXAMPLE 1 (FIG. 36) | EXAMPLE 2 (FIG. 35) | COMPARATIVE EXAMPLE 3 (FIG. 37) | EXAMPLE 1 (FIG. 36) | EXAMPLE 2 (FIG. 35) |
| DIVERGENT ANGLE Max | 29.0% | 7.4% | 10.9% | 11.2% | 6.1% | 5.8% |
| DIVERGENT ANGLE Min | 73.7% | 7.6% | 11.2% | 21.8% | 6.8% | 5.6% |
| OPTICAL-AXIS INCLINATION | 30.1% | 7.6% | 10.7% | 22.3% | 6.5% | 5.4% |
| INTENSITY CENTER SHIFT | 7.9% | 8.1% | 11.1% | 20.2% | 6.9% | 5.6% |

FIG. 39

| FIGURE | KIND OF LASER LIGHT | STATE OF DIVERGENT ANGLE | OPTICAL-AXIS INCLINATION OCCURRED OR NOT | INTENSITY CENTER SHIFT OCCURRED OR NOT |
|---|---|---|---|---|
| FIG. 42 | GREEN LASER LIGHT | Max | NOT OCCURRED | NOT OCCURRED |
| FIG. 43 | GREEN LASER LIGHT | Min | NOT OCCURRED | NOT OCCURRED |
| FIG. 44 | GREEN LASER LIGHT | Min | OCCURRED (3.5°) | NOT OCCURRED |
| FIG. 45 | GREEN LASER LIGHT | Min | NOT OCCURRED | OCCURRED (2°) |
| FIG. 46 | RED AND BLUE LASER LIGHT | Max | NOT OCCURRED | NOT OCCURRED |
| FIG. 47 | RED AND BLUE LASER LIGHT | Min | NOT OCCURRED | NOT OCCURRED |
| FIG. 48 | RED AND BLUE LASER LIGHT | Min | OCCURRED (3.5°) | NOT OCCURRED |
| FIG. 49 | RED AND BLUE LASER LIGHT | Min | NOT OCCURRED | OCCURRED (5°) |

FIG. 41

| COMPARATIVE EXAMPLE 3 | EXAMPLE 1 | EXAMPLE 2 |
|---|---|---|
| (A) | (B) | (C) |
| (D) | (E) | (F) |

FIG. 44

| COMPARATIVE EXAMPLE 3 | EXAMPLE 1 | EXAMPLE 2 |
|---|---|---|
| (A) | (B) | (C) |
| (D) | (E) | (F) |

FIG. 45

ILLUMINATION DEVICE AND DISPLAY UNIT INCLUDING A LIGHT SOURCE SECTION, FIRST AND SECOND UNIFORMIZATION OPTICAL MEMBERS, AN OPTICAL DEVICE, AND A DRIVE SECTION

CROSS REFERENCES TO RELATED APPLICATIONS

The present application claims priority to Japanese Priority Patent Application JP 2012-083559 filed in the Japan Patent Office on Apr. 2, 2012, and JP 2012-273305 filed in the Japan Patent Office on Dec. 14, 2012, the entire content of which is hereby incorporated by reference.

BACKGROUND

The present disclosure relates to an illumination device emitting light including laser light, and a display unit displaying an image with use of such an illumination device.

A typical optical module, which is one of major components in a projector (a projection display unit), is configured of an illumination optical system (an illumination device) including a light source, and a projection optical system including a light modulation device. In the field of such a projector, a small-sized (a palm-sized) lightweight portable projector called "microprojector" has recently become widespread. A typical microprojector mainly uses an LED (Light Emitting Diode) as the light source of the illumination device.

On the other hand, a laser is recently attracting an attention as a new light source of the illumination device. For example, following commercialization of high-power blue laser diodes and high-power red laser diodes, green laser diodes are being developed, and are nearing practical use. Based on such a background, there is proposed a projector using single-color lasers (laser diodes) of three primary colors of red (R), green (G), and blue (B) as light sources of an illumination device. With use of the single-color lasers as the light sources, a projector having a wide color reproduction range and low power consumption is obtainable.

Moreover, in such a projector, to uniformize a light amount (intensity) of illumination light emitted from an illumination device, the illumination device typically includes a predetermined uniformization optical system (a uniformization optical member). For example, in Japanese Unexamined Patent Application Publication Nos. 2002-311382 and 2012-8549, two (a pair of) fly-eye lenses are included as such a uniformization optical member.

SUMMARY

In such a projector, a reduction in luminance unevenness (illumination unevenness) in illumination light emitted from the illumination device and an improvement in display image quality are typically desired.

It is desirable to provide an illumination device and a display unit which are capable of reducing luminance unevenness in illumination light.

According to an embodiment of the disclosure, there is provided an illumination device including: a light source section including a laser light source; a first uniformization optical member receiving light from the light source section; a second uniformization optical member receiving light from the first uniformization optical member; an optical device disposed on an optical path of outgoing light from the light source section; and a drive section vibrating the optical device.

According to an embodiment of the disclosure, there is provided a display unit including: an illumination device emitting illumination light; and a light modulation device modulating the illumination light, based on an image signal, in which the illumination device includes a light source section including a laser light source, a first uniformization optical member receiving light from the light source section, a second uniformization optical member receiving light from the first uniformization optical member, an optical device disposed on an optical path of outgoing light from the light source section, and a drive section vibrating the optical device.

In the illumination device and the display unit according to the embodiments of the disclosure, light from the light source section passes through the first uniformization optical member and the second uniformization optical member in this order to allow a light amount of the light to be uniformized, and the light is emitted as illumination light. At this time, since the optical device disposed on the optical path is so driven as to vibrate, even if interference fringes are produced in illumination light by the first and second uniformization optical members, the interference fringes are moved with time to average brightness thereof.

In the illumination device and the display unit according to the embodiments of the disclosure, the optical device disposed on the optical path vibrates; therefore, even if interference fringes are produced in illumination light by the first and second uniformization optical members, the interference fringes are moved with time to allow brightness thereof to be averaged. Accordingly, such interference fringes become less visible, and a reduction in luminance unevenness in illumination light (an improvement in display image quality) is achievable.

Additional features and advantages are described herein, and will be apparent from the following Detailed Description and the figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIG. 12 is a diagram illustrating calculation examples of the interference fringe pitch and the like.

FIGS. 25A and 25B are schematic views for describing incident light onto a fly-eye lens disposed in a following stage in the case where the optical device illustrated in FIG. 22 is included.

FIG. 39 is a diagram illustrating, in tabular form, examples of received light amounts when various optical parameters varied in Examples 1 and 2 and Comparative Example 3 in the fifth embodiment.

FIG. 41 is a diagram illustrating, in tabular form, setting conditions of optical parameters in respective examples and the like illustrated in FIGS. 42 to 49.

Figures 44, 45:
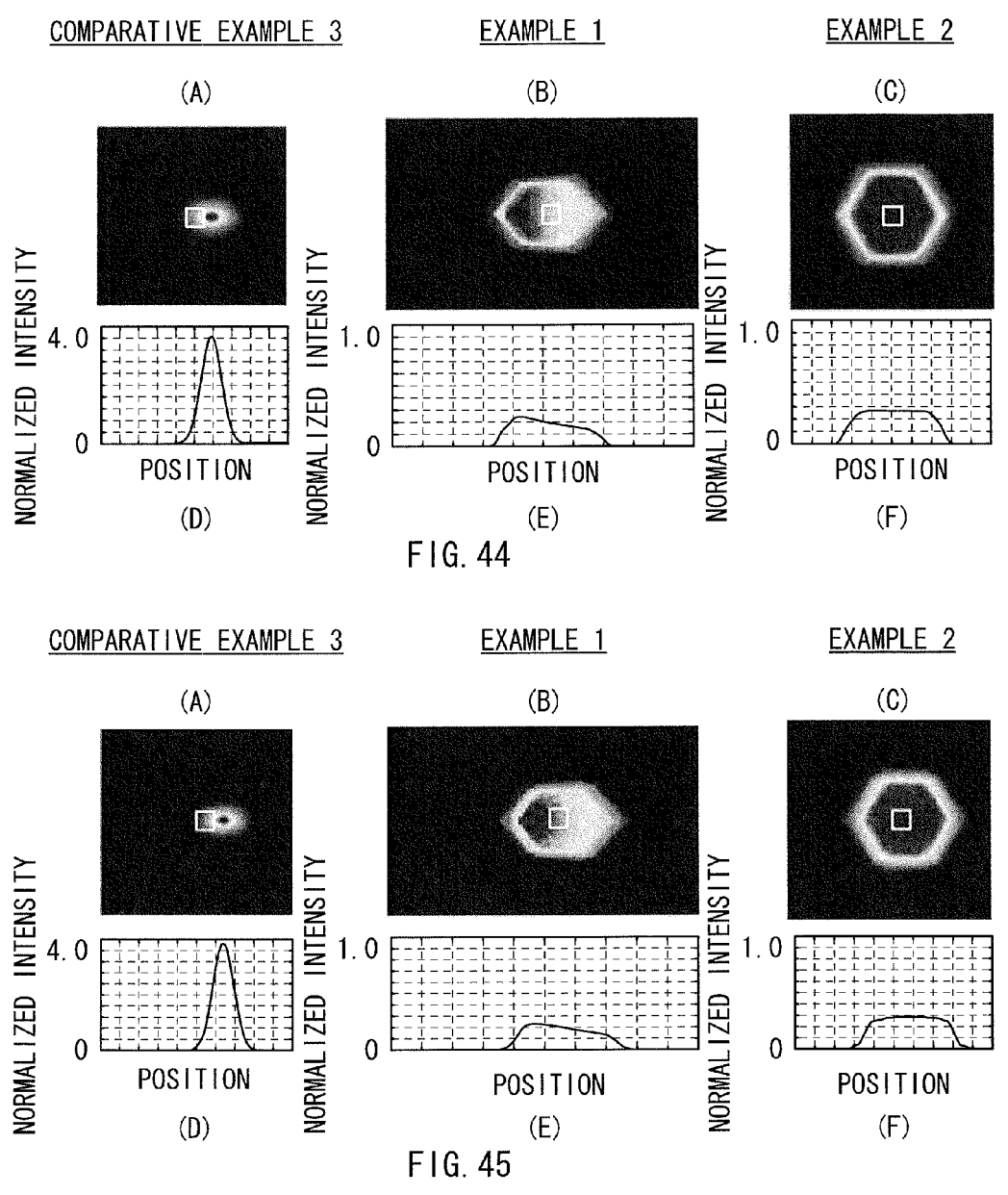

FIG. 44 is a diagram illustrating still other examples of the received light amount distributions of Examples 1 and 2 and Comparative Example 3.

FIG. 45 is diagram illustrating further examples of the received light amount distributions of Examples 1 and 2 and Comparative Example 3.

DETAILED DESCRIPTION

Embodiments of the disclosure will be described in detail below referring to the accompanying drawings. It is to be noted that description will be given in the following order.

1. First Embodiment (An example in which an optical device is vibrated to suppress interference fringes caused by a uniformization optical member)

2. Modification 1 (An example in which the optical device is configured of a prism array)

3. Second Embodiment (An example in which an optical surface of an optical device extends obliquely with respect to an arrangement direction of unit cells)

4. Modifications 2 to 5 (Other arrangement examples of the optical device)

5. Third Embodiment (An example in which a conditional expression is established for both an optical device and a uniformization optical member disposed in a stage following the optical device)

6. Fourth Embodiment (An example in which a shape of a unit cell in a uniformization optical member disposed in a following stage is determined)

7. Modifications 6 to 8 (Other shape examples of the unit cell in the uniformization optical member disposed in the following stage)

8. Fifth Embodiment (An example in which a light-receiving device is disposed in a stage following a uniformization optical member disposed in a preceding stage)

9. Other Modifications

First Embodiment

[Configuration of Display Unit 3]

Figure 1:
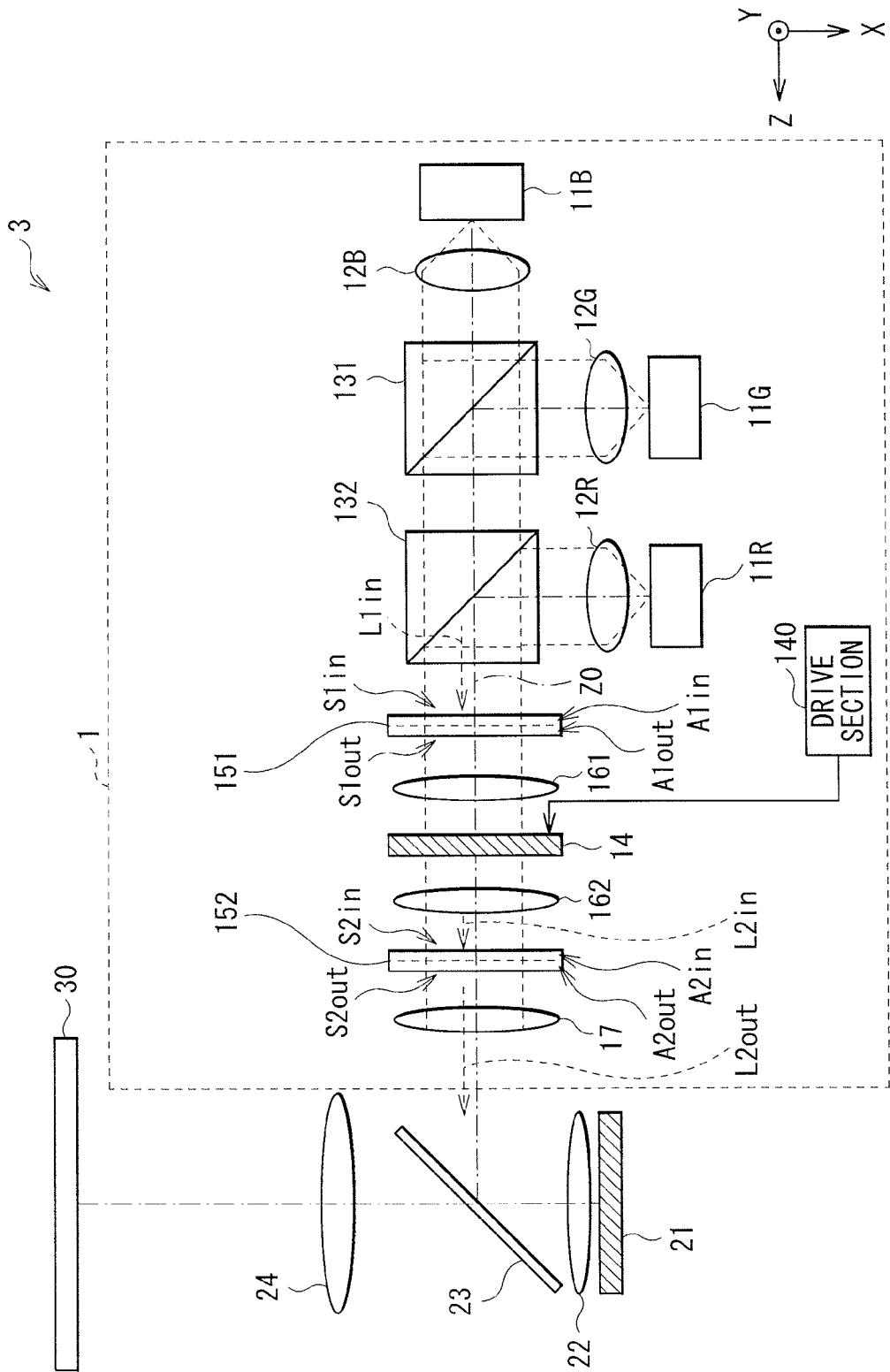
FIG. 1 is a schematic view illustrating an entire configuration example of a display unit according to a first embodiment of the disclosure.

FIG. 1 illustrates an entire configuration of a display unit (a display unit 3) according to a first embodiment of the disclosure. The display unit 3 is a projection display unit which projects an image (image light) onto a screen 30 (a projection surface). The display unit 3 includes an illumination device 1 and an optical system (a display optical system) for displaying an image with use of illumination light emitted from the illumination device 1.

(Illumination Device 1)

The illumination device 1 includes a red laser 11R, a green laser 11G, a blue laser 11B, coupling lenses 12R, 12G, and 12B, dichroic prisms 131 and 132, an optical device 14, a drive section 140, fly-eye lenses 151 and 152, sub-condenser lenses 161 and 162, and a condenser lens 17. It is to be noted that Z0 illustrated in the drawing represents an optical axis.

The red laser 11R, the green laser 11G, and the blue laser 11B are three kinds of light sources emitting red laser light, green laser light, and blue laser light, respectively. A light source section is configured of these laser light sources, and each of these three kinds of light sources in this case is a laser light source. Each of the red laser 11R, the green laser 11G, and the blue laser 11B performs, for example, pulse light emission. In other words, each of them intermittently (discontinuously) emits laser light with use of, for example, a predetermined light emission frequency (light emission cycle). Each of the red laser 11R, the green laser 11G, and the blue laser 11B is configured of, for example, a laser diode or a solid laser. It is to be noted that, in the case where each of these laser light sources is a laser diode, a wavelength $\lambda r$ of the red laser light is about 600 nm to 700 nm, a wavelength $\lambda g$ of the green laser light is about 500 nm to 600 nm, and a wavelength $\lambda b$ of the blue laser light is about 400 nm to 500 nm.

Figure 2A:
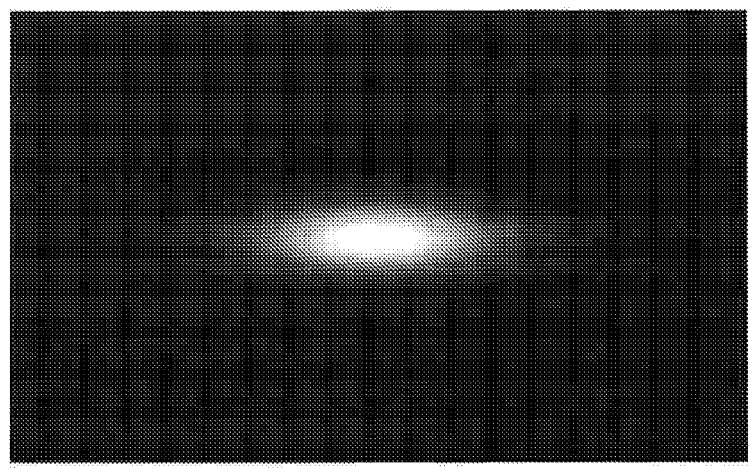
FIGS. 2A and 2B are diagrams illustrating an example of a light amount distribution in laser light.
Figure 2B:
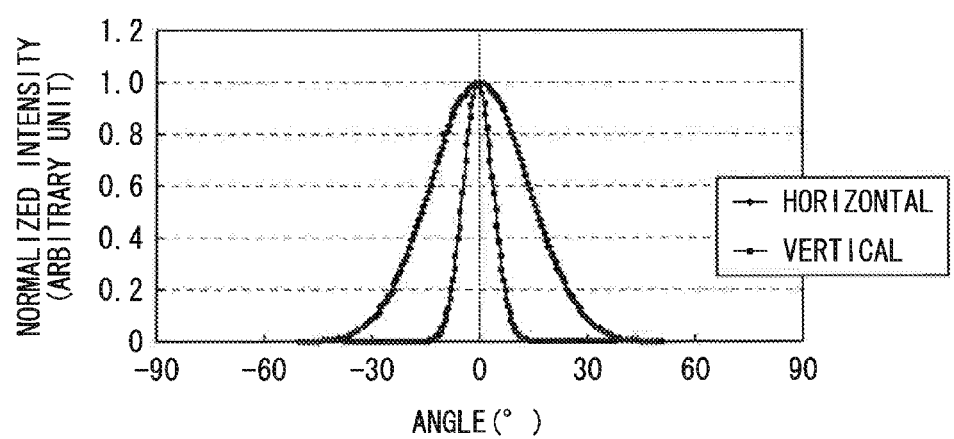

Moreover, laser light emitted from these laser light sources is generated through entering exciting light into a laser medium made of a laser crystal. In this case, an intensity distribution (a light amount distribution, an FFP (Far Field Pattern)) of the laser light is determined by a distribution of atoms or molecules of the laser crystal as the laser medium and the size of the crystal. For example, as illustrated in FIGS. 2A and 2B, an ideal light amount distribution (profile) of laser light generated is nearly a Gaussian distribution. It is to be noted that, "horizontal" and "vertical" in FIG. 2B refer to light amount distributions along a horizontal direction (in this case, an X-axis direction) and a vertical direction (in this case, a Y-axis direction), respectively.

The coupling lens 12G is a lens (a coupling lens) for collimating green laser light emitted from the green laser 11G (into parallel light) to couple the collimated green laser light to the dichroic prism 131. Likewise, the coupling lens 12B is a lens (a coupling lens) for collimating blue laser light emitted from the blue laser 11B to couple the collimated blue laser light to the dichroic prism 131. Moreover, the coupling lens 12R is a lens (a coupling lens) for collimating red laser light emitted from the red laser 11R to couple the collimated red laser light to the dichroic prism 132. It is to be noted that each of these coupling lenses 12R, 12G, and 12B in this case collimates laser light incident thereon (into parallel light), but this is not limitative, and the laser light may not be collimated (into parallel light) by the coupling lenses 12R, 12G, and 12B. However, it is more preferable to collimate the laser light in the above-described manner, because downsizing of a unit configuration is achievable.

The dichroic prism 131 selectively allows the blue laser light incident thereon through the coupling lens 12B to pass therethrough and selectively reflects the green laser light incident thereon through the coupling lens 12G. The dichroic prism 132 selectively allows the blue laser light and the green laser light emitted from the dichroic prism 131 to pass therethrough and selectively reflects the red laser light incident thereon through the coupling lens 12R. Thus, color synthesis (optical path synthesis) of the red laser light, the green laser light, and the blue laser light is performed.

The optical device 14 is a device disposed on an optical path of outgoing light (laser light) from the above-described light source section. In this case, the optical device 14 is disposed on an optical path between two fly-eye lenses 151 and 152 (more specifically, between a pair of sub-condenser lenses 161 and 162). The optical device 14 is an optical device for reducing so-called speckle noise and interference fringes which will be described later in illumination light, and allows laser light traveling along the above-described optical path to passes therethrough.

The drive section 140 drives the optical device 14. More specifically, the drive section 140 has a function of vibrating (micro-vibrating) the optical device 14 (for example, vibrating the optical device 14 in a direction along the optical axis Z0 or a direction perpendicular to the optical axis Z0). As will be described in detail later, this function changes the state of a light flux passing through the optical device 14 to reduce speckle noise and interference fringes. It is to be noted that such a drive section 140 includes, for example, a coil and a permanent magnet (for example, a permanent magnet made of neodymium (Nd), iron (Fe), boron (B), or the like).

Figure 3A:
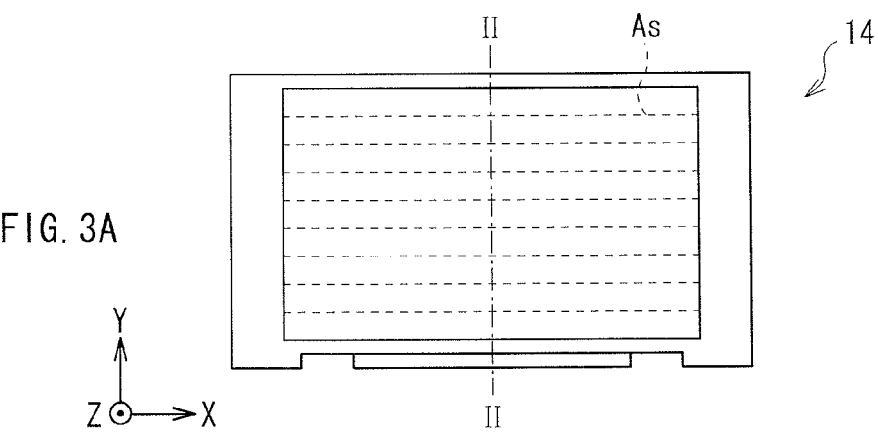
FIGS. 3A to 3C are schematic views illustrating a configuration example of an optical device illustrated in FIG. 1.
Figure 3B:
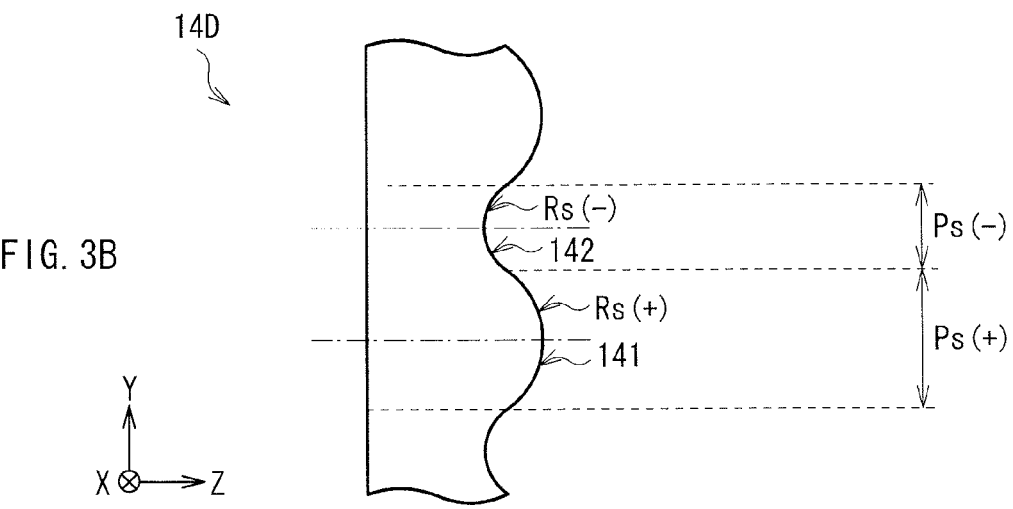
Figure 3C:
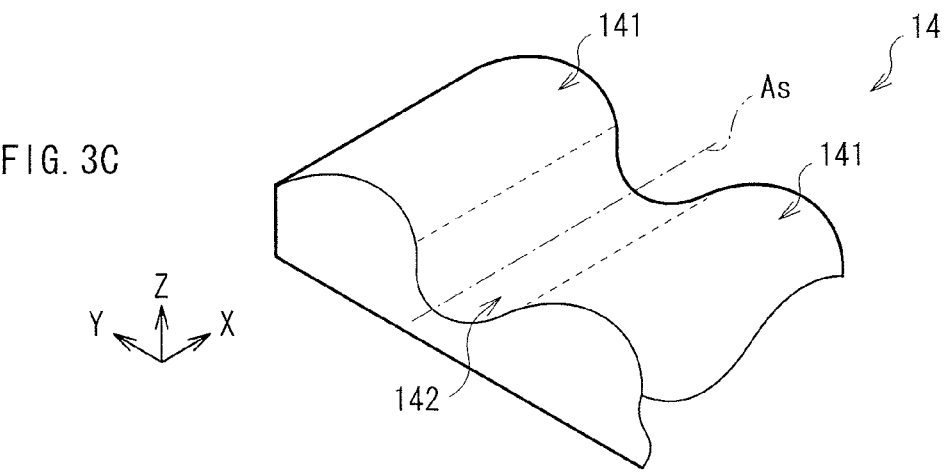

FIGS. 3A to 3C schematically illustrate a configuration example of the optical device 14. The optical device 14 has a concavo-convex surface with a periodic corrugated shape on a light-exit surface thereof. FIG. 3A illustrates an X-Y planar configuration example of the optical device 14, and FIG. 3B illustrates a sectional configuration example taken along a line II-II of FIG. 3A.

As illustrated in FIG. 3B, the optical device 14 has, on the light-exit surface thereof, a configuration in which first optical surfaces 141 with a convex-curved shape and second optical surfaces 142 with a concave-curved shape are alternately arranged (one-dimensionally arranged). It is to be noted that, here, a pitch and a curvature radius of the first optical surface 141 are Ps(+) and Rs(+), respectively, and a pitch and a curvature radius of the second optical surface 142 are Ps(−) and Rs(−), respectively. In this example, the pitch Ps(+) of the first optical surface 141 and the pitch Ps(−) of the second optical surface 142 are different from each other (in this case, Ps(+)>Ps(−)).

In the optical device 14, these first optical surfaces 141 and these second optical surfaces 142 extend along the X-axis direction. In other words, extending directions of the first optical surfaces 141 and the second optical surfaces 142 and an arrangement direction of unit cells in each of the fly-eye lenses 151 and 152 which will be described later coincide with each other. It is to be noted that the extending directions of the first optical surfaces 141 and the second optical surfaces 142 correspond to an optical-surface-extending axis (a cylinder axis) As illustrated in FIGS. 3A and 3C.

Figure 4:
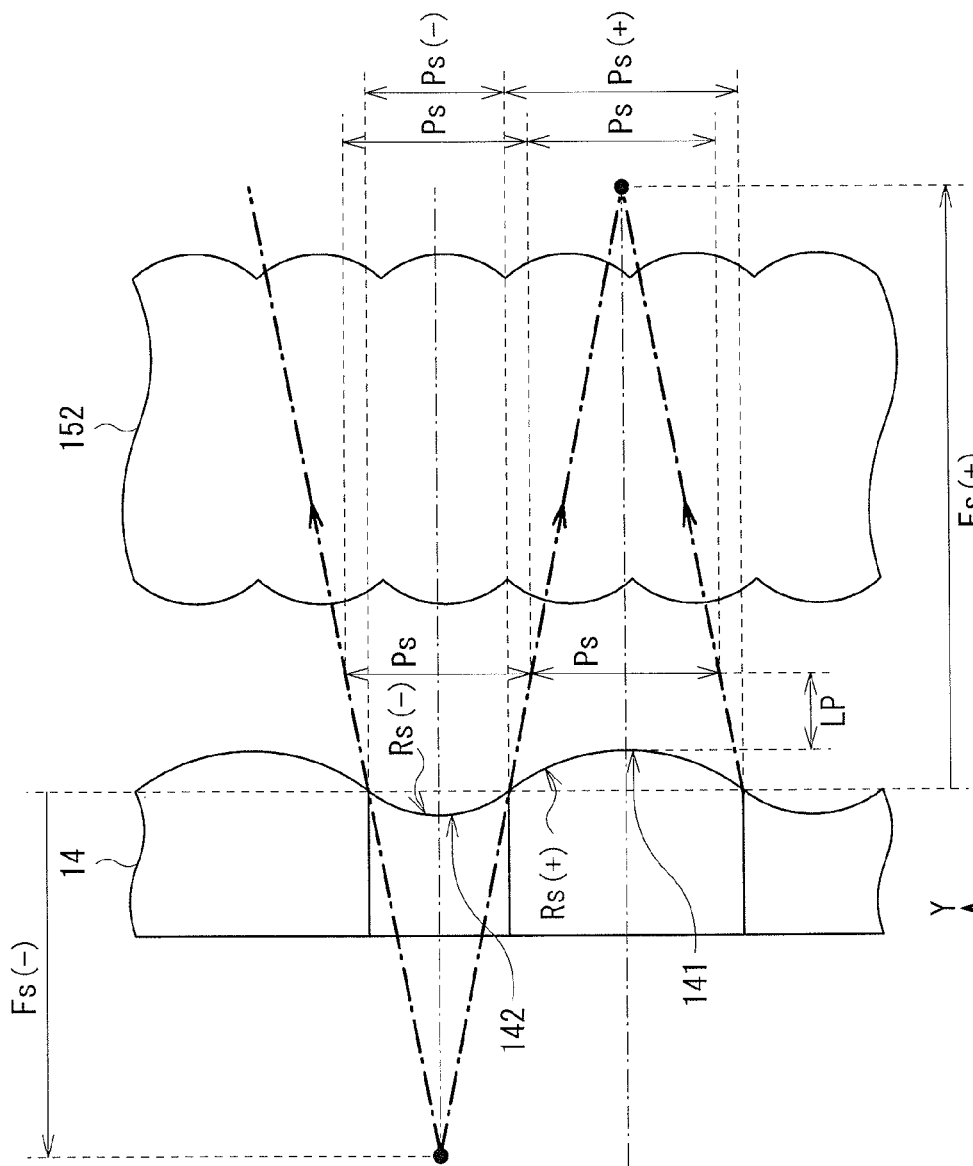
FIG. 4 is a schematic view illustrating a specific configuration example of the optical device illustrated in FIGS. 3A to 3C.

For example, as schematically illustrated in FIG. 4, the first optical surfaces 141 have a function of emitting laser light incident thereon while converging the laser light, whereas the second optical surfaces 142 have a function of emitting laser light incident thereon while diverging the laser light. In the optical device 14, these first optical surfaces 141 and the second optical surfaces 142 are so connected to one another smoothly as to allow an optical path of convergent light emitted from the first optical surfaces 141 and an optical path of divergent light emitted from the second optical surfaces 142 to continuously (sparsely and densely) vary. It is to be noted that, in FIG. 4, Fs(+) denotes a focal length in the first optical surface 141, and Fs(−) denotes a focal length in the second optical surface 142. Moreover, LP denotes a distance between a plane where a light flux width of convergent light emitted from the first optical surface 141 and a light flux width of divergent light emitted from the second optical surface 142 become equal to each other (both the light flux widths of the convergent light and the divergent light become equal to a pitch Ps) and the optical device 14.

The fly-eye lenses 151 and 152 are optical members (integrators) each configured of a plurality of lenses (unit cells which will be described later) which are two-dimensionally arranged on a substrate. Each of the fly-eye lenses 151 and 152 spatially divides an incident light flux into a plurality of light fluxes according to the arrangement of these lenses to emit the light fluxes. The fly-eye lens 151 is a fly-eye lens disposed in a preceding stage in relation to the above-described light source section. In this case, the fly-eye lens 151 is disposed on an optical path between the dichroic prism 132 and the optical device 14. The fly-eye lens 152 is a fly-eye lens disposed in a following stage. In this case, the fly-eye lens 152 is disposed on an optical path between the optical device 14 and the condenser lens 17. Each of these fly-eye lenses 151 and 152 emits the divided light fluxes while superimposing the divided light fluxes on one another. Thus, outgoing light Lout2 from the fly-eye lens 152 is uniformized (an in-plane light amount distribution is uniformized), and the uniformized light is emitted as illumination light. It is to be noted that, in the fly-eye lenses 151 and 152, obliquely incident light is efficiently used as illumination light; therefore, as will be described later, unit cells (unit lenses having a predetermined curvature) are formed not only on a light-incident surface of each of the fly-eye lenses 151 and 152 but also on a light-exit surface of each of the fly-eye lenses 151 and 152.

In this case, the fly-eye lens 151 includes an incident-side array A1in, which is configured of a plurality of unit cells arranged on a light-incident surface S1in thereof where incident light L1in enters from the above-described light source section. Moreover, in addition to the incident-side array A1in, the fly-eye lens 151 includes an exit-side array A1out, which is configured of a plurality of unit cells arranged on a light-exit surface S1out thereof where outgoing light exits.

Figure 5A:
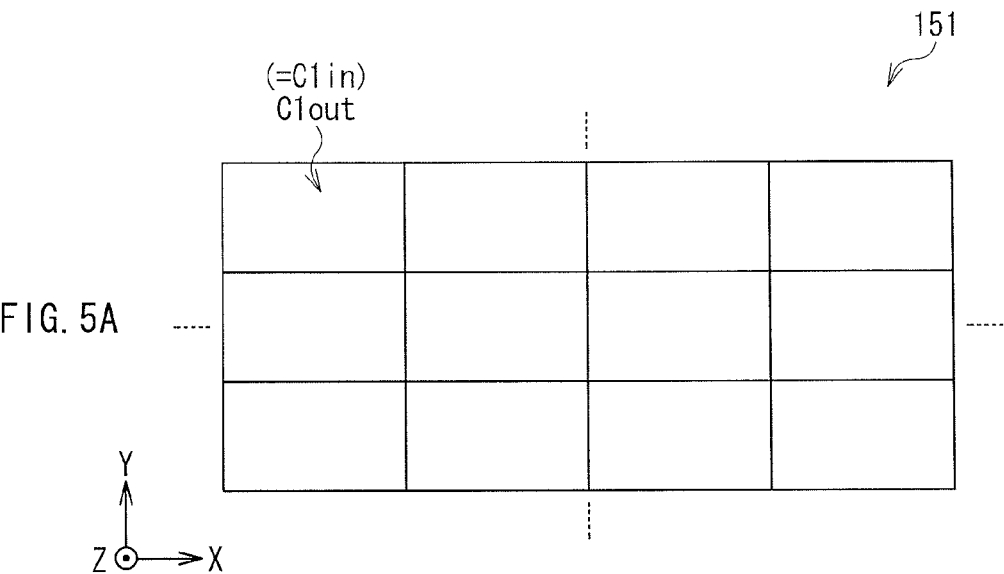
FIGS. 5A and 5B are schematic views illustrating configuration examples of two fly-eye lenses illustrated in FIG. 1.

More specifically, for example, as illustrated in FIG. 5A, the fly-eye lens 151 includes a plurality of incident-side unit cells C1in on the light-incident surface S1in thereof and a plurality of exit-side unit cells C1out on the light-exit surface S1out thereof. In this case, the incident-side unit cells C1in and the exit-side unit cells C1out are common to each other (are formed in common with each other). In other words, one incident-side unit cell C1in and one exit-side unit cell C1out configures one common unit cell.

In the fly-eye lens 151, such a plurality of common unit cells (the incident-side unit cells C1in and the exit-side unit cells C1out) are arranged along both an X-axis direction (a first direction, in this case, a horizontal direction) and a Y-axis direction (a second direction, in this case, a vertical direction). In other words, the incident-side unit cells C1in and the exit-side unit cells C1out are two-dimensionally arranged without space (in this case, in a matrix form) on X-Y planes (the light-incident surface S1in and the light-exit surface S1out, respectively). Moreover, each of the common unit cells (the incident-side unit cells C1in and the exit-side unit cells C1out) has an anisotropic shape (in this case, a rectangular shape) having a major-axis direction along the X-axis direction and a minor-axis direction along the Y-axis direction. Then, an aspect ratio (a ratio of a length in the major-axis direction to a length in the minor-axis direction) in the anisotropic shape (the rectangular shape) is adjusted to be substantially equal (preferably equal) to an aspect ratio in a reflective liquid crystal device 21 which will be described later.

On the other hand, the fly-eye lens 152 includes an incident-side array A2in, which is configured of a plurality of unit cells arranged on a light-incident surface S2in thereof where the incident light L2in enters from the fly-eye lens 151. Moreover, in addition to the incident-side array A2in, the fly-eye lens 15 includes an exit-side array A2out, which is configured of a plurality of unit cells arranged on a light-exit surface S2out thereof where outgoing light exits.

Figure 5B:
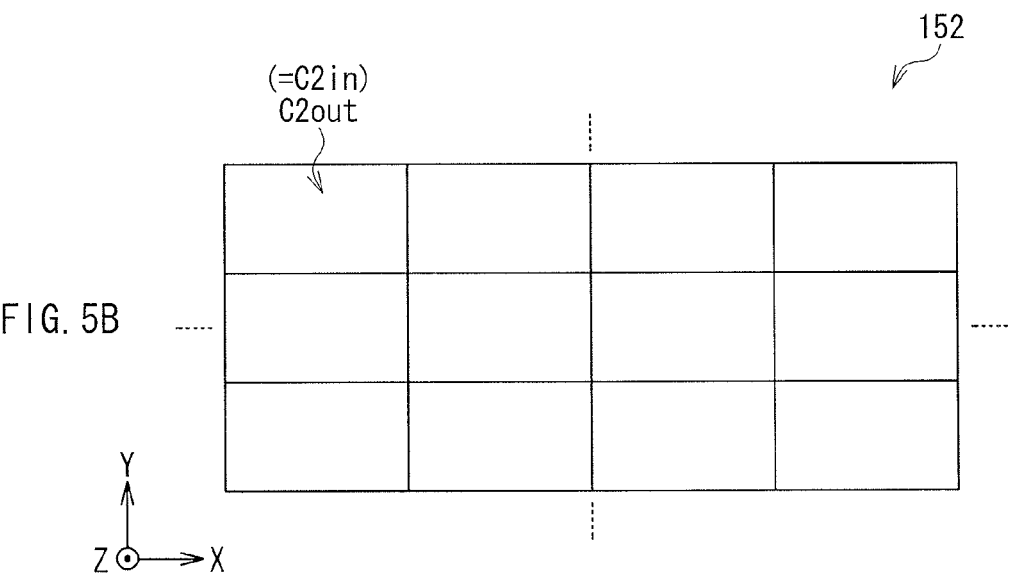

More specifically, for example, as illustrated in FIG. 5B, the fly-eye lens 152 includes a plurality of incident-side unit cells C2in on the light-incident surface S2in thereof and a plurality of exit-side unit cells C2out on the light-exit surface S2out thereof. In this case, as with the fly-eye lens 151, the incident-side unit cells C2in and the exit-side unit cells C2out are common to each other (are formed in common with each other). In other words, one incident-side unit cell C2in and one exit-side unit cell C2out configures one common unit cell.

In the fly-eye lens 152, such a plurality of common unit cells (the incident-side unit cells C2in and the exit-side unit cells C2out) are arranged along both the X-axis direction (in this case, the horizontal direction) and the Y-axis direction (in this case, the vertical direction). In other words, the incident-side unit cells C2in and the exit-side unit cells C2out are two-dimensionally arranged without space (in this case, in a matrix form) on X-Y planes (the light-incident surface S2in and the light-exit surface S2out, respectively). Moreover, each of the common unit cells (the incident-side unit cells C2in and the exit-side unit cells C2out) has an anisotropic shape (in this case, a rectangular shape) having a major-axis direction along the X-axis direction and a minor-axis direction along the Y-axis direction. Then, an aspect ratio (a ratio of a length in the major-axis direction to a length in the minor-axis direction) in the anisotropic shape (the rectangular shape) is adjusted to be substantially equal (preferably equal) to an aspect ratio in the reflective liquid crystal device 21 which will be described later.

It is to be noted that the fly-eye lens 151 corresponds to a specific example of a "first uniformization optical member" in the disclosure, and the fly-eye lens 152 corresponds to a specific example of a "second uniformization optical member" in the disclosure.

Each of the sub-condenser lenses 161 and 162 is disposed on an optical path between the two fly-eye lenses 151 and 152 (the sub-condenser lens 161 is disposed closer to the fly-eye lens 151 and the sub-condenser lens 162 is disposed closer to the fly-eye lens 152). Each of the sub-condenser lenses 161 and 162 is a lens having positive power, and configures a relay optical system. More specifically, the sub-condenser lens 161 is a lens for condensing outgoing light from the fly-eye lens 151 to allow the condensed outgoing light to enter the optical device 14. Likewise, the sub-condenser lens 162 is a lens for condensing outgoing light from the optical device 14 to allow the condensed outgoing light to enter the fly-eye lens 152. It is to be noted that the sub-condenser lenses 161 and 162 correspond to a specific example of a "pair of lenses" in the disclosure.

The condenser lens 17 is a lens for condensing outgoing light L2out from the fly-eye lens 152 to emit the condensed outgoing light L2out as illumination light.

(Display optical system)

The above-described display optical system is configured of a polarization beam splitter (PBS) 23, a field lens 22, the reflective liquid crystal device 21, and a projection lens 24 (a projection optical system).

The polarization beam splitter 23 is an optical member selectively allowing specific polarized light (for example, p-polarized light) to pass therethrough and selectively reflecting the other polarized light (for example, s-polarized light). Illumination light (for example, s-polarized light) emitted from the illumination device 1 is selectively reflected by the polarization beam splitter 23 to enter the reflective liquid crystal device 21, and image light (for example, p-polarized light) emitted from the reflective liquid crystal device 21 selectively passes through the polarization beam splitter 23 to enter the projection lens 24.

The field lens 22 is disposed on an optical path between the polarization beam splitter 23 and the reflective liquid crystal device 21. The field lens 22 is a lens for downsizing the optical system through allowing illumination light to telecentrically enter the reflective liquid crystal device 21.

The reflective liquid crystal device 21 is a light modulation device reflecting illumination light from the illumination device 1 while modulating the illumination light based on an image signal supplied from a display control section (not illustrated) to emit image light. At this time, the reflective liquid crystal device 21 reflects light to allow light incident thereon and light exiting therefrom to have different polarization states (for example, s-polarization and p-polarization). The reflective liquid crystal device 21 is configured of, for example, a liquid crystal device such as an LCOS (Liquid Crystal On Silicon).

The projection lens 24 is a lens for projecting (projecting in a magnified form), onto the screen 30, the illumination light (the image light) modulated by the reflective liquid crystal device 21.

[Functions and effects of display unit 3]

(1. Display operation)

In the display unit 3, as illustrated in FIG. 1, first, in the illumination device 1, light (laser light) emitted from the red laser 11R, the green laser 11G, and the blue laser 11B is collimated by the collimator lenses 12R, 12G, and 12B into parallel light, respectively. Next, the dichroic prisms 131 and 132 perform color synthesis (optical path synthesis) of the laser light (the red laser light, the green laser light, and the blue laser light) which is converted into the parallel light in the above-described manner. Each laser light subjected to the optical path synthesis passes through the fly-eye lens 151, the sub-condenser lens 161, the optical device 14, the sub-condenser lens 162, the fly-eye lens 152, and the condense lens 17 in this order to exit as illumination light from the illumination device 1. At this time, the outgoing light L2out from the fly-eye lens 152 is uniformized (the in-plane light amount distribution is uniformized) by the fly-eye lenses 151 and 152. Thus, the illumination light is emitted from the illumination device 1.

Next, the illumination light is selectively reflected by the polarization beam splitter 23 to enter the reflective liquid crystal device 21 through the field lens 22. The reflective liquid crystal device 21 reflects the light incident thereon while modulating the light based on the image signal to emit the reflected and modulated light as image light. Since the reflective liquid crystal device 21 allows light incident thereon and light exiting therefrom to have different polarization states, the image light emitted from the reflective liquid crystal device 21 selectively passes through the polarization beam splitter 23 to enter the projection lens 24. Then, the incident light (the image light) is projected (projected in a magnified form) onto the screen 30 by the projection lens 24.

At this time, the red laser 11R, the green laser 11G, and the blue laser 11B intermittently perform light emission with use of, for example, a predetermined light emission frequency. Thus, each laser light (the red laser light, the green laser light, and the blue laser light) is sequentially emitted in a time-divisional manner. Then, based on image signals of respective color components (a red component, a green component, and a blue component), the reflective liquid crystal device 21 sequentially modulates laser light of corresponding colors in a time-divisional manner. Thus, a color image based on the image signals is displayed in the display unit 3.

(2. Functions of fly-eye lenses 151 and 152)

Next, functions of the fly-eye lenses 151 and 152 (functions by a double-stage configuration configured of two fly-eye lenses) will be described in detail below.

Figure 6:
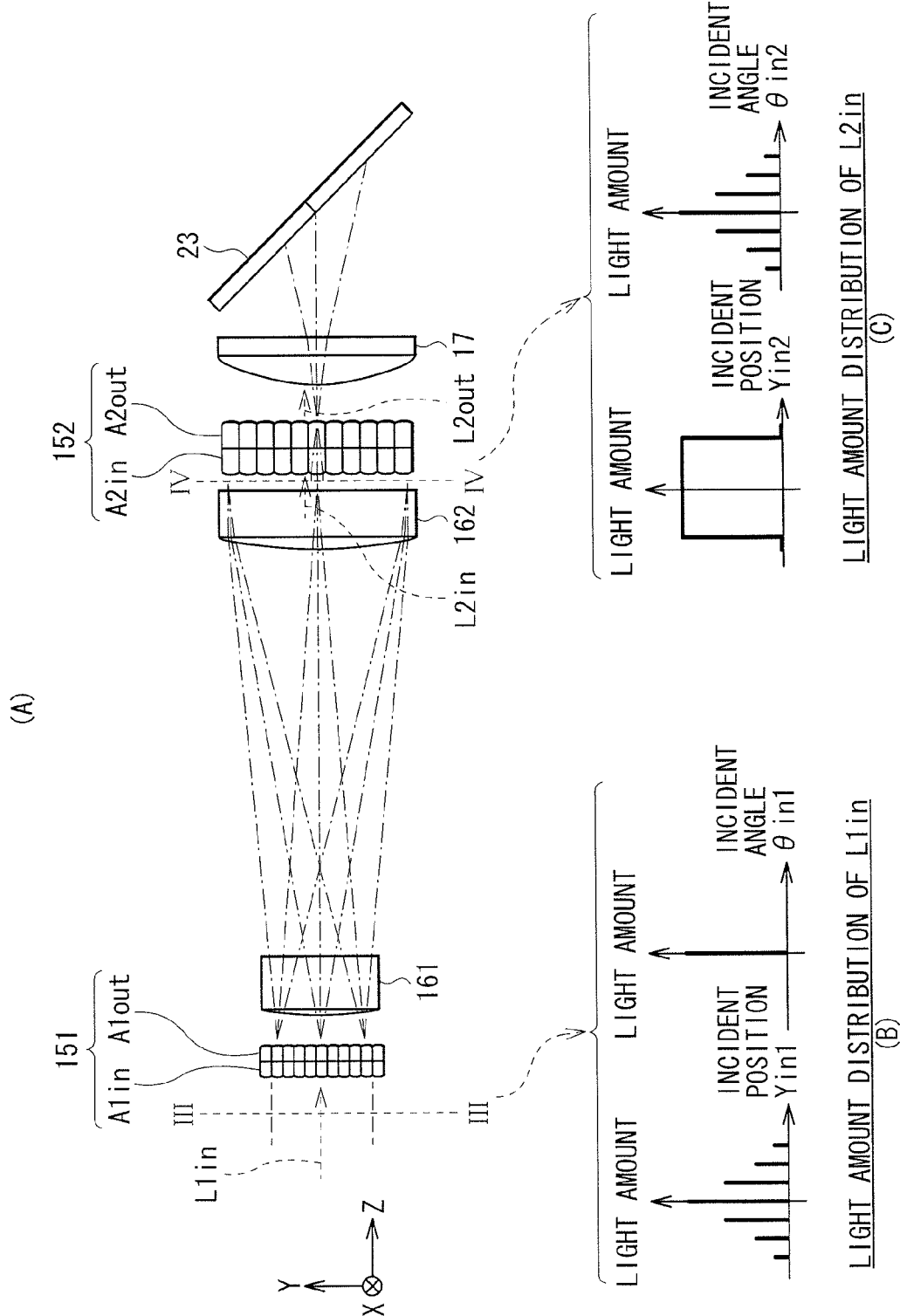
FIG. 6 is a schematic view for describing an example of a light amount distribution in incident light onto each of the two fly-eye lenses illustrated in FIG. 1.

First, for example, as illustrated in parts (A) to (C) in FIG. 6, in these fly-eye lenses 151 and 152, light amount distributions of incident light (light amount distributions with respect to an incident position and an incident angle) are as follows. For example, as illustrated in the part (B) in FIG. 6, while a light amount distribution with respect to an incident position Yin1 of incident light L1in onto the fly-eye lens 151 in a region taken along a line is a Gaussian distribution, the incident light L1in in the region hardly has a distribution with respect to an incident angle $\theta in1$ ($\theta in1 \approx 0°$. On the other hand, for example, as illustrated in the part (C) in FIG. 6, while a light amount distribution with respect to an incident position Yin2 of incident light L2in onto the fly-eye lens 152 in a region taken along a line IV-IV is a distribution within a predetermined range (a distribution in which a light amount is uniform), a light amount distribution with respect to an incident angle $\theta in2$ of the incident light L2in in the region is a Gaussian distribution. In other words, the light amount distributions with respect to the incident position Yin1 and the incident angle $\theta in1$ of the incident light L1in onto the fly-eye lens 151 disposed in a preceding stage are converted into light distributions with respect to the incident angle $\theta in2$ and the incident position Yin2 of the incident light L2in onto the fly-eye lens 152 disposed in a following stage, respectively. Therefore, for example, in the case where the light amount distribution with respect to the incident position Yin1 of the incident light L1in is wide (a divergent angle in a laser light source is wide), the light amount distribution with respect to the incident angle $\theta in2$ of the incident light L2in becomes wide. On the contrary, in the case where the light amount distribution with respect to the incident position Yin1 of the incident light L1 in is narrow (the divergent angle in the laser light source is narrow), the light amount distribution with respect to the incident angle $\theta in2$ of the incident light L2in becomes narrow.

Thus, since two fly-eye lenses 151 and 152 (two stages) are included in the illumination device 1, the following advantage is obtained, compared to the case where only one fly-eye lens (one stage) is included.

First, in a typical optical system using a laser as a light source, variations in divergent angle in the laser cause variations in the depth of focus or variations in degree of speckle noise which will be described later, thereby greatly affecting projector characteristics. More specifically, a light amount distribution at a pupil conjugate position is determined by the divergent angle of the laser; therefore, when the light amount distribution varies, an effective f-number varies even in a same optical system. Since a range where focus is achieved or the degree of speckle noise is varied by an f-number value, a laser projector with stable characteristics is not obtained.

In this case, as an f-number in a lens, a geometric f-number (F) is typically used, but a virtual f-number may appear to be increased by an influence of a pupil light amount distribution (a light amount distribution in an exit pupil) in the lens. In this case, such a virtual f-number is defined as a pseudo f-number (an effective f-number) F'.

Figure 7:
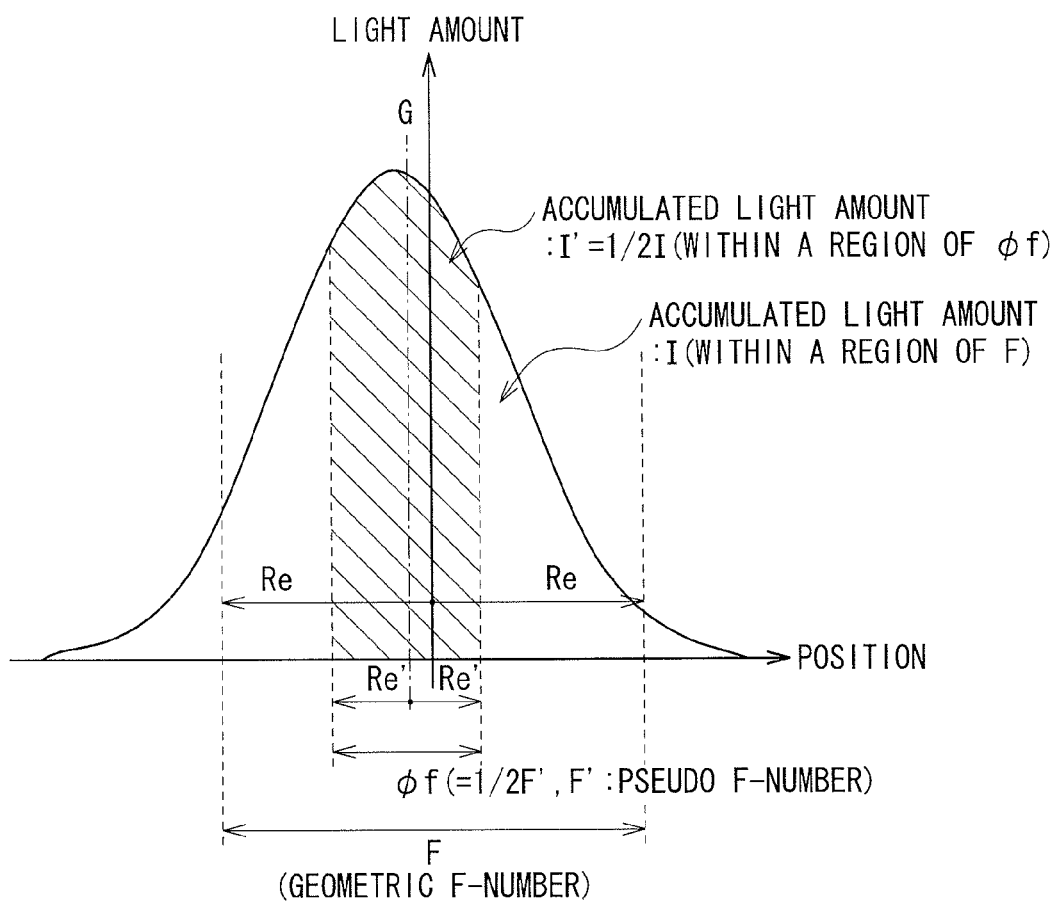
FIG. 7 is a schematic view for describing a pseudo f-number.

FIG. 7 is a schematic view for describing definition of the pseudo f-number F', and illustrates an example of the light amount distribution in the exit pupil in the lens. In this case, an exit pupil radius in the lens is Re, an accumulated light amount obtained by accumulating a light amount within the exit pupil radius Re along a radius direction (a light amount in a region within F illustrated in FIG. 7) in the light amount distribution in the exit pupil in the lens is I, and an accumulated light amount obtained by accumulating light amounts, in the light amount distribution in the exit pupil, within a predetermined radius Re' along the radius direction from a barycenter G as a center of the light amount distribution (a light amount in a region within g illustrated in FIG. 7) is I' (=I/2). The pseudo f-number F' in the lens is defined by the following expression (1) with use of the exit pupil radius Re and the radius Re' satisfying P=I/2. The pseudo f-number F' defined in such a manner is experimentally confirmed to simply provide an effect equivalent to that of the normal geometric f-number F.

$$F'=\{(2FRe')/Re\} \quad (1)$$

In the embodiment, the illumination device 1 includes two fly-eye lenses 151 and 152 configuring a double-stage configuration; therefore, the light amount distribution of the incident light onto the fly-eye lens 152 disposed in a second stage is uniformized by the fly-eye lens 151 disposed in a first stage. Since the light amount distribution of the incident light onto the fly-eye lens 152 disposed in the second stage is uniformized without depending on the divergent angle of the laser in such a manner, the f-number (the pseudo f-number F') is uniquely determined by optical design of an illumination optical system, and the above-described variations in characteristics are suppressed.

Moreover, in a typical projector using laser light, the light amount distribution at the pupil conjugate position is absolutely a laser radiation distribution (a Gaussian distribution); therefore, intensity around a center is strong. Accordingly, also the light amount distribution at a pupil position has strong intensity around a center thereof, and it is necessary to limit the intensity of laser light (the light amount of illumination light), because such a light amount distribution may cause dangers to human's (user's) eyes.

On the other hand, in the embodiment, as described above, by the fly-eye lenses 151 and 152 configuring the double-stage configuration, the light amount distribution of the incident light onto the fly-eye lens 152 disposed in the second stage is uniformized. Therefore, the light amount distribution at the pupil position is also uniformized to cause less damage to human's eyes. As a result, a loose limit to the intensity of laser light (the light amount of illumination light) is only necessary, and a projector having a bright display image while complying with safety standards is allowed to be configured.

(3. Function of optical device 14)

Next, a function of the optical device 14 (a function of reducing interference fringes and speckle noise in illumination light) will be described in detail below.

(Principle of producing interference fringes)

First, referring to FIGS. 8 to 12, a principle of producing the above-described interference fringes caused by the fly-eye lenses 151 and 152 (interference fringes produced in illumination light emitted from the illumination device 1) will be described below.

First, in the case where a fly-eye lens is provided as an uniformization optical member in an illumination device, typically, interference fringes (luminance unevenness, illumination unevenness) are produced in the illumination light by interference (superimposition) of outgoing light fluxes from a plurality of unit cells (unit lenses) regularly arranged in the fly-eye lens. As a result, luminance unevenness is also caused in a projected image on the screen, resulting in a reduction in display image quality. As will be described later, although a pitch of the interference fringes is the order of several micrometers on the reflective liquid crystal device uniformly irradiated, the pitch is increased to the order of several millimeters in a projected image magnified by the projection lens. Accordingly, considerably large interference fringes are produced on the screen.

Moreover, in the case where the double-stage configuration configured of two fly-eye lenses is used as with the embodiment, interference fringes produced by the fly-eye lens disposed in the first stage is magnified by a relay lens, thereby producing the interference fringes of the order of several centimeters on the screen. Thus, when the double-stage configuration configured of two fly-eye lenses is used, two kinds of interference fringes, that is, interference fringes with a long pitch by the fly-eye lens disposed in the first stage and interference fringes with a short pitch by the fly-eye lens disposed in the second stage are produced.

Figure 8:
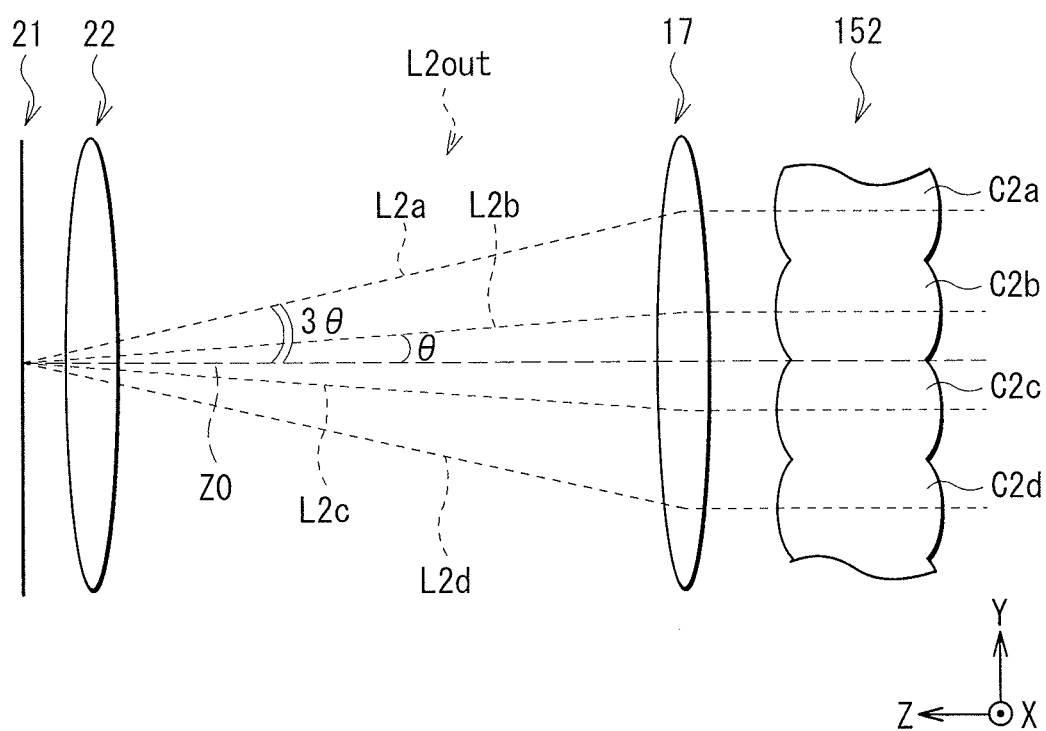
FIG. 8 is a schematic view for describing outgoing light from a unit cell in the fly-eye lens.

As an example, as illustrated in FIG. 8, interference fringes produced by superimposition of outgoing light fluxes from four adjacent unit cells Ca, Cb, Cc, and Cd in the fly-eye lens 152 is considered. It is to be noted that, in this example, the outgoing light fluxes from the unit cells C2a, C2b, C2c, and C2d are L2a, L2b, L2c, and L2d, respectively. Moreover, as illustrated in FIG. 8, an angle between the outgoing light flux L2a and an optical axis Z0 is θ, and an angle between the outgoing light flux Lb and the optical axis Z0 is 3θ.

Figure 9B:
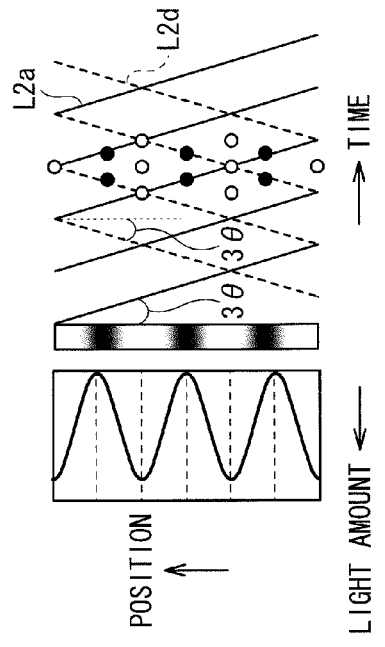
FIGS. 9A to 9D are schematic views for describing a relationship between a combination of outgoing light fluxes illustrated in FIG. 8 and an interference fringe production pattern.
Figure 9D:
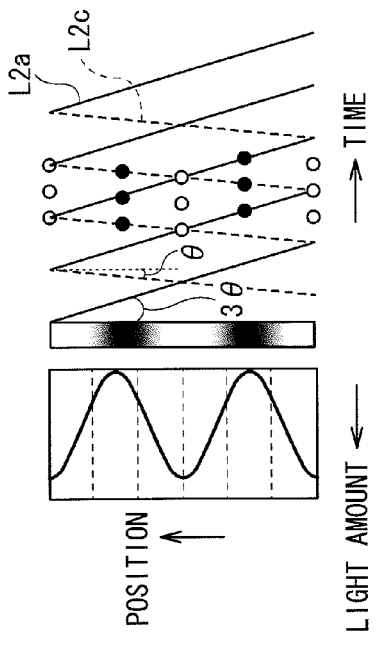
Figure 9A:
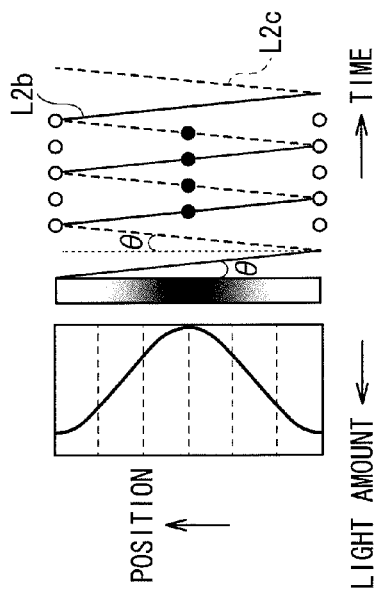
Figure 9C:
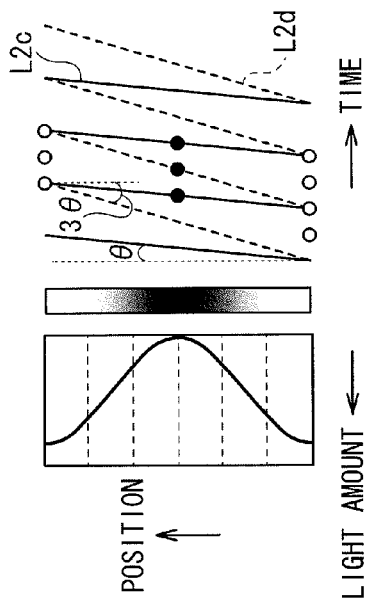

In this case, for example, by patterns illustrated in FIGS. 9A to 9D, interference fringes are produced by superimposition of the outgoing light fluxes (equal-phase light fluxes) from the unit cells C2a, C2b, C2c, and C2d. In this case, FIG. 9A schematically illustrates a pattern of interference fringes produced by a combination (superimposition) of the outgoing light fluxes L2b and L2c, and in this case, an angle between wavefronts of the outgoing light fluxes L2b and L2c is 2θ. Moreover, FIG. 9B schematically illustrates a pattern of interference fringes produced by a combination of the outgoing light fluxes L2a and L2d, and in this case, an angle between wavefronts of the outgoing light fluxes L2a and L2d is 6θ. FIG. 9C schematically illustrates a pattern of interference fringes produced by a combination of the outgoing light fluxes L2c and L2d, and in this case, an angle between wavefronts of the outgoing light fluxes L2c and L2d is 2θ. FIG. 9D schematically illustrates a pattern of interference fringes produced by a combination of the outgoing light fluxes L2a and L2c, and in this case, an angle between wavefronts of the outgoing light fluxes L2a and L2c is 48. It is to be noted that, in FIGS. 9A to 9D (and the following FIG. 10A), a white circle point denotes a state where luminance is relatively high, and a black circuit point denotes a state where luminance is relatively low.

Figure 10A:
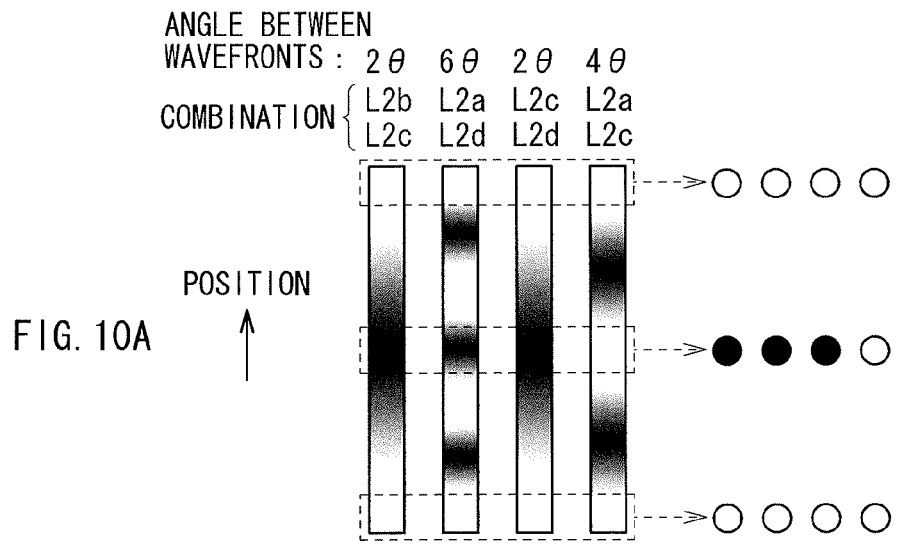
FIGS. 10A and 10B are schematic views illustrating an example of interference fringes produced by the combination of the outgoing light fluxes illustrated in FIGS. 9A to 9D.
Figure 10B:
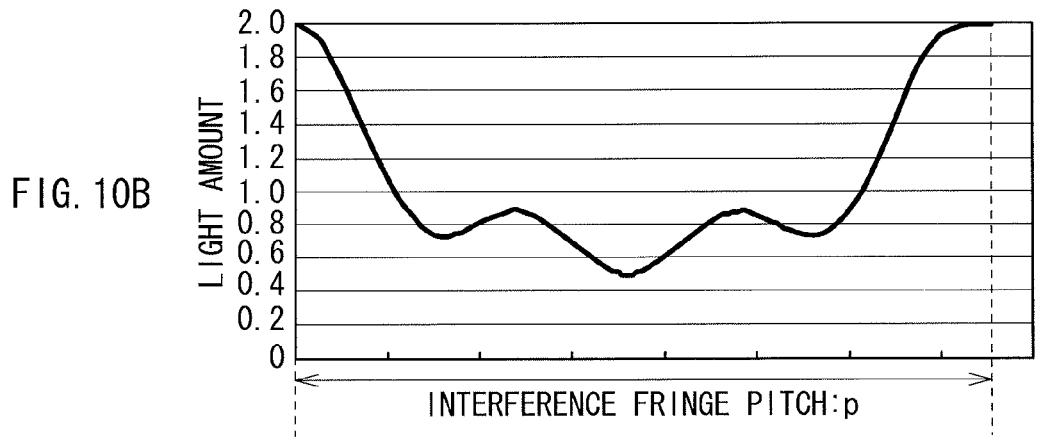

Thus, in this entire example, interference fringes with, for example, a pattern illustrated in FIG. 10A are produced, and the pitch of the interference fringes (interference fringe pitch p) at this time is, for example, as illustrated in FIG. 10B. The value of "light amount" represented by a vertical axis in FIG. 10B denotes relative brightness of interference fringes (1.0: average brightness). It is to be noted that, even if the number of unit cells in the fly-eye lens 152 is increased, the pattern of the interference fringes is produced by the pitch of the interference fringes produced by a plurality of adjacent unit cells as in this example (a combination of all unit cells in the fly-eye lens 152). Moreover, in actuality, since the unit cells are arranged along both the horizontal direction (the x-axis direction) and the vertical direction (the Y-axis direction), the pattern of the interference fringes typically has a mesh form (a grid-like form).

Figure 11:
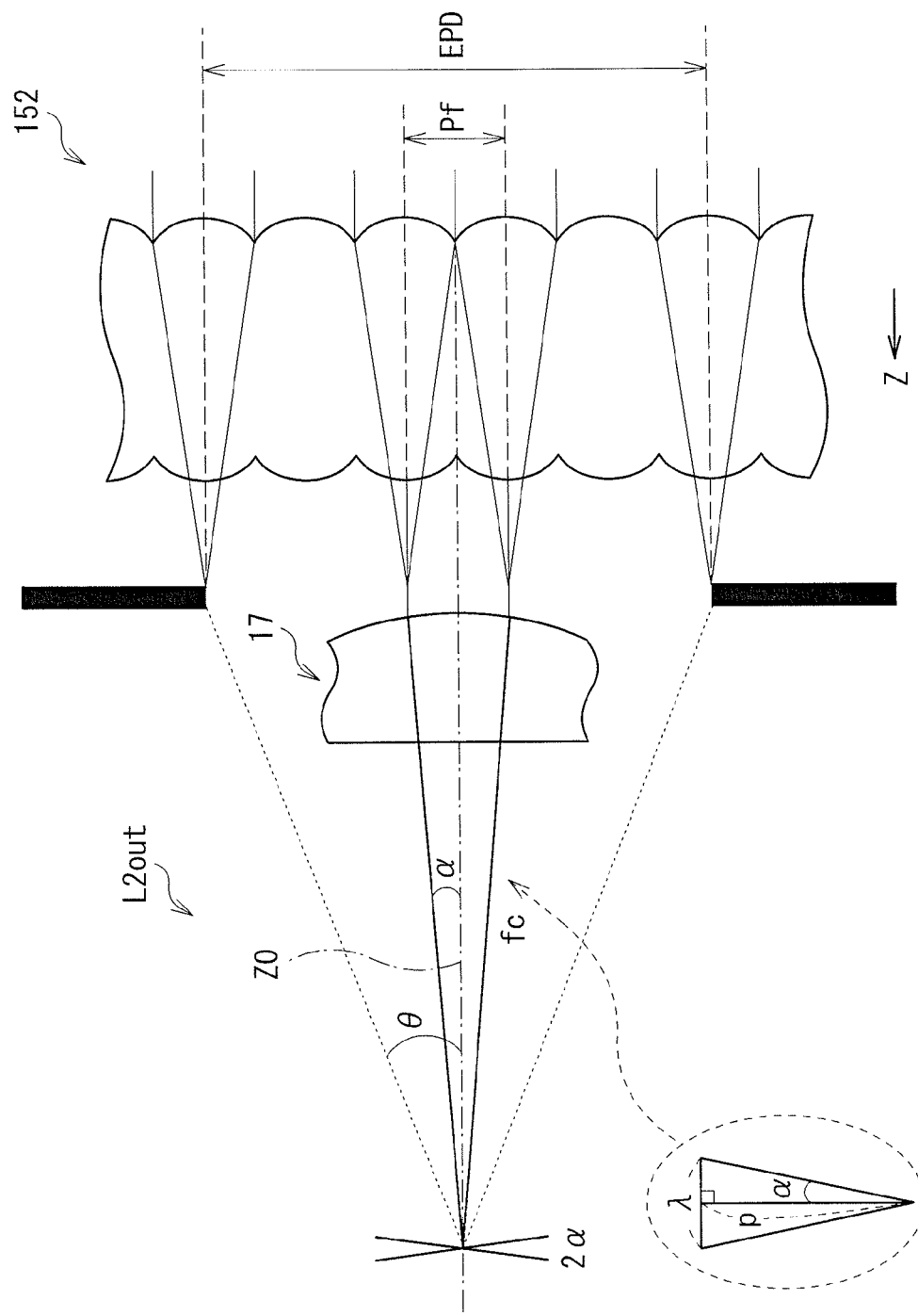
FIG. 11 is a schematic view for describing a technique of calculating an interference fringe pitch.

Now, referring to FIG. 11, a technique of calculating the pitch (the interference fringe pitch p) of the interference fringes produced in such a manner will be described below. In FIG. 11, a wavelength of the outgoing light L2out is an angle between a marginal ray of the outgoing light L2out and the optical axis Z0 and an angle between one ray of the outgoing light L2out and the optical axis Z0 are 0 and a, respectively, a focal length and an f-number of the condenser lens 17 are fc and F, respectively, the unit cell number and the unit cell pitch of the fly-eye lens 15 are n and pf, respectively, a numerical aperture is NA, and a diameter of a light flux passing through an illumination optical system is EPD (Entrance Pupil Diameter). The interference fringe pitch p is determined by the following expression (5) with use of a relationship of the following expressions (2) to (4).

$$NA = \sin\theta = \{EPD/(2 \times fc)\} = 1/(2 \times F) \quad (2)$$

$$\sin\alpha = \{Pf/(2 \times fc)\} = 1/(2 \times n \times F) \quad (3)$$

$$\sin\alpha = \{\lambda/(2 \times p)\} \quad (4)$$

$$p = \{(n \times \lambda)/(2 \times NA)\} = (n \times \lambda \times F) \quad (5)$$

It is to be noted that FIG. 12 illustrates calculation examples of the interference fringe pitch p in the case where a single-stage configuration configured of only one fly-eye lens is used (the unit cell number n is 10 (Single Example 1) and 20 (Single Example 2)) and in the case where a double-stage configuration configure of two fly-eye lens is used as in the embodiment (Double Example 1 and Double Example 2). FIG. 12 illustrates, as the interference fringe pitch p at this time, the interference fringe pitch p of interference fringes on the reflective liquid crystal device 21 (in this example, a pixel pitch is 0.22 inches) and the interference fringe pitch P of interference fringes on the screen 30 (in this example, a projection size is 25 inches).

(Function of reducing interference fringes)

To reduce production of interference fringes caused by the fly-eye lenses 151 and 152, in the illumination device 1 according to the embodiment, as illustrated in FIG. 1, the optical device 14 is disposed on the optical path of laser light. Then, the optical device 14 is so driven by the drive section 140 as to vibrate.

Figure 13:
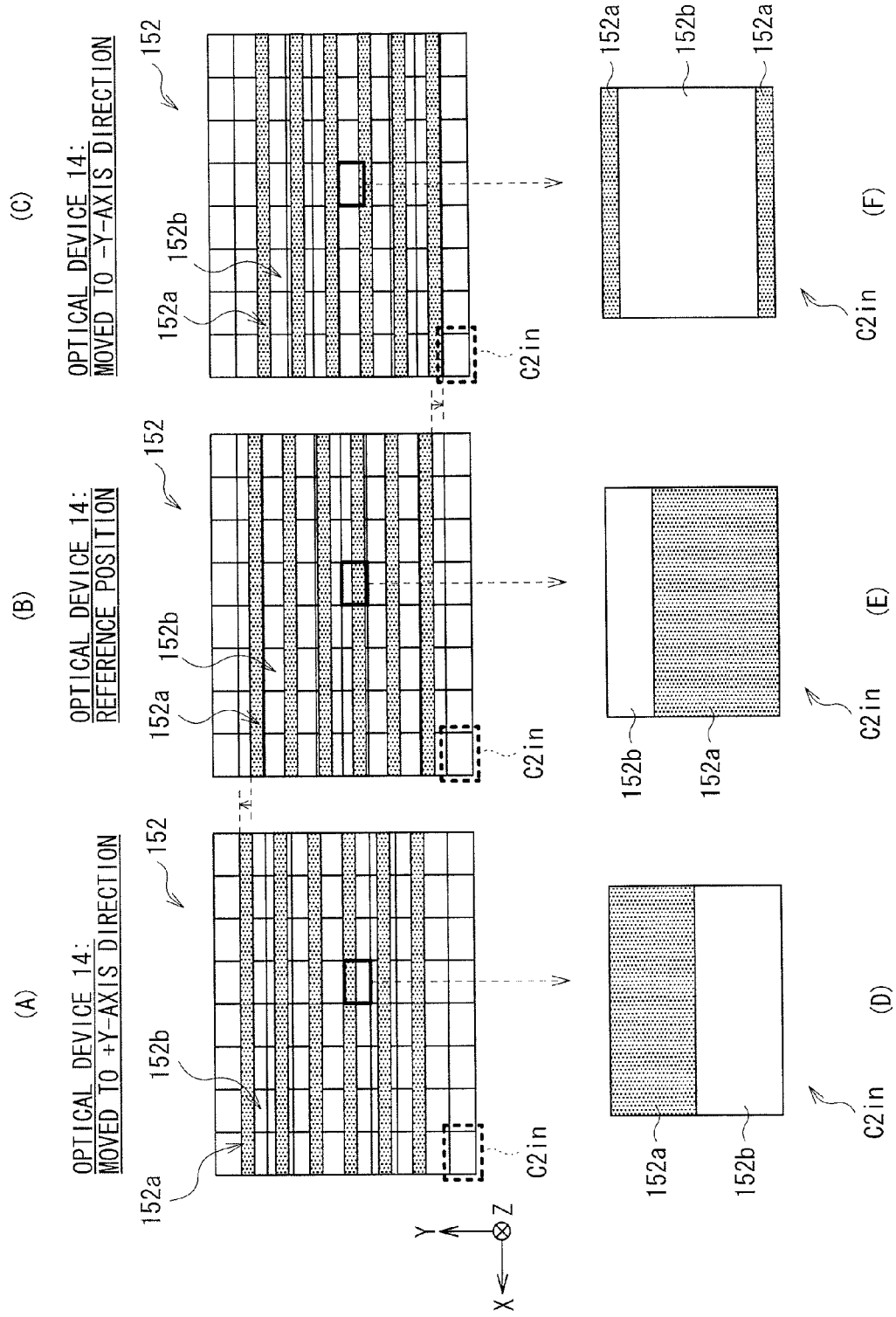
FIG. 13 is a schematic view for describing a function of the optical device illustrated in FIGS. 3A to 3C.

More specifically, first, for example, as illustrated in parts (A) to (C) in FIG. 13, the optical device 14 is so driven by the drive section 140 as to move a relative position thereof to the fly-eye lens 152 along a +Y-axis direction and a −Y-axis direction from a reference position. It is to be noted that the parts (A) to (C) in FIG. 13 schematically illustrate convergent light flux regions 152a and divergent light flux regions 152b on a plane located at a distance LP from the above-described optical device 14, which are superimposed on the respective incident-side unit cells Cin in the fly-eye lens 152. Parts (D) to (F) in FIG. 13 schematically illustrate the convergent light flux regions 152a and the divergent light flux regions 152b in a region on the incident-side unit cell C2in encircled by a heavy line in the parts (A) to (C) in FIG. 13.

When the optical device 14 is so driven as to vibrate along the Y axis in such a manner, for example, as illustrated in the parts (D) to (F) in FIG. 13, the convergent light flux regions 152a and the divergent light flux regions 152b are moved back and forth in the region on each of the incident-side unit cells C2in. As a result, as described above, even if interference fringes are produced in illumination light by the fly-eye lenses 151 and 152, the interference fringes are moved with time to average brightness thereof.

Moreover, in the embodiment, unlike a technique of reducing interference fringes with use of a device disturbing a phase, for example, a diffuser, a light amount loss is not caused when the interference fringes are reduced. Therefore, production of interference fringes is suppressed while avoiding a reduction in light use efficiency of laser light or the like emitted from the light source.

(Function of Reducing Speckle Noise)

Moreover, in the embodiment, since the fly-eye lens 152 is disposed in a stage following the optical device 14 which vibrates (on a light-exit side of the optical device 14), production of speckle noise in addition to the above-described interference fringes in illumination light is also reduced. The speckle noise refers to a pattern with flecks observed when a diffusing surface is irradiated with coherent light such as laser light. The speckle noise is produced by the interference of light scattered at points on the diffusing surface with a random phase relationship according to microscopic roughness on the diffusing surface. In the embodiment, speckle patterns are multiplexed (time-averaged) by vibration of the above-described optical device 14 to reduce production of such speckle noise.

As described above, in the embodiment, the optical device 14 is disposed on the optical path of laser light, and the optical device 14 vibrates; therefore, even if interference fringes are produced in illumination light by the fly-eye lenses 151 and 152, the interference fringes are moved with time to average brightness thereof. Accordingly, the interference fringes become less visible, and a reduction in luminance unevenness in illumination light (an improvement in display image quality) is achievable.

Moreover, since the optical device 14 is disposed between a pair of sub-condenser lenses 161 and 162 both having positive power, downsizing of the optical system is achievable.

(Modification 1)

Next, a modification (Modification 1) of the above-described first embodiment will be described below. It is to be noted that like components are denoted by like numerals as of the first embodiment and will not be further described.

[Configuration of Optical Device 14A]

Figure 14:
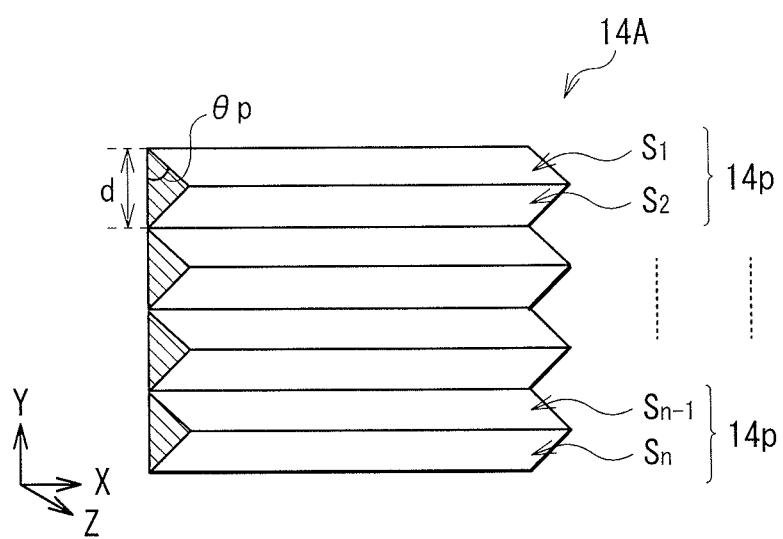
FIG. 14 is a schematic view illustrating a configuration example of an optical device according to Modification 1.

FIG. 14 illustrates a schematic perspective view of a configuration example of an optical device (an optical device 14A) according to Modification 1. An illumination device (a display unit) according to the modification has a configuration similar to that of the illumination device 1 (the display unit 3) illustrated in FIG. 1, except that the optical device 14A is included instead of the optical device 14.

The optical device 14A according to the modification is configured of a prism array, as will be described later. More specifically, the optical device 14A is configured of a plurality of (in this case, n/2, where n is an integer of 2 or more) of prisms 14p which are arranged along the Y-axis direction. Each of the prisms 14p has a pair of inclined surfaces extending along the X-axis direction on a laser-light-exit side (a +Z-axis side). In other words, these prisms 14p are arranged side-by-side along a direction (the Y-axis direction) orthogonal to the extending direction (the X-axis direction) of the pairs of inclined surfaces in a light-exit surface (an X-Y plane). More specifically, a first prism 14p, a second prism 14p, ..., and an (n/2)th prism 14p which are arranged in order in a negative direction of the Y axis in the drawing have a pair of an inclined surface (a first surface) $S_1$ and an inclined surface (a second surface) $S_2$, a pair of an inclined surface (a third surface) $S_3$ and an inclined surface (a fourth surface) $S_4$, ..., and a pair of an inclined surface (an (n−1)th surface) $S_{n-1}$ and an inclined surface (an nth surface) $S_n$, respectively. Thus, each of the prisms 14p has a triangular prism shape (a pitch (a prism pitch) along the Y-axis direction: d, an inclination angle of each inclined surface: θp) extending along the X-axis direction, and protrusions (convex sections) and depressions (concave sections) are alternately formed on the entire light-exit surface. It is to be noted that, in this example, each of the convex sections (the inclined surfaces) is disposed on an exit-surface side of each of the prisms 14p; however, this is not limitative. Each of the convex sections may be disposed on one or both of an incident-surface side and the exit-surface side of each of the prisms 14p.

[Functions and Effects of Optical Device 14A]

Figure 15:
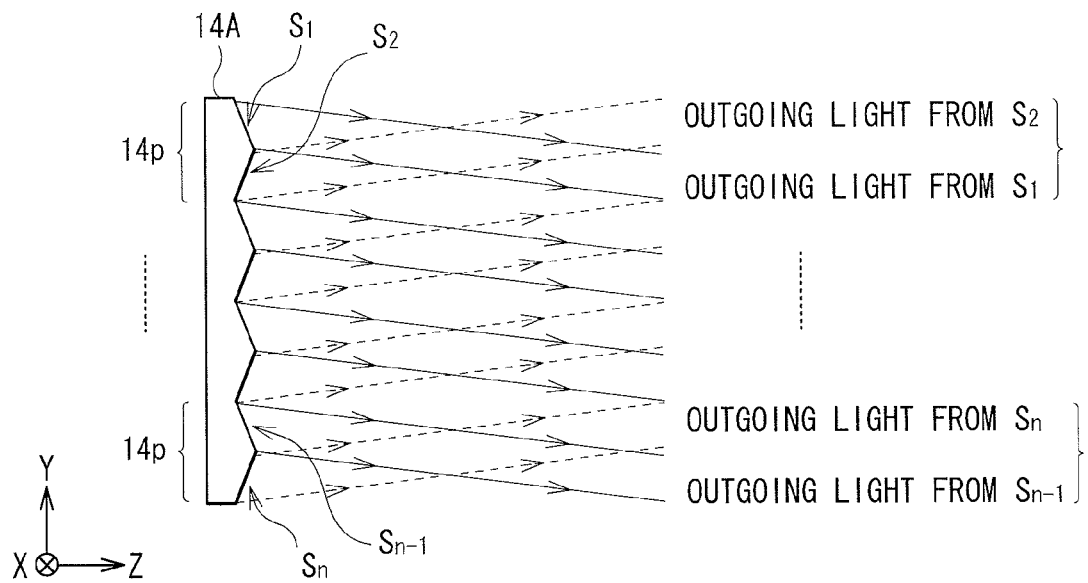
FIG. 15 is a schematic view for describing a function of the optical device illustrated in FIG. 14.

In the optical device 14A, incident light onto each of the prisms 14p exits from the pair of inclined surfaces in the following manner. For example, as illustrated in FIG. 15, outgoing light exits from the optical device 14A such that a position of incident light and a position of outgoing light on a plane located at a predetermined distance from the optical device 14A (in this case, on an incident surface of the fly-eye lens 152) are switched with respect to each other in the pair of inclined surfaces of each of the prisms 14p. More specifically, in the above-described first prism 14p in the optical device 14A, an incident position of incident light and the position of outgoing light on the incident surface of the fly-eye lens 152 are switched with respect to each other between the inclined surface $S_1$ and the inclined surface $S_2$. In other words, while outgoing light from the inclined surface $S_1$ is emitted toward the incident position (a lower side in an exit surface of the first prism 14p) of incident light on the inclined surface $S_2$, outgoing light from the inclined surface $S_2$ is emitted toward the incident position (an upper side in the exit surface of the first prism 14p) of the incident light on the inclined surface $S_1$. Likewise, in the above-described (n/2)th prism 14p, the incident position of the incident light and the position of the outgoing light on the incident surface of the fly-eye lens 152 are switched with respect to each other between the inclined surface and the inclined surface $S_n$. In other words, while outgoing light from the inclined surface is emitted toward the incident position (a lower side in an exit surface of the (n/2)th prism 14p) of the incident light on the inclined surface $S_n$, outgoing light from the inclined surface $S_n$ is emitted toward the incident position (an upper side in the exit surface of the (n/2)th prism 14p) of the incident light on the inclined surface $S_{n-1}$. It is to be noted that such a function of switching the positions of incident light and outgoing light with respect to each other is optionally adjustable by setting of the prism pitch d and the inclination angle θp illustrated in FIG. 14.

Figure 16:
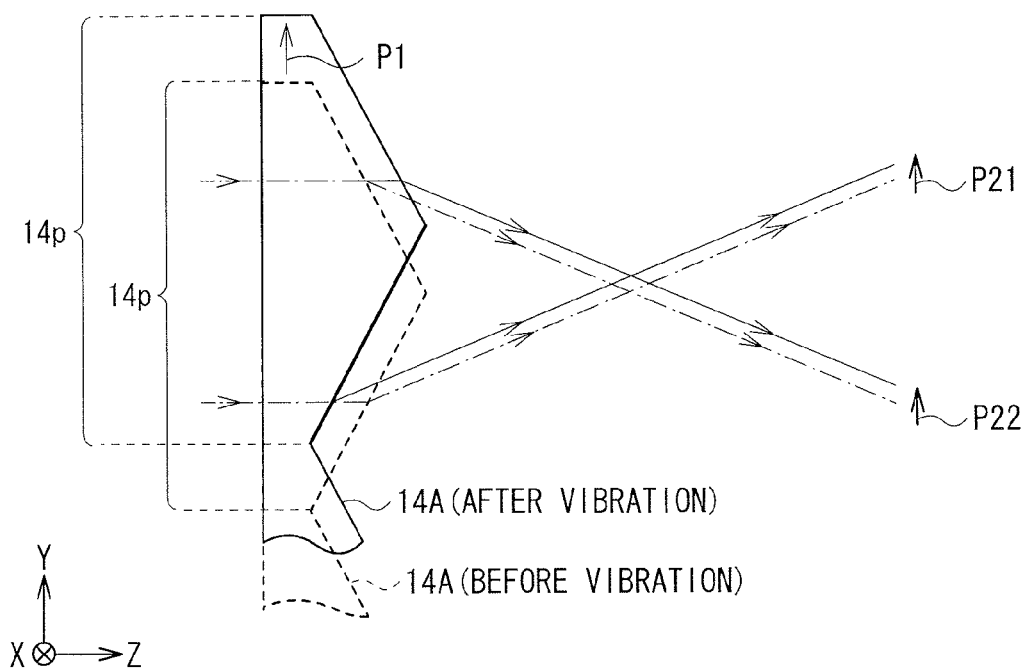
FIG. 16 is a schematic view for describing beam scanning by vibration of the optical device illustrated in FIG. 14.

Then, the drive section 140 moves a relative position between the optical device 14A and the fly-eye lens 152. More specifically, in the modification, as indicated by, for example, an arrow P1 in FIG. 16, the drive section 140 vibrates the optical device 14A along an arrangement direction (the Y-axis direction) of the prisms 14p in a plane orthogonal to the optical axis Z0 to move the above-described relative position. In other words, as indicated by, for example, arrows P21 and P22 in FIG. 16, positions of outgoing light from the inclined surfaces of each of the above-described prisms 14p (outgoing light so emitted from the inclined surfaces that the positions thereof are switched with respect to each other between the pair of inclined surfaces) are also moved (shifted) along the Y-axis direction. Thus, beam scanning by the incident light from each of the prisms 14p in the optical device 14A is performed on the incident surface of the fly-eye lens 152.

As a result, also in the modification, effects similar to those of the above-described first embodiment are obtainable by functions similar to those of the above-described first embodiment. In other words, production of interference fringes and speckle noise is allowed to be reduced.

As described above, the configuration of the optical device in the present disclosure is not limited to that (the optical device 14) described in the above-described first embodiment, and the optical device may have any other configuration. This also applies to other embodiments and other modifications which will be described below.

Second Embodiment

[Configuration of Optical Device 14B]

Figure 17:
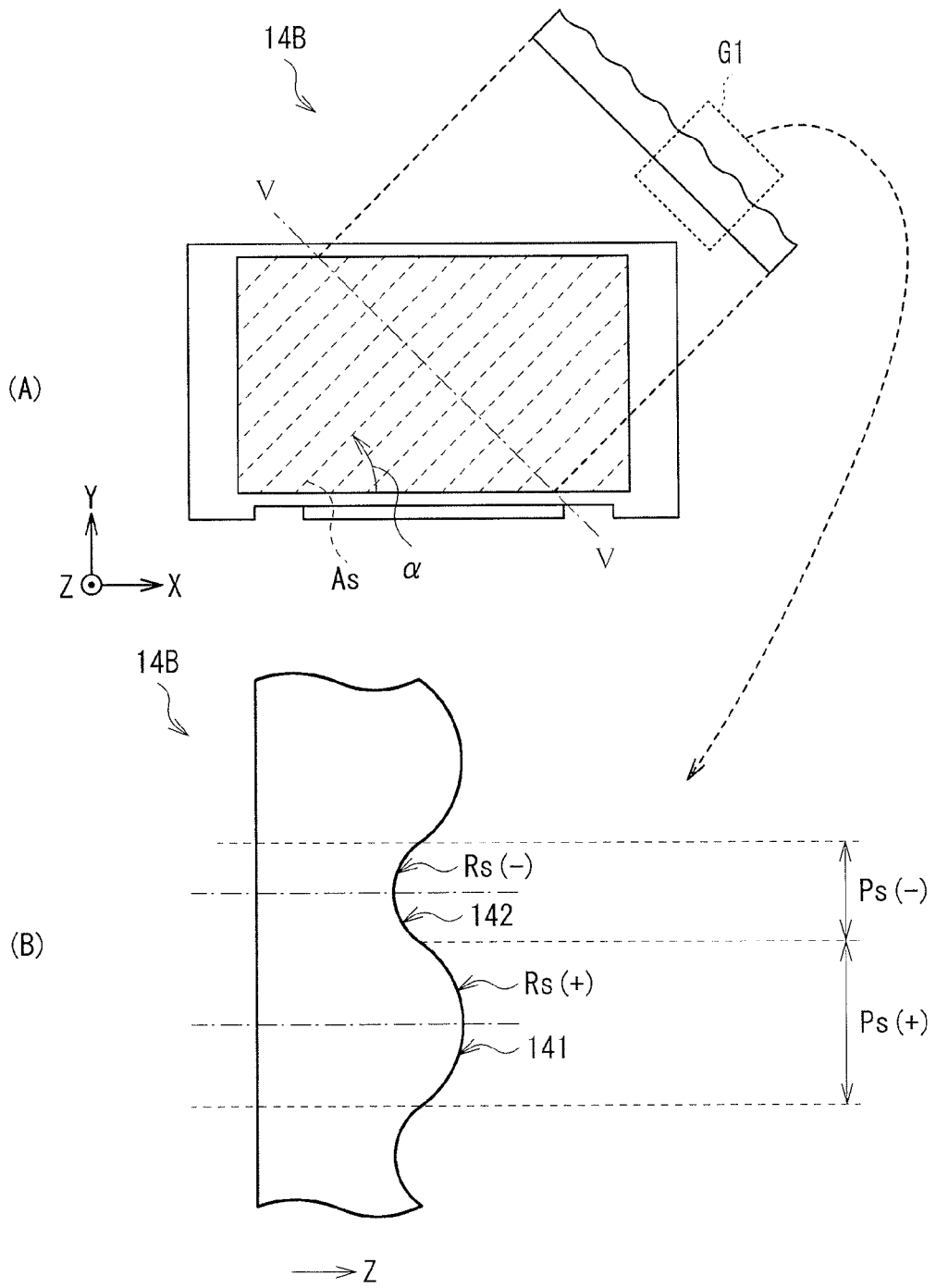
FIG. 17 is a schematic view illustrating a configuration example of an optical device according to a second embodiment.

FIG. 17 schematically illustrates a configuration example of an optical device (an optical device 14B) according to a second embodiment of the disclosure. As with the optical device 14, the optical device 14B according to the embodiment has, on a light-exit surface thereof, a concavo-convex surface with a periodic corrugated shape. A part (A) in FIG. 17 illustrates an X-Y planar configuration of the optical device 14B and a sectional configuration taken along a line V-V in the drawing, and a part (B) in FIG. 17 is an enlarged view of a part indicated by G1 in the part (A) in FIG. 17. It is to be noted that like components are denoted by like numerals as of the first embodiment and will not be further described.

As illustrated in the part (B) in FIG. 17, the optical device 14B has, on the light-exit surface thereof, a configuration in which first optical surfaces 141 with a convex-curved shape and second optical surfaces 142 with a concave-curved shape are alternately arranged (one-dimensionally arranged), and basically has a configuration similar to that of the optical device 14.

However, in the optical device 14B, unlike the optical device 14, the first optical surfaces 141 and the second optical surfaces 142 are inclined with respect to an X axis and a Y axis (the arrangement direction of the unit cells in the fly-eye lenses 151 and 152). In other words, the extending directions of the first optical surfaces 141 and the second optical surface 142 (the optical-surface-extending axis As) and the above-described arrangement direction of the unit cells are inclined with respect to each other. In this case, as an example, an inclination angle α between the extending directions of the first optical surfaces 141 and the second optical surfaces 142 and the X axis is 45°.

(Functions and Effects of Optical Device 14B)

Also in the optical device 14B with such a configuration, basically, effects similar to those of the optical device 14 are obtainable by functions similar to those of the optical device 14.

Figure 18:
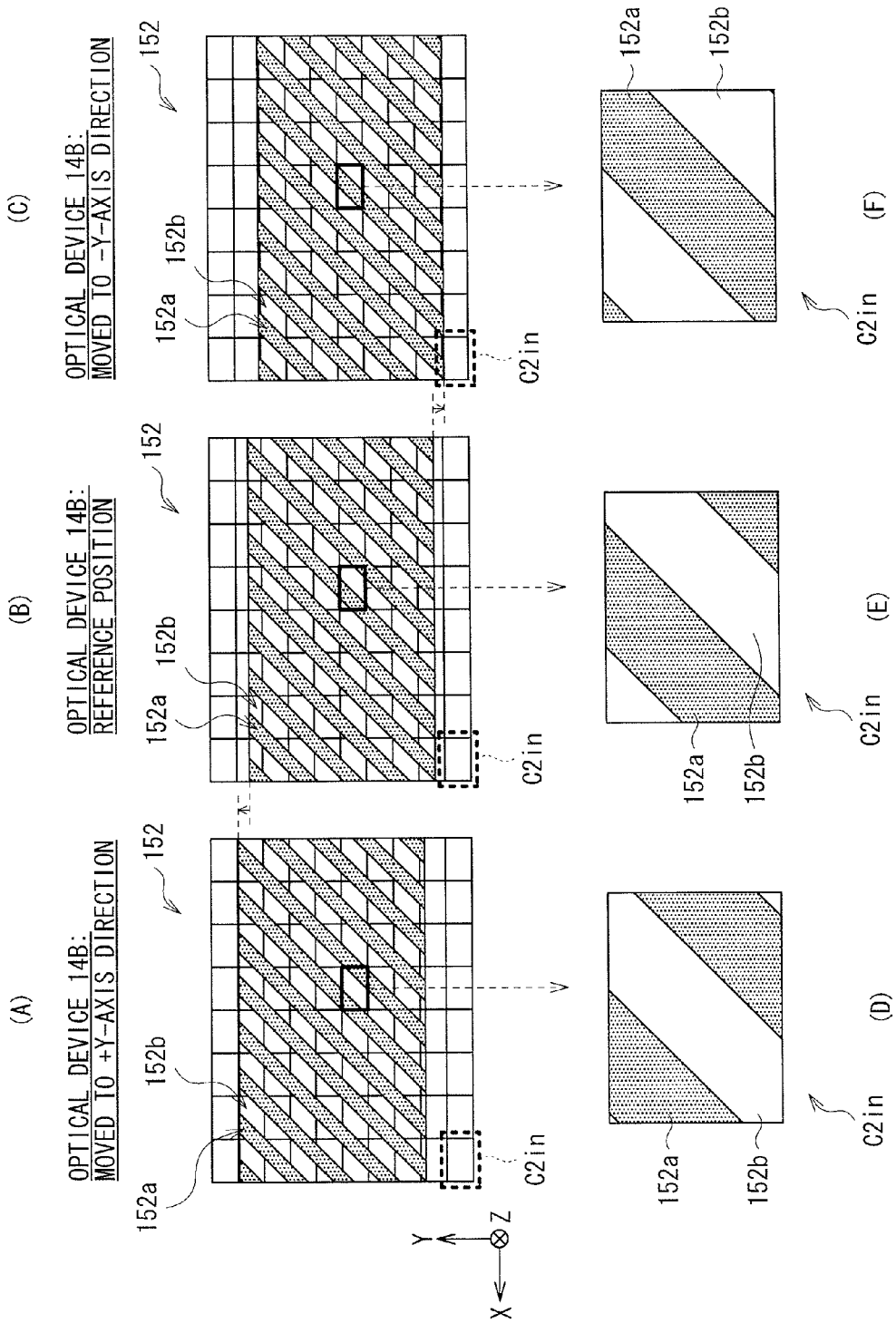
FIG. 18 is a schematic view for describing a function of the optical device illustrated in FIG. 17.

In other words, for example, as illustrated in parts (A) to (F) in FIG. 18, as with the first embodiment, when the following functions and effects are obtained through so driving the optical device 14B as to move a relative position thereof to the fly-eye lens 152 along a +Y-axis direction and a −Y-axis direction from a reference position. In other words, also in this case, when the optical device 14B is so driven by the drive section 140 as to vibrate along the Y axis, for example, as illustrated in the parts (D) to (F) in FIG. 18, the convergent light flux regions 152a and the divergent light flux regions 152b are moved back and forth in a region on each of the incident-side unit cells C2in.

As a result, even if interference fringes are produced in illumination light by the fly-eye lenses 151 and 152, the interference fringes are moved with time to average brightness thereof. Thus, the interference fringes become less visible, and luminance unevenness in the illumination light is allowed to be reduced (display image quality is improvable). Moreover, as with the first embodiment, production of speckle noise is allowed to be reduced.

As described above, patterns of the interference fringes are produced mainly in the vertical direction and the horizontal direction based on the arrangement of the unit cells in the fly-eye lenses 151 and 152; however, in actuality, interference fringes are produced by interference between the outgoing light fluxes from the unit cells obliquely adjacent to each other. More specifically, for example, in the case where the aspect ratio of the unit cell is X:Y=16:9, interference fringes are produced in a 30° (=arctan(9/16)) direction and a 150° (=−arctan(9/16)) direction in addition to the horizontal direction (a 0° direction) and the vertical direction (a 90° direction).

However, as with the optical device 14B according to the embodiment, in the case where the extending direction (the optical-surface-extending axis As) of the optical surface and the arrangement direction of the unit cells are inclined with respect to each other, interference fringes produced in such an oblique direction are also allowed to be reduced. More specifically, for example, in the case where the inclination angle α is 45°, when the optical device 14B with this single-axis configuration (a configuration in which the optical-surface-extending axis As is oriented along one direction) vibrates only along one direction (for example, the above-described Y-axis direction), interference fringes in not only the vertical and horizontal directions but also the oblique direction are allowed to be reduced. Since measures are taken by the optical device 14B with the single-axis configuration, the optical device is easily manufacturable, compared to, for example, an optical device with a 2-axis configuration or a 4-axis configuration which will be described later.

Moreover, in this embodiment, since, as described above, the extending direction (the optical-surface-extending axis As) of the optical surface and the arrangement direction of the unit cells are inclined with respect to each other, the following effect is obtainable. Crosstalk in a boundary region between the unit cells (the incident-side unit cells C2in and the exit-side unit cells C2out) in the fly-eye lens 152 and at a connection boundary line between the convergent light flux and the divergent light flux is allowed to be reduced.

Next, modifications (Modifications 2 to 5) of the above-described first and second embodiments will be described below. It is to be noted that like components are denoted by like numerals as of the first and second embodiments and will not be further described.

(Modifications 2 to 4)

[Configurations of Illumination Devices 1C to 1E]

Figure 19A:
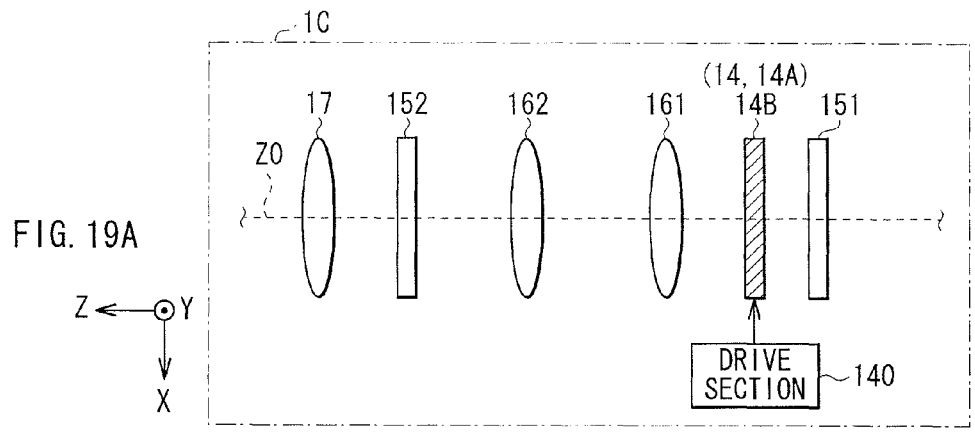
FIGS. 19A and 19C are schematic views illustrating schematic configuration examples of illumination devices according to Modifications 2 to 4.
Figure 19B:
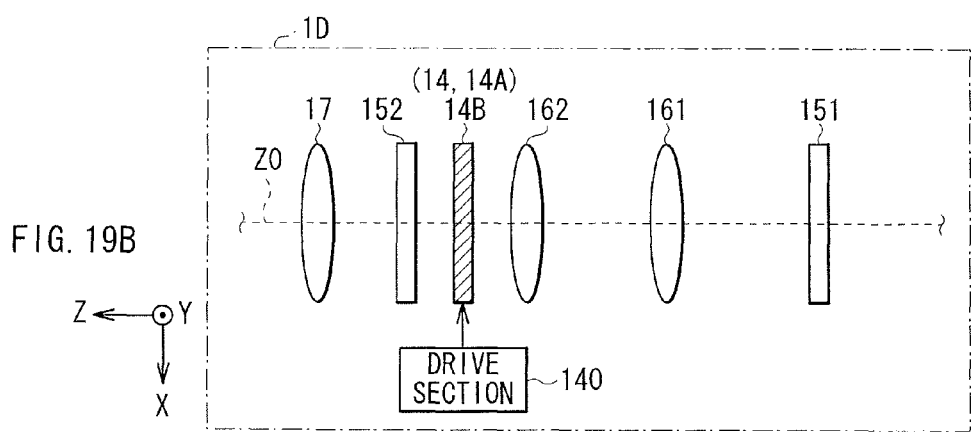
Figure 19C:
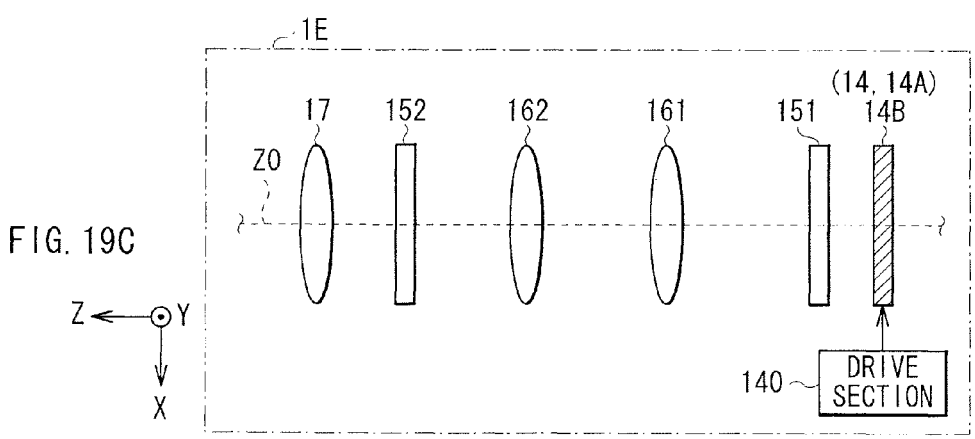

FIG. 19A schematically illustrates a schematic configuration example of an illumination device (an illumination device 1C) according to Modification 2. Moreover, FIG. 19B schematically illustrates a schematic configuration example of an illumination device (an illumination device 1D) according to Modification 3. FIG. 19C schematically illustrates a schematic configuration example of an illumination device (an illumination device 1E) according to Modification 4. These illumination devices 1C, 1D, and 1E each have a configuration similar to that of the illumination device 1 illustrated in FIG. 1, except that the position of the optical device 14 (or the optical device 14A or 14B) is changed.

In other words, first, in each of the illumination devices 1C and 1D according to Modifications 2 and 3, as with the illumination device 1, the optical device 14B (or 14 or 14A) is disposed on the optical path between two fly-eye lenses 151 and 152. However, in each of these illumination devices 1C and 1D, unlike the illumination device 1, the optical device 14B (or 14 or 14A) is not disposed on the optical path between two sub-condenser lenses 161 and 162.

More specifically, in the illumination device 1C, the optical device 14B (or 14 or 14A) is disposed on an optical path on a light-incident side, that is, in a stage preceding the two sub-condenser lenses 161 and 162 (on an optical path between the fly-eye lens 151 and the sub-condenser lens 161). Moreover, in the illumination device 1D, the optical device 14B (or 14 or 14A) is disposed on an optical path on a light-exit side, that is, in a stage following the two sub-condenser lenses 161 and 162 (on an optical path between the sub-condenser lens 162 and the fly-eye lens 152).

On the other hand, in the illumination device 1E according to Modification 4, unlike the illumination devices 1, 1C, and 1D, the optical device 14B (or 14 or 14A) is not disposed on the optical path between the two fly-eye lenses 151 and 152. More specifically, in the illumination device 1E, the optical device 14B (or 14 or 14A) is disposed on an optical path on the light-incident side, that is, in a stage preceding the two fly-eye lenses 151 and 152 (an optical path between the fly-eye lens 151 and the dichroic prism 132).

[Functions and Effects of Illumination Devices 1C to 1E]

Also in these illumination devices 1C, 1D, and 1E, basically, effects similar to those of the illumination device 1 are obtainable by functions similar to those of the illumination device 1. In other words, production of interference fringes and speckle noise is allowed to be reduced.

However, in the illumination devices 1C, 1D, and 1E, since the optical device 14B (or 14 or 14A) is not disposed between the sub-condenser lenses 161 and 162, it can be said that the optical system may be upsized, compared to the illumination device 1.

Moreover, specifically in the case where the optical device 14B is used, when the optical device 14B is not disposed between the sub-condenser lenses 161 and 162, the following disadvantage arises. In this case, a temporal change direction of an outgoing light flux from the optical device 14B is, for example, a 45° direction; therefore, respective functions of reducing interference fringes along four directions (a vertical direction, a horizontal direction, and oblique directions) are, for example, as follows. In this example, with respect to interference fringes along each of a 0° direction, a 90° direction, and a 150° direction, an amount of change of the outgoing light flux by vibration of the optical device 14B is relatively large. On the other hand, with respect to interference fringes along a 30° direction which is a direction closer to the optical-surface-extending axis As in the optical device 14B, the amount of change of the outgoing light flux by vibration of the optical device 14B is relatively small. In other words, in this case, in the optical device 14B with the single-axis configuration, an effect of reducing interference fringes along one of the four directions is not sufficient.

0° direction: |sin(0°-45°)|≈0.71
90° direction: |sin(90°-45°)|≈0.71
30° direction: |sin(30°-45°)|≈0.26
150° direction: |sin(150°-45°)|≈0.97

Figure 20A:
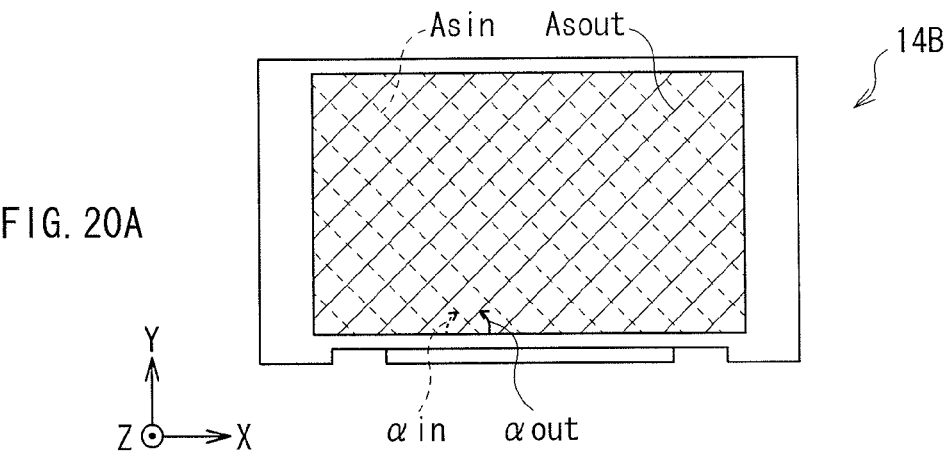
FIGS. 20A to 20C are schematic views illustrating configuration examples of optical devices applied to the illumination devices according to Modifications 2 to 4.
Figure 20B:
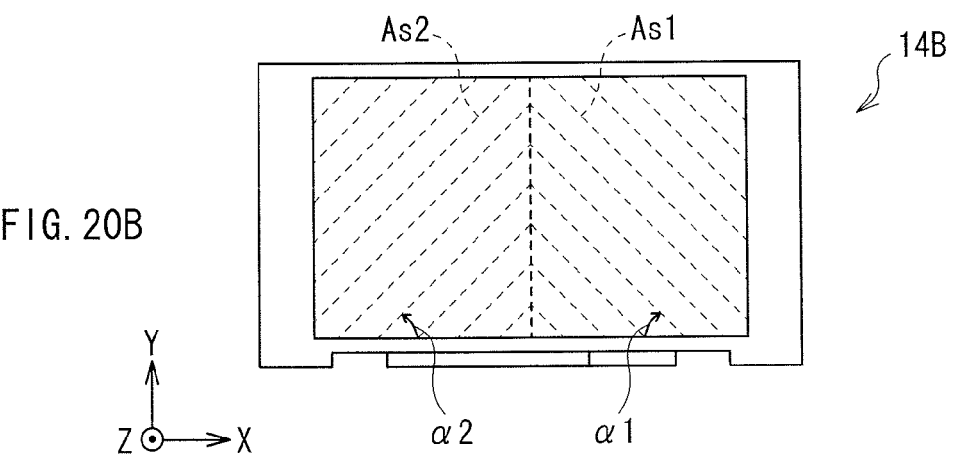
Figure 20C:
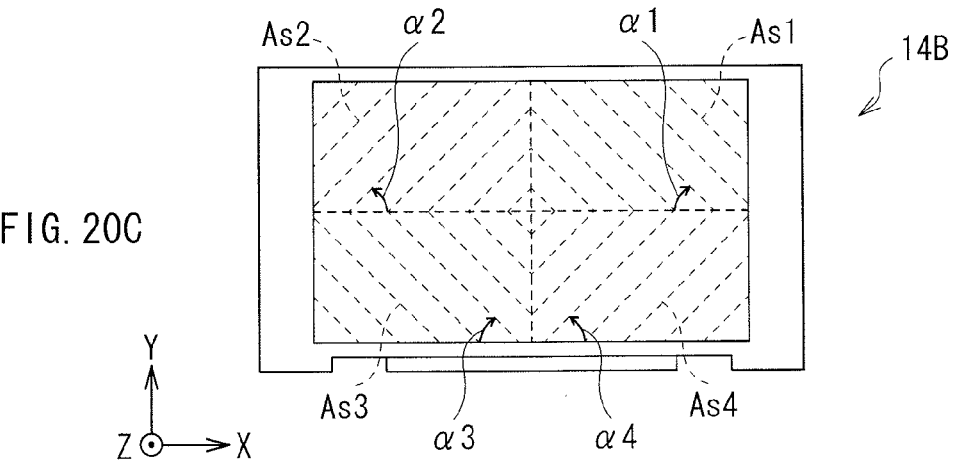

Therefore, in these illumination devices 1C, 1D, and 1E, for example, as illustrated in FIGS. 20A to 20C, the optical device 14B with a multiaxial configuration such as a two-axis configuration or a four-axis configuration (a configuration in which the optical-surface-extending axes As indicating the inclination angle α are present in a plurality of directions) is preferably used. When the optical device 14B with such a multiaxial configuration vibrates, a sufficient effect of reducing interference fringes along all of the above-described four directions is obtainable.

More specifically, in an example illustrated in FIG. 20A, the optical device 14B has a two-axis configuration in which an optical-surface-extending axis Asin on a light-incident surface of the optical device 14B and an optical-surface-extending axis Asout on a light-exit surface of the optical device 14B are different from each other. Thus, an inclination angle αin of the optical-surface extending axis Asin and an inclination angle αout of the optical-surface-extending axis Asout are different from each other correspondingly, and two kinds of inclination angles are provided.

Moreover, in an example illustrated in FIG. 20B, the optical device 14B has a two-axis configuration in which two optical-surface-extending regions with inclination angles different from each other are provided on a plane (a light-flux-passing plane) of the optical device 14B (the light-flux-passing plane is divided into two optical-surface-extending regions). More specifically, in this example, a region having an optical-surface-extending axis As1 indicating an inclination angle α1 and a region having an optical-surface-extending axis As2 indicating an inclination angle α2 are disposed along the X-axis direction.

Further, in an example illustrated in FIG. 20C, the optical device 14B has a four-axis configuration in which four optical-surface-extending regions with inclination angles different from one another are provided on the light-flux-passing plane of the optical device 14B (the light-flux-passing plane is divided into four optical-surface-extending regions). More specifically, in this example, a region having an optical-surface-extending axis As1 indicating an inclination angle α1, a region having an optical-surface-extending axis As2 indicating an inclination angle α2, a region having an optical-surface-extending axis As3 indicating an inclination angle α3, and a region having an optical-surface-extending axis As4 indicating an inclination angle α4 are provided.

Figure 21:
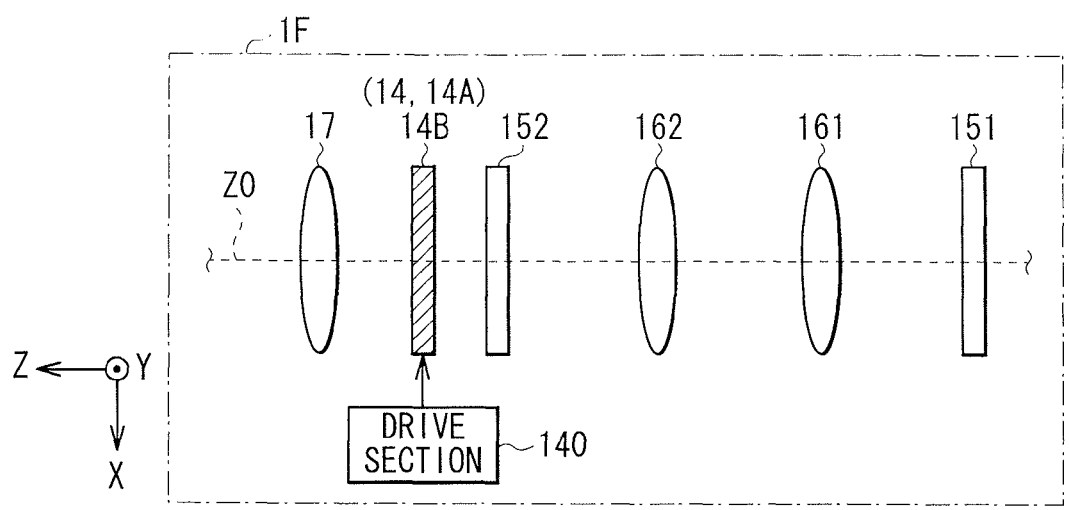
FIG. 21 is a schematic view illustrating a schematic configuration example of an illumination device according to Modification 5.

(Modification 5)
[Configuration of Illumination Device 1F]
FIG. 21 schematically illustrates a schematic configuration example of an illumination device (an illumination device 1F) according to Modification 5. The illumination device 1F also has a configuration similar to that of the illumination device 1 illustrated in FIG. 1, except that the position of the optical device 14 (or the optical device 14A or 14B) is changed.

Specifically, in the illumination device 1F according to the modification, unlike the illumination devices 1, 1C, and 1D, the optical device 14B (or 14 or 14A) is not disposed on the optical path between the two fly-eye lenses 151 and 152. More specifically, in the illumination device 1F, the optical device 14B (or 14 or 14A) is disposed on an optical path on a light-exit side, that is, in a stage following the two fly-eye lenses 151 and 152 (on an optical path between the fly-eye lens 152 and the condenser lens 17).

[Functions and Effects of Illumination Device 1F]
Also in the illumination device 1F with such a configuration, basically, effects similar to those of the illumination device 1 are obtainable by functions similar to those of the illumination device 1. In other words, production of interference fringes is allowed to be reduced.

However, also in the illumination device 1F, as with the illumination devices 1C, 1D, and 1E, since the optical device 14B (or 14 or 14A) is not disposed between the sub-condenser lenses 161 and 162, it can be said that the optical system may be upsized, compared to the illumination device 1.

In addition, in the illumination device 1F, since the optical device 14B (or 14 or 14A) is disposed in the stage following both the fly-eye lenses 151 and 152, unlike the illumination devices 1 and 1C to 1E, while an effect of reducing interference fringes is obtained, an effect of reducing speckle noise is not sufficient. In other words, in the illumination devices 1 and 1C to 1E, the optical device 14B (or 14 or 14A) is disposed in a stage preceding one of the fly-eye lenses 151 and 152, and vibrates to cause a large light superimposition effect on the reflective liquid crystal device 21, thereby sufficiently reducing speckle noise. On the other hand, in the illumination device 1F, such a technique is not applicable; therefore, an effect of reducing speckle noise is not sufficient. As a result, it can be said that, in the configuration according to the modification, concurrent use of another technique, or the like is preferable to sufficiently reduce speckle noise.

Third Embodiment

Figure 22:
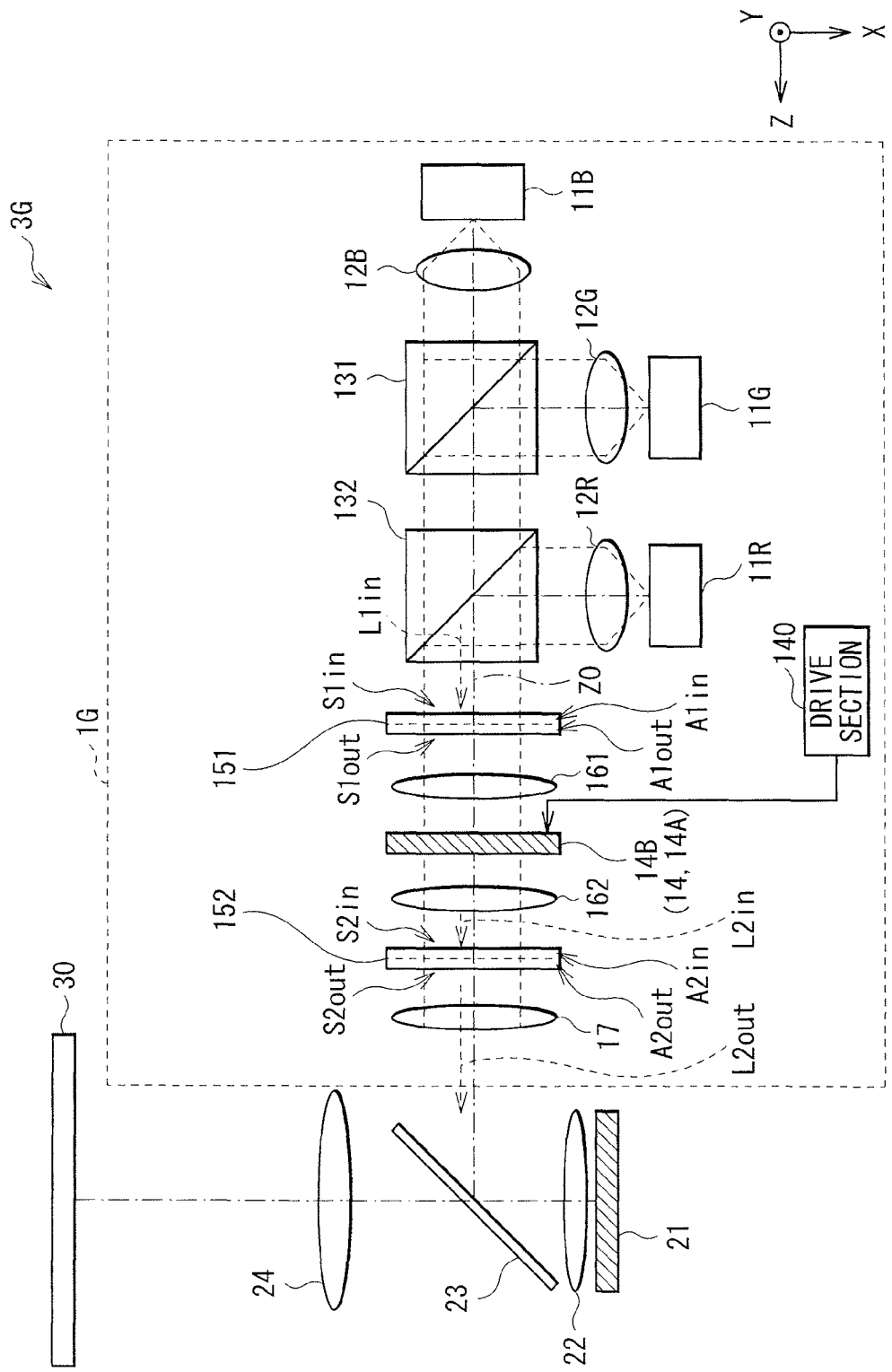
FIG. 22 is a schematic view illustrating an entire configuration example of a display unit according to a third embodiment.

[Configuration of Display Unit 3G]
FIG. 22 schematically illustrates a configuration example of a display unit (a display unit 3G) according to a third embodiment of the disclosure. The display unit 3G according to the embodiment has a configuration similar to that of the display unit 3 illustrated in FIG. 1, except that an illumination device 1G which will be described later is included instead of the illumination device 1. It is to be noted that like components are denoted by like numerals as of the first and second embodiments and the like and will not be further described.

(Illumination Device 1G)
Basically, the illumination device 1G according to the embodiment has a configuration similar to that of the illumination device 1 illustrated in FIG. 1. However, in the illumination device 1G, the optical device 14 (or the optical device 14A or 14B) and a fly-eye lens (in this case, the fly-eye lens 152) disposed in a stage following (on a light-exit side of) the optical device 14 (or 14A or 14B) are so configured as to satisfy a predetermined conditional expression which will be described below. Thus, as will be described later, production of interference fringes in illumination light is more effectively reduced.

More specifically, the illumination device 1G is so configured as to satisfy the following expression (6).

$$\{6 \times f \times \tan(\theta f)\} > Pf \qquad (6)$$

where f is a focal length of the unit cell (the incident-side unit cell C2in, the exit-side unit cell C2out) in the fly-eye lens 152, Pf is a pitch of the unit cell in the fly-eye lens 152, θf is a marginal ray angle in a light flux (a light flux of the incident light L2in) emitted from the optical device 14B (or 14 or 14A) and then entering the fly-eye lens 152.

Moreover, in this case, since each of the incident-side unit cells C2in and the exit-side unit cells C2out has an anisotropic shape (a rectangular shape having the major-axis direction (the X-axis direction) and the minor-axis direction (the Y-axis direction)), the above-described expression (6) is satisfied for both the major-axis direction and the minor-axis direction. In other words, both the following expressions (7) and (8) are satisfied, where a pitch and a marginal ray angle of the unit cell along the X-axis direction (the horizontal direction) as the major-axis direction are Pfh and θfh, respectively, and a pitch and a marginal ray angle of the unit cell along the Y-axis direction (the vertical direction) as the minor-axis direction are Pfv and Bfv, respectively.

$$\{6 \times f \times \tan(\theta fh)\} > Pfh \tag{7}$$

$$\{6 \times f \times \tan(\theta fv)\} > P \tag{8}$$

Next, a reason why such a conditional expression (the above-described expression (6)) is supposed to be set will be described in detail below.

Figure 23:
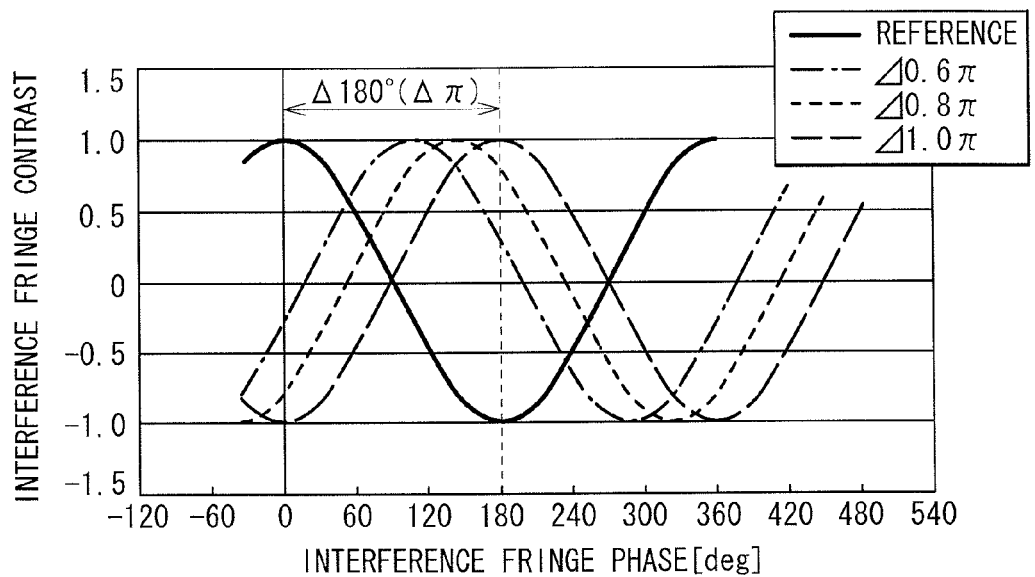
FIG. 23 is a diagram illustrating an example of a relationship between phase and contract in interference fringes.

First, for example, as illustrated in FIG. 23, when phases of a bright state and a dark state in interference fringes are shifted by about 180° (about 1.0 π) or over, the bright state and the dark state are repeated in a time-average manner, and the interference fringes are apparently averaged and become less visible. In this case, shifting the phases thereof by π or over is equivalent to changing the above-described angle 2θ illustrated in FIGS. 9A to 9D into 4θ. More specifically, in the case where an angle between wavefronts of the outgoing light fluxes from two unit cells is 2θ, when a central spot which is in a dark state at a certain point in time is switched into a bright state when the angle between the wavefronts of the outgoing light fluxes is changed into 4θ. When the bright state and the dark state are repeated, the phases thereof are changed by π in the above-described manner, and the brightness of interference fringes is averaged, and is less likely to be observed (become less visible).

Figure 24:
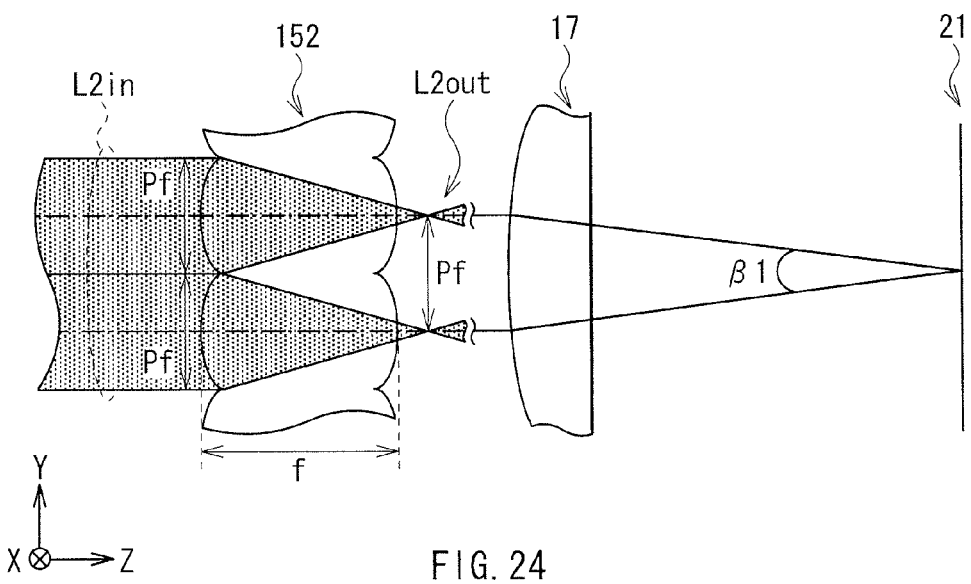
FIG. 24 is a schematic view for describing incident light onto a fly-eye lens disposed in a following stage in the case where the optical device illustrated in FIG. 22 is not included.

For example, as illustrated in FIG. 24, the case where the optical device 14B (or 14 or 14A) is not included will be considered below. In this case, since the incident light L2in which is a parallel light flux enters the fly-eye lens 152, light source images are arranged at intervals equal to the pitch Pf of the unit cell on a light-exit side (the outgoing light L2out) of the fly-eye lens 152. Therefore, the light source images at intervals of the pitch Pf are superimposed on each other on the reflective liquid crystal device 21. Thus, an angle (a relative angle) formed when the light source images at intervals of the pitch Pf are superimposed on each other is β1.

On the other hand, for example, as illustrated in FIGS. 25A and 25B, in the case where the optical device 14B is disposed on a light-incident side of the fly-eye lens 152, the following occurs. A marginal ray angle of the incident light L2in which is a convergent light flux as illustrated in FIG. 25A and a marginal ray angle of the incident light L2in which is a divergent light flux as illustrated in FIG. 25B are θf. A maximum image height of a light source image formed on a light-exit side (the outgoing light L2out) of the fly-eye lens 152 is varied to (Pf−2y) (refer to FIG. 25A) and (Pf+2y) (refer to FIG. 25B) according to the position of the optical device 14B which is vibrating. As a result, the relative angle when the light source images are superimposed on each other is varied with time to β2 (refer to FIG. 25A) and β3 (refer to FIG. 25B). The magnitude relation of the relative angles β1, β2, and β3 at this time is represented by the following expression (9).

$$\beta 2 < \beta 1 < \beta 3 \tag{9}$$

As described above, to cause a phase shift π to reduce production of interference fringes, the relative angles β2 and β3 preferably satisfy the following expression (10). More specifically, when the pitch Pf of the unit cell and an image height y in the fly-eye lens 152 are used, a conditional expression satisfying the expression (10) is the following expression (11). Since the image height y is represented by a relational expression, y=(f×tan θf), the above-described expression (6) is obtained by substitution of the relational expression into the expression (11). Thus, to reduce production of interference fringes in illumination light more effectively, it is clear that it is necessary to satisfy the above-described expression (6) (the expressions (7) and (8)).

$$(2 \times \beta 2) < \beta 3 \tag{10}$$

$$(Pf+2y) > 2 \times (Pf-2y) \tag{11}$$

However, in actuality, a condition for effectively reducing interference fringes is not determined only by the marginal ray angle θf. Therefore, in the embodiment, both the above-described expressions (12) and (13) are preferably further satisfied with use of the optical device 14B. Thus, production of interference fringes is suppressed more effectively.

In other words, in the case where an extending direction (the optical-surface-extending axis As) of the optical surface in the optical device 14B and the arrangement direction of the unit cells in the fly-eye lens 152 are inclined with respect to each other (at an inclination angle α), both the following expressions (12) and (13) are preferably further satisfied. It is to be noted that, in this case, a pitch along the major-axis direction (in this case, the X-axis direction) of the unit cell (with an anisotropic shape) in the fly-eye lens 152 is Pf, and an aspect ratio in each unit cell is X:Y (X>Y).

$$\{6 \times f \times \tan(\theta f \times \sin \alpha)\} > Pf \tag{12}$$

$$\{6 \times f \times \tan(\theta f \times \cos \alpha)\} > \{(Y/X) \times Pf\} \tag{13}$$

In this case, the above-described marginal ray angle θfh along the X-axis direction (the horizontal direction) and the above-described marginal ray angle θfv along the Y-axis direction (the vertical direction) are represented by the following expressions (14) and (15), respectively. Moreover, a movement amount x of the light source image along the X-axis direction (the horizontal direction) and a movement amount y of the light source image along the Y-axis direction (the vertical direction) are represented by the following expressions (16) and (17) with use of the expressions (14) and (15), respectively.

$$\theta fh = (\theta f \times \sin \alpha) \tag{14}$$

$$\theta fv = (\theta f \times \cos \alpha) \tag{15}$$

$$x = f \times \tan(\theta fh) = f \times \tan\{\theta f \times \sin \alpha\} \tag{16}$$

$$y = f \times \tan(\theta fv) = f \times \tan\{\theta f \times \cos \alpha\} \tag{17}$$

Referring to the expression (11), conditional expressions for increasing the movement amounts x and y to be larger than an amount equivalent to a phase shift amount π are the following expressions (18) and (19). Then, substitution of the expressions (16) and (17) into the expressions (18) and (19) leads to the above-described expressions (12) and (13), respectively.

$$(Pf+2x) > 2 \times (Pf-2x) \tag{18}$$

$$\{(Y/X) \times Pf+2y\} > 2 \times \{(Y/X) \times Pf-2y\} \tag{19}$$

Moreover, in the embodiment, for the upper limit condition of the marginal ray angle θf, the following expression (20) is preferably further satisfied. Thus, as will be described later, a light amount loss in the outgoing light (laser light) from the light source section is reduced to improve light use efficiency.

$$\{f \times \tan(\theta f \times \cos \alpha)\} < \{(1/2) \times (Y/X) \times Pf\} \quad (20)$$

In other words, the marginal ray angle θf which is necessary to cause the phase shift π and the inclination angle α in the optical device 14B each have an appropriate range. When the marginal ray angle θf increases to a certain value or more, interference fringes are reduced (becomes less visible), but when the marginal ray angle θf increases too large, the following issue arises.

First, when the marginal ray angle θf exceeds a predetermined angle (acceptable angle θlimit; θf>θlimit), a light amount loss occurs, resulting in a reduction in light use efficiency. More specifically, when the above-described light source image height (y=f×tan θf) exceeds (Pf/2) (f>(Pf/2)), a light flux start entering not only an exit-side unit cell C2out facing a certain incident-side unit cell C2in but also an exit-side unit cell C2out or the like adjacent thereto in the fly-eye lens 152. Then, when such entry of the light flux occurs, a light amount component not entering the reflective liquid crystal device 21 is produced. Therefore, it can be said that when θf≤θlimit (f≤(Pf/2)) is satisfied, such a light amount loss is allowed to be reduced, and light use efficiency is improvable accordingly.

Figure 26A:
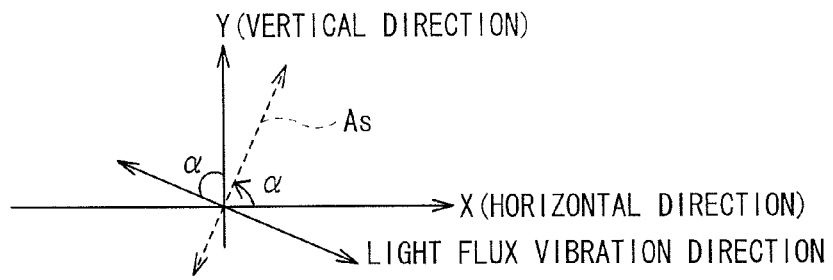
FIGS. 26A and 26B are schematic views for describing a relationship between an inclination angle of an optical surface in the optical device and an aspect ratio of a unit cell in the fly-eye lens.
Figure 26B:
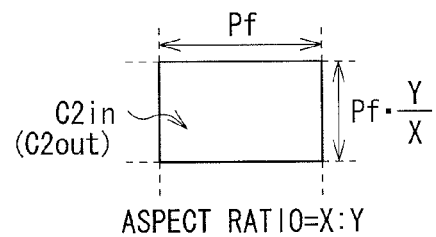

Since the acceptable angle Olimit is limited based on the size of the unit cell in the fly-eye lens 152, the Y-axis direction (a relatively small size) is a limiting condition, where the aspect ratio in the unit cell (the anisotropic shape) is X:Y (X>Y), as described above. Therefore, the above-described conditional expression (20) is obtained by substitution of the above-described expression (17) and the pitch (Pf×(Y/X)) along the Y-axis direction of the unit cell (refer to FIG. 26B) into the above-described conditional expression (f≤(Pf/2)).

[Functions and Effects of Display Unit 3G]

Also in the display unit 3G (the illumination device 1G) according to the embodiment, basically, effects similar to those of the display unit 3 (the illumination device 1) are obtainable by functions similar to those of the display unit 3 (the illumination device 1). In other words, production of interference fringes and speckle noise is allowed to be reduced.

Moreover, specifically in the embodiment, since the optical device 14 (or 14A or 14B) and the fly-eye lens 152 disposed in a stage following the optical device 14 (or 14A or 14B) are so configured as to satisfy the predetermined conditional expression (the above-described expression (6) and the like), production of interference fringes in illumination light is allowed to be effectively reduced.

As described above, interference fringes are produced by each of the two fly-eye lenses 151 and 152. Then, as described in the first embodiment and the like, interference fringes produced by the fly-eye lens 151 disposed in the preceding stage are allowed to be reduced through vibrating the optical device 14 or the like. On the other hand, interference fringes produced by the fly-eye lens 152 disposed in the following stage are allowed to be reduced through satisfying the above conditional expressions described in the embodiment.

It is to be noted that, in the embodiment, a case where the fly-eye lens disposed in the stage following (on the light-exit side of) the optical device 14 (or the optical device 14A or 14B) is the fly-eye lens 152 is described as an example; however, application of a technique of setting the conditional expressions in the embodiment is not limited to this case. More specifically, for example, in the case where the fly-eye lens in the stage following (on the light-exit-side of) the optical device 14 (or the optical device 14A or 14B) is the fly-eye lens 151 as with the above-described illumination device 1E according to Modification 4, the optical device 14 (or the optical device 14A or 14B) and the fly-eye lens 151 are preferably so configured as to satisfy the above-described predetermined conditional expression.

Fourth Embodiment

[Configuration of Fly-Eye Lens 152H]

Figure 27:
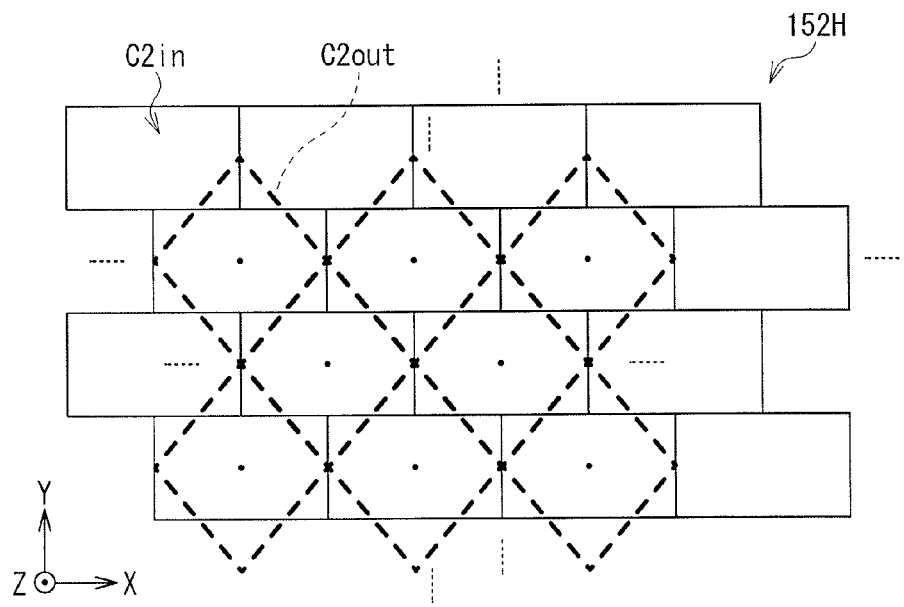
FIG. 27 is a schematic view illustrating a configuration example of a fly-eye lens disposed in a following stage according to a fourth embodiment.

FIG. 27 schematically illustrates a planar configuration example of a fly-eye lens (a fly-eye lens 152H) in a following stage according to a fourth embodiment of the disclosure. An illumination device (a display unit) according to the embodiment has a configuration similar to that of the illumination device 1 (the display unit 3) illustrated in FIG. 1, except that the fly-eye lens 152H is included instead of the fly-eye lens 152. The fly-eye lens 152H corresponds to a specific example of the "second uniformization optical member" in the disclosure. It is to be noted that like components are denoted by like numerals as of the first to third embodiments and the like and will not be further described.

Basically, as with the fly-eye lens 152, the fly-eye lens 152H includes the incident-side array A2in, which is configured of a plurality of unit cells arranged on a light-incident surface S2in thereof where the incident light L2in enters from the fly-eye lens 151. Likewise, the fly-eye lens 152H includes the exit-side array A2out, which is configured of a plurality of unit cells arranged on the light-exit surface S2out thereof where outgoing light exits. More specifically, the fly-eye lens 152H includes a plurality of incident-side unit cells C2in on the light-incident surface S2in thereof and a plurality of exit-side unit cells C2out on the light-exit surface S2out thereof.

However, in the fly-eye lens 152H, unlike the fly-eye lenses 151 and 152, the incident-side unit cells C2in (first unit cells) and the exit-side unit cells C2out (second unit cells) are independently (separately) provided.

In such a fly-eye lens 152H, as with the common unit cells in the fly-eye lenses 151 and 152, the incident-side unit cells C2in and the exit-side unit cells C2out are arranged along both the X-axis direction (the horizontal direction) and the Y-axis direction (the vertical direction). In other words, the incident-side unit cells C2in and the exit-side unit cells C2out are two-dimensionally arranged on the X-Y planes (on the light-incident surface S2in and the light-exit surface S2out, respectively).

More specifically, the incident-side unit cells C2in are arranged without space in a matrix form on the light-incident surface S2in. More specifically, adjacent rows of the incident-side unit cells C2in are shifted from each other (alternately) by a pitch of about ½ (preferably, a pitch of ½) along one or both of the X-axis direction and the Y-axis direction (in this case, the Y-axis direction).

On the other hand, the exit-side unit cells C2out are closely arranged without space on the light-exit surface S2out. More specifically, adjacent rows of the exit-side unit cells C2out along one or both of the X-axis direction and the Y-axis direction (in this case, both the X-axis direction and the Y-axis direction) are shifted from each other (alternately) by a pitch of about ½ (preferably, a pitch of ½). However, each of the incident-side unit cells C2in and each of the exit-side unit cells C2out facing each other are so arranged as to allow central points (a position indicated by a dot in FIG. 27) of the incident-side unit cell C2in and the exit-side unit cell C2out to substantially coincide with each other (preferably, coincide with each other).

Moreover, in the fly-eye lens 152H, as with the common unit cells in the fly-eye lenses 151 and 152, each of the incident-side unit cells C2in has an anisotropic shape (in this case, a rectangular shape) having a major-axis direction along the X-axis direction and a minor-axis direction along the Y-axis direction. Then, an aspect ratio in the anisotropic shape (the rectangular shape) is adjusted to be substantially equal (preferably equal) to the aspect ratio in the reflective liquid crystal device 21.

On the other hand, each of the exit-side unit cells C2out has a shape extending (protruding) along both the X-axis direction and the Y-axis direction. More specifically, compared to the above-described incident-side unit cells C2in (with an anisotropic shape), each of the exit-side unit cells C2out has a substantially isotropic shape (preferably, an isotropic shape) along the X-axis direction and the Y-axis direction. In this case, as an example, each of the exit-side unit cells C2out has a rhombic shape (a rhombic shape having diagonal lines with lengths substantially equal (preferably equal) to each other along the X-axis direction and the Y-axis direction).

In this case, the length in the X-axis direction (the horizontal direction) of each of the exit-side unit cells C2out is preferably equal to or smaller than the length in the X-axis direction (the major-axis direction) of each of the incident-side unit cells C2in. Moreover, the length in the Y-axis direction (the vertical direction) of each of the exit-side unit cells C2out is preferably larger than the length in the Y-axis direction (the minor-axis direction) of each of the incident-side unit cells C2in. More specifically, the length in the Y-axis direction of each of the exit-side unit cells C2out is preferably equal to a length obtained by multiplying the length in the X-axis direction (the horizontal direction) of each of the exit-side unit cells C2out by the aspect ratio in the above-described incident-side unit cell C2in×2 (length in Y-axis direction=(length in X-axis direction×aspect ratio×2)). This is a relational expression obtained by a condition of close arrangement of the above-described exit-side unit cells C2out, and more specifically, the length in the Y-axis direction of each of the exit-side unit cells C2out is derived as follows. It is to be noted that preferable lengths in the X-axis direction (a first direction) and the Y-axis direction (a second direction) of each of the exit-side unit cells C2out are similar in the following modifications (Modifications 6 to 8) which will be described later.

Length in $Y$-axis direction of exit-side unit cell $C2out =$ (length in $Y$-axis direction in incident-side unit cell $C2in \times 2) =$ {length in $X$-axis direction of incident-side unit cell $C2in \times$ (length in $Y$-axis direction of incident-side unit cell $C2in$/length in $X$-axis direction of incident-side unit cell $C2in) \times 2$} =

(length in $X$-axis direction of incident-side unit cell $C2in \times$ aspect ratio $\times 2) =$ (length in $X$-axis direction of exit-side unit cell $C2out \times$ aspect ratio $\times 2$)

[Functions and Effects of Fly-Eye Lens 152H]

Also in the illumination device (the display unit) according to the embodiment, effects similar to those of the above-described first embodiment and the like are obtainable by functions similar to those of the above-described first embodiment and the like. In other words, production of interference fringes and speckle noise is allowed to be reduced.

Moreover, specifically in this embodiment, since the fly-eye lens 152H with the above-described configuration is included, a function of reducing a light amount loss is obtainable. Such a function of reducing a light amount loss will be described in detail below in comparison with comparative examples (Comparative Examples 1 and 2) with respect to the embodiment.

Figure 28:
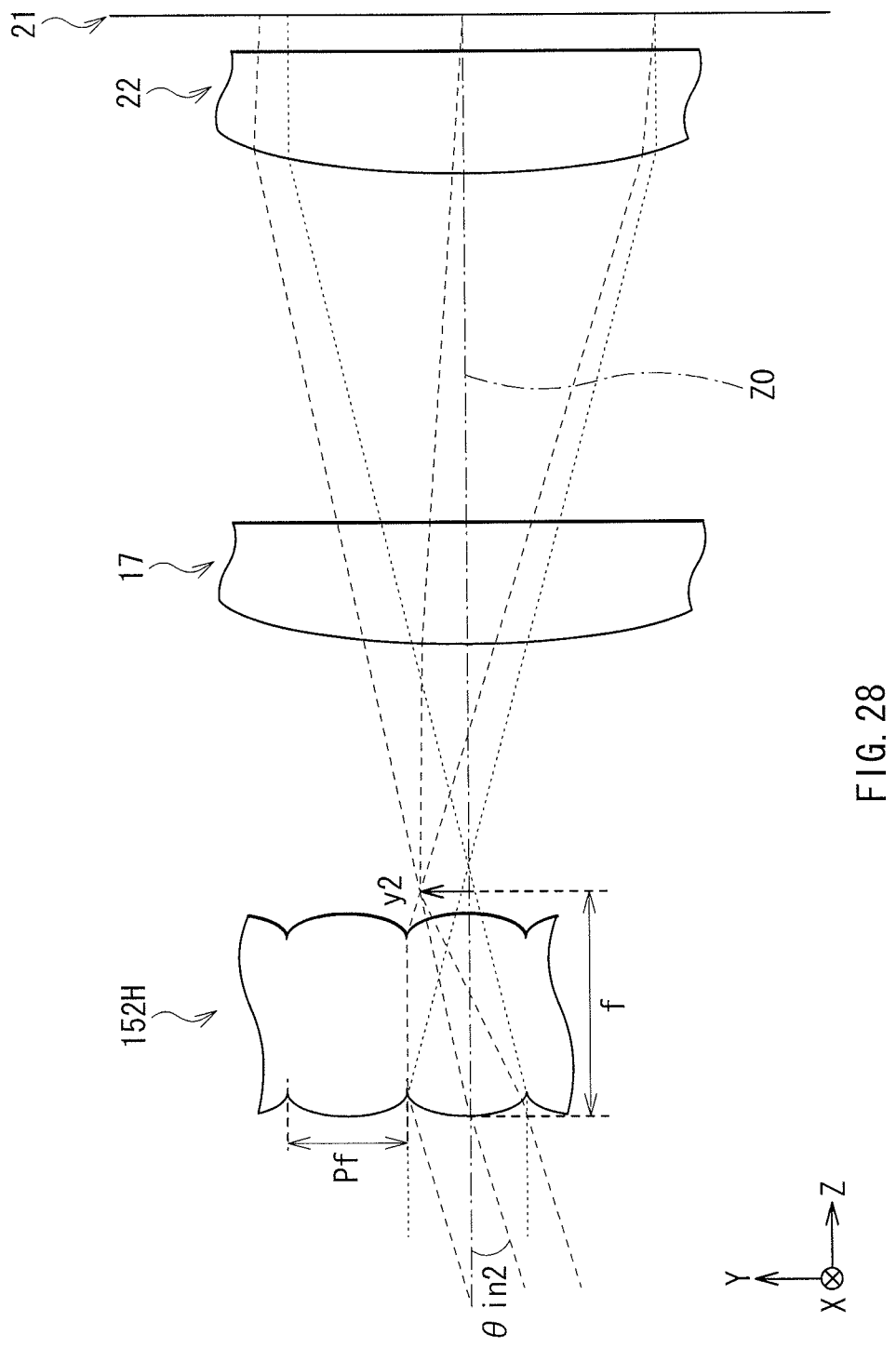
FIG. 28 is a schematic view for describing an acceptable angle for an incident angle of incident light onto the fly-eye lens disposed in the following stage illustrated in FIG. 27.

First, in the illumination device having a double-stage configuration configured of two fly-eye lenses 151 and 152H, for example, as illustrated in FIG. 28, incident light L2in onto the fly-eye lens 152H disposed in the following stage is a light flux having a predetermined incident angle θin2. More specifically, the incident angle θin2 is determined by the following expression (21) with use of a focal length f(relay) of a relay lens (the sub-condenser lenses 161 and 162) and a light flux diameter φ1 in the incident light L1in onto the fly-eye lens 151 disposed in the preceding stage.

$$\theta in2 = \text{Arc sin } \{0.5 \times \phi 1/f(relay)\} \quad (21)$$

In the case where the incident light L2in configured of a light flux with the above-described incident angle θin2 enters the fly-eye lens 152H in a second stage, when the incident angle θin2 (an obliquely incident angle) is equal to or smaller than a predetermined angle (the above-described acceptable angle: θin2≤θlimit), a light amount loss does not occur. On the other hand, when the incident angle θin2 exceeds the acceptable angle θlimit (θin2>θlimit), a light amount component protruding from the reflective liquid crystal device 21 is produced during irradiation of the reflective liquid crystal device 21, thereby causing a light amount loss. When such a light amount loss occurs, use efficiency of outgoing light from the laser light source is impaired to cause a reduction in brightness (luminance) when an image is displayed.

It is to be noted that the acceptable angle θlimit for the incident angle θin2 in the incident light L2in onto the fly-eye lens 152H is determined as follows. For example, as illustrated in FIG. 28, the following expressions (22) and (23) are established for θin2 and θlimit, where a focal length of the fly-eye lens 152H is f, a separation pitch (a pitch of the unit cell) in the Y-axis direction (the vertical direction) in the fly-eye lens 152H is Pf, and a shift from the optical axis Z0 toward the Y-axis direction at a position of the focal length f is y2.

$$y2 = \{f \times \tan(\theta in2)\} \leq (Pf/2) \quad (22)$$

$$\{f \times \tan(\theta limit)\} = (Pf/2) \quad (23)$$

As illustrated in the above-described FIGS. 5A and 27, each of the common unit cells (the incident-side unit cells C1in and the exit-side unit cells C1out) in the fly-eye lens 151 and the incident-side unit cells C2in in the fly-eye lens 152H has an anisotropic shape. More specifically, each of them has a rectangular shape with the major-axis direction along the X-axis direction and the minor-axis direction along the Y-axis direction, and the aspect ratio of the rectangular shape is adjusted to be substantially equal (preferably equal) to the aspect ratio in a reflective liquid crystal device 21. Accordingly, the separation pitch Pf (the pitch of the incident-side unit cell C2in) in the Y-axis direction (the vertical direction) in the fly-eye lens 152H is shorter than that in the X-axis direction (the horizontal direction); therefore, referring to the above-described expression (23), the acceptable angle θlimit in the Y-axis direction (the vertical direction) becomes smaller than that in the X-axis direction (the horizontal direction) to easily cause a light amount loss. Thus, a direction (the minor-axis direction) where a light amount loss easily occurs is present due to the anisotropic shape of each of the unit cells (the incident-side unit cells C1in and C2in and the exit-side unit cells C1out) when the reflective liquid crystal device 21 is irradiated with illumination light emitted from the fly-eye lens 152H.

Comparative Example 1

In a fly-eye lens in a following stage according to Comparative Example 1 with respect to the embodiment (corresponding to the fly-eye lens 152 according to the first embodiment), the following can be said based on these factors. The fly-eye lens 152 has a unit cell configuration similar to that of the fly-eye lens 151 disposed in the preceding stage (an anisotropic shape common to the incident-side unit cells C2in and the exit-side unit cells C2out); therefore, the following improvement may be necessary.

More specifically, in this case, the X-axis direction is the major-axis direction and the Y-axis direction is the minor-axis direction; therefore, as described above, the acceptable angle θlimit in the Y-axis direction (the vertical direction) is smaller than that in the X-axis direction (the horizontal direction). Accordingly, when laser light having a FFP with a wide divergent angle in the X-axis direction enters as the incident light L2in, a light amount loss is less likely to occur. On the other hand, when laser light having an FFP with a wide divergent angle in the Y-axis direction enters as the incident light L2in, a light amount loss easily occurs.

Figure 29:
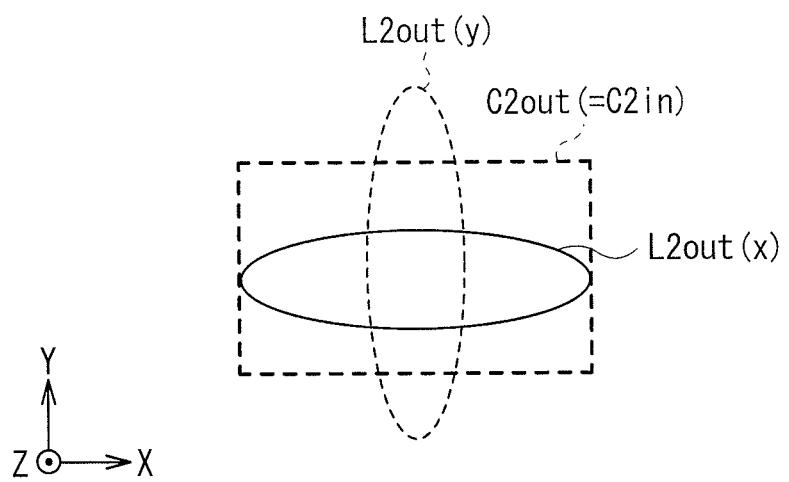
FIG. 29 is a schematic view illustrating a function of a fly-eye lens disposed in a following stage according to Comparative Example 1 with respect to the fourth embodiment.

It is to be noted that, in FIG. 29, examples of light amount distributions of the outgoing light L2out in the case where laser light having an FFP with a wide divergent angle in the X-axis direction and laser light having an FFP with a wide divergent angle in the Y-axis direction enter as the incident light L2in are illustrated by L2out(x) and L2out(y), respectively, and this also applies to the following.

Comparative Example 2

Figure 30A:
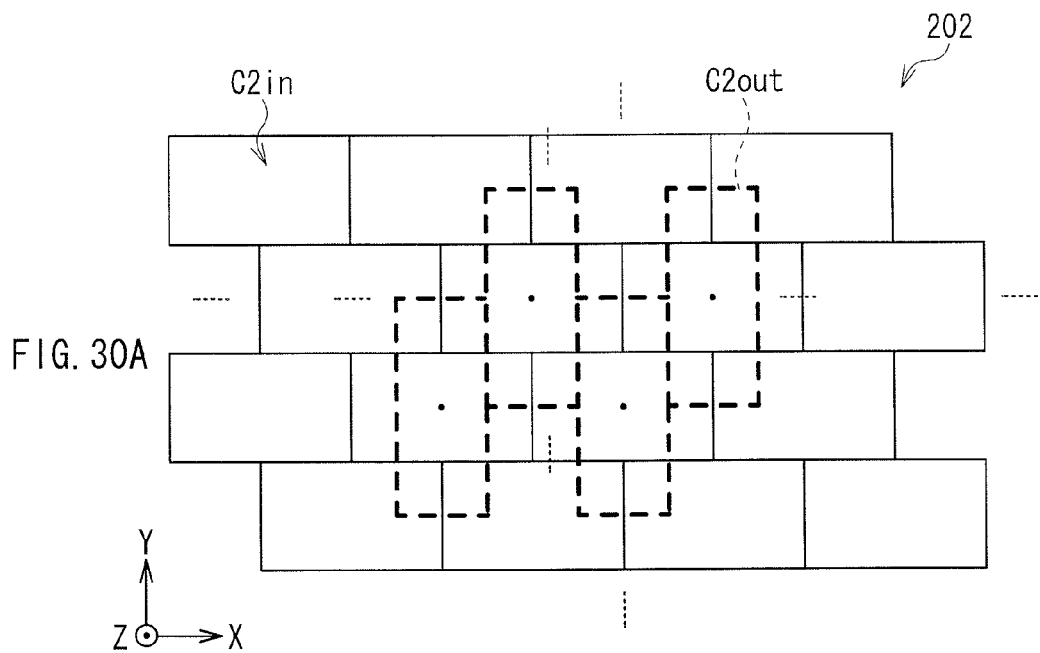
FIGS. 30A and 30B are schematic views illustrating a configuration and a function of a fly-eye lens disposed in a following stage according to Comparative Example 2 with respect to the fourth embodiment.

On the other hand, in a fly-eye lens 202 disposed in a following stage according to Comparative Example 2 with respect to the embodiment illustrated in, for example, FIG. 30A, the following improvement may be necessary. More specifically, in the fly-eye lens 202 according to Comparative Example 2, while each of the incident-side unit cells C2in has a rectangular shape with the major-axis direction along the X-axis direction and the minor-axis direction along the Y-axis direction, each of the exit-side unit cells C2out has a rectangular shape with the major-axis direction along the Y-axis direction and the minor-axis direction along the X-axis direction.

Figure 30B:
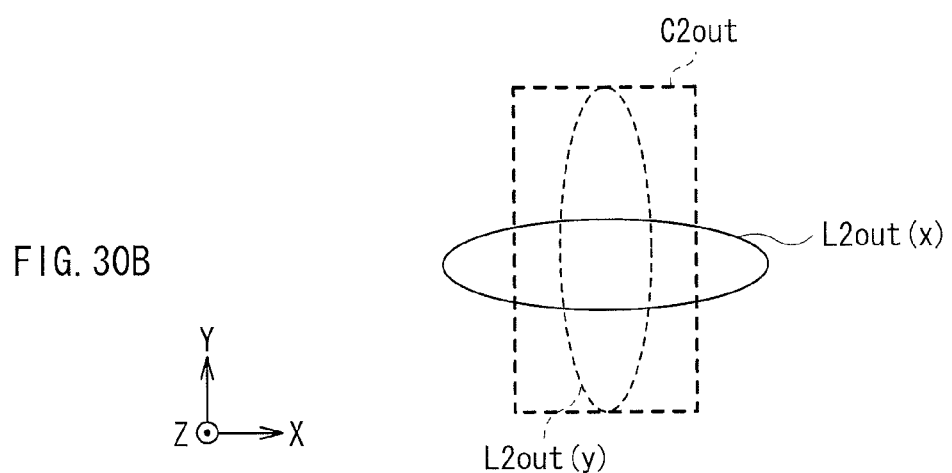

Therefore, in Comparative Example 2, contrary to the above-described Comparative Example 1, the acceptable angle θlimit in the X-axis direction (the horizontal direction) is smaller than that in the Y-axis direction (the vertical direction). Accordingly, when laser light having an FFP with a wide divergent angle in the Y-axis direction enters as the incident light L2in, a light amount loss is less likely to occur. On the other hand, when laser light having an FFP with a wide divergent angle in the X-axis direction enters as the incident light L2in, a light amount loss easily occurs (refer to, for example, FIG. 30B).

Thus, in Comparative Examples 1 and 2 with respect to the embodiment, in addition to the common unit cells (the incident-side unit cells C1in and the exit-side unit cells C1out) in the fly-eye lens 151, each of the incident-side unit cells C2in and the exit-side unit cells C2out in the fly-eye lenses 152 and 202 has an anisotropic shape. In other words, unlike the fly-eye lens 152H in the embodiment, each of the exit-side unit cells C2out in the fly-eye lenses 152 and 202 disposed in the following stage also has a shape extending along only one of the X-axis direction (the horizontal direction) and the Y-axis direction (the vertical direction) (an anisotropic shape with respect to the X-axis direction and the Y-axis direction). Therefore, as described above, a light amount loss may easily occur depending on a spreading direction of the divergent angle in the FFP of the incident light L2in (the laser light).

It is to be noted that the spreading direction (profile) of a divergent angle in a FFP of laser light emitted from the laser light source and a polarization direction of the laser light are determined specifically for the laser light source. Therefore, in each laser light source in the light source section, when the spreading direction of the divergent angle in the FFP of laser light is oriented in the major-axis direction of the exit-side unit cell C2out in the fly-eye lens disposed in the following stage, it is considered that a light amount loss is less likely to occur also in the unit cell configurations in the above-described Comparative Examples 1 and 2.

However, even if the spreading direction of the divergent angle in the FFP of laser light is the same, the polarization direction of the laser light may vary depending on the kind of the laser light source. More specifically, in two laser light sources in which the spreading direction of the divergent angle in the FFP of laser light is oriented in, for example, the vertical direction, in some cases, the polarization direction of laser light in one of the laser light sources may be oriented in the horizontal direction, and the polarization direction of laser light in the other laser light source is oriented in the vertical direction. In such a case, in the unit cell configurations in the above-described Comparative Examples 1 and 2, as described above, in the case where an image is displayed with use of polarization characteristics in the reflective liquid crystal device 21 and the polarizing beam splitter 23 (a typical technique), a difference between the polarization directions of laser light in these laser light sources causes inconvenience.

Even in such a case, when the polarization directions of laser light are aligned with each other with use of a retardation film (such as a half-wave plate), a light amount loss is less likely to occur, and it is possible to avoid the inconvenience when displaying an image. However, in this case, since the retardation film is provided, and allows only some polarization components to pass therethrough, a light amount loss still occurs, and brightness of illumination light is reduced. Moreover, since the retardation film is provided, there is a disadvantage that the number of components is increased to cause an increase in cost. Moreover, it may be difficult to align the FFPs (the spreading direction of the divergent angle) of respective laser light through rotationally disposing laser light sources because of, for example, actual design on the illumination device (an issue of an outer shape, or the like). It can be said from these reasons that it is necessary to make a light amount loss less likely to occur without depending on the spreading direction of the divergent angle in the FFP of the incident light L2in (laser light).

Function of this Embodiment

In the illumination device (the display unit) according to this embodiment, for example, as illustrated in FIG. 27, first, each of a plurality of incident-side unit cells C2in arranged on the light-incident surface S2in in the fly-eye lens 152H disposed in the following stage has an anisotropic shape (a rectangular shape) having the major-axis direction along the X-axis direction and the minor-axis direction along the Y-axis direction. On the other hand, each of a plurality of exit-side unit cells C2out arranged on the light-exit surface S2out in the fly-eye lens 152H has a shape extending along both the X-axis direction and the Y-axis direction (a substantially isotropic shape along the X-axis direction and the Y-axis direction, compared to the incident-side unit cells C2in).

Figure 31:
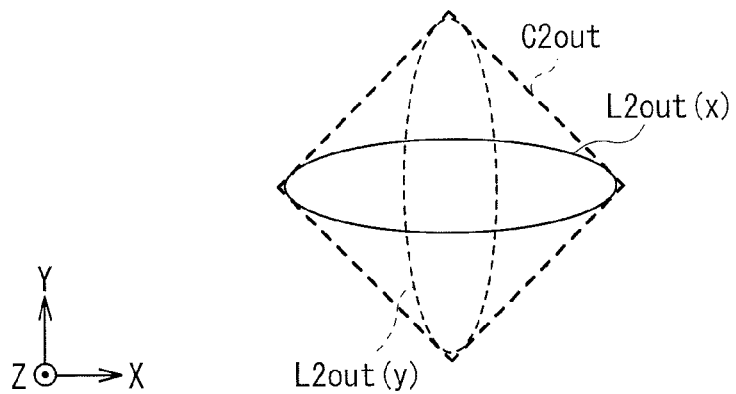
FIG. 31 is a schematic view illustrating a function of the fly-eye lens disposed in the following stage illustrated in FIG. 27.

Therefore, in the embodiment, unlike the above-described Comparative Examples 1 and 2, both the acceptable angle θlimit in the X-axis direction (the horizontal direction) and the acceptable angle θlimit in the Y-axis direction (the vertical direction) have a large value, and are substantially equal (preferably equal) to each other. Accordingly, even if the unit cells (the incident-side unit cells C2in) on the incident surface S2in each have the above-described anisotropic shape, and the incident angle θin2 of the incident light L2in onto the fly-eye lens 152H disposed in the following stage from the fly-eye lens 151 disposed in the preceding stage is oriented along the minor-axis direction (in this case, the Y-axis direction), the incident angle θin2 easily falls within a range equal to or smaller than the predetermined acceptable angle θlimit. As a result, even if one of laser light having a FFP with a wide divergent angle in the X-axis direction and laser light having an FFP with a wide divergent angle in the Y-axis direction enters as the incident light L2in, a light amount loss is less likely to occur (for example, refer to FIG. 31). That is, in the embodiment, unlike Comparative Examples 1 and 2, a light amount loss is less likely to occur without depending on the spreading direction of the divergent angle in the FFP of the incident light L2in (laser light). In other words, a light amount loss is allowed to be reduced without consideration of (without concern for) the above-described difference between the polarization directions of laser light or possibility of rotational disposition of the laser light source.

It is to be noted that examples of the above-described respective parameters in the embodiment include the following parameters, and the parameters are so adjusted as to satisfy the above-described condition of θin2≦θlimit.

Focal length f (relay) of relay lens=13.2 (mm)
Light flux diameter φ1 in incident light L1in onto fly-eye lens 151=3 (mm)
(a parallel light flux diameter in the case where all light fluxes emitted from the laser light source are coupled)

Incident angle θin2=Arcsin{0.5×φ1/f(relay)}=6.52(°)

(In actuality, the incident angle θin2 is θin2=6.52°±2.50°=9.02°, because a divergent angle of about 2.50° is added by the optical device 14 or the like; however, in actuality, an effective angle of θin2 is about 7°, because a light amount in a tail of a light amount distribution in the incident light L2in may be excluded)

Focal length f of fly-eye lens 152H=0.46 (mm)
Separation pitch Pf in Y-axis direction in fly-eye lens 152H=0.116 (mm)
Acceptable angle θlimit=7.19)(° (from the above-described expressions (22) and (23))

Thus, in the embodiment, in the fly-eye lens 152H, each of a plurality of incident-side unit cells C2in arranged on the light-incident surface S2in has an anisotropic shape having the major-axis direction along the X-axis direction and the minor-axis direction along the Y-axis direction. Moreover, each of a plurality of exit-side unit cells C2out arranged on the light-exit surface S2out of the fly-eye lens 152H has a shape extending along both the X-axis direction and the Y-axis direction. Therefore, the incident angle θin2 of the incident light L2in onto the fly-eye lens 152H easily falls within a range equal to or smaller than the predetermined angle θlimit. Thus, in addition to the effects described in the first embodiment and the like, when a stage (in this case, the reflective liquid crystal device 21) following the fly-eye lens 152H is irradiated with the outgoing light L2out (illumination light) from the fly-eye lens 152H, a light amount loss is allowed to be reduced (light use efficiency is improvable).

Moreover, since a light amount loss is allowed to be reduced without consideration of the above-described difference between the polarization directions of laser light, possibility of rotational disposition of the laser light source, and the like, an increase in cost caused by addition of a member such as the above-described retardation film or the like is avoidable, and downsizing of the optical system (downsizing of the unit) is achievable.

Next, modifications (Modifications 6 to 8) of the above-described fourth embodiment will be described below. It is to be noted that like components are denoted by like numerals as of the fourth embodiment and the like and will not be further described.

(Modification 6)

Figure 32A:
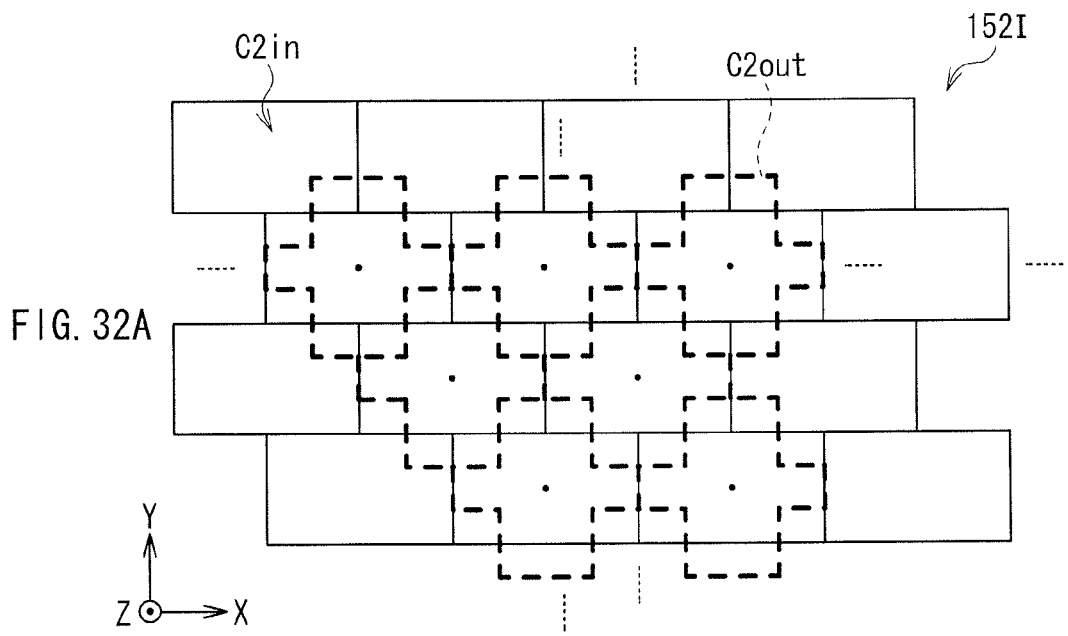
FIGS. 32A and 32B are schematic views illustrating a configuration example and a function of a fly-eye lens disposed in a following stage according to Modification 6.
Figure 32B:
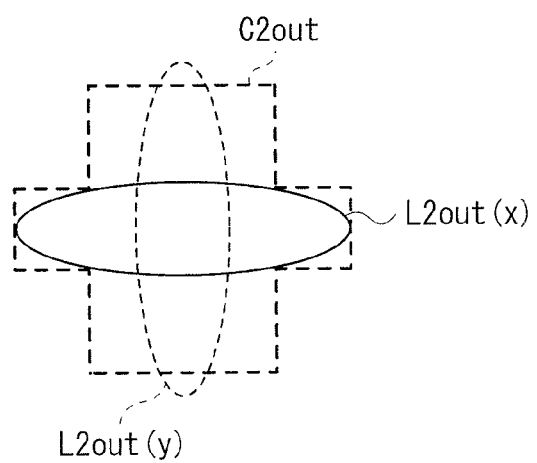

FIG. 32A schematically illustrates a configuration example of a fly-eye lens (a fly-eye lens 152I) disposed in a following stage according to Modification 6. The fly-eye lens 152I also corresponds to a specific example of the "second uniformization optical member" in the disclosure. In the fly-eye lens 152I in this modification, as with the fly-eye lens 152H in the fourth embodiment, a plurality of incident-side unit cells C2in on the light-incident surface S2in and a plurality of exit-side unit cells C2out on the light-exit surface S2out are independently provided.

Moreover, as with the fly-eye lens 152H, the incident-side unit cells C2in are arranged without space in a matrix form on the light-incident surface S2in, and the exit-side unit cells C2out are closely arranged without space on the light-exit surface S2out. More specifically, adjacent rows of the incident-side unit cells C2in along the Y-axis direction are shifted from each other (alternately) by a pitch of about ½ (preferably, a pitch of ½). Moreover, adjacent rows of the exit-side unit cells C2out along both the X-axis direction and the Y-axis direction are shifted from each other (alternately) by a pitch of about ½ (preferably, a pitch of ½). Then, each of the incident-side unit cells C2in and each of the exit-side unit cells C2out facing each other are so arranged as to allow central points of the incident-side unit cell C2in and the exit-side unit cell C2out to substantially coincide with each other (preferably, coincide with each other).

Moreover, as with the fly-eye lens 152H, while each of the incident-side unit cells C2in has an anisotropic shape (a rectangular shape) having the major-axis direction along the X-axis direction and the minor-axis direction along the Y-axis direction, each of the exit-side unit cells C2out has a shape extending along both the X-axis direction and the Y-axis direction. More specifically, compared to the incident-side unit cells C2in (with an anisotropic shape), each of the exit-side unit cells C2out has a substantially isotropic (preferably, isotropic) shape along the X-axis direction and the Y-axis direction.

However, in the fly-eye lens 152I, unlike the fly-eye lens 152H, each of the exit-side unit cells C2out has a cross shape (a cross shape with axes along the X-axis direction and the Y-axis direction, the axes having lengths substantially equal (preferably equal) to each other).

Also in the modification using the fly-eye lens 152I with such a configuration, effects similar to those of the fourth embodiment are obtainable by functions similar to those of the fourth embodiment. In other words, both the acceptable angle θlimit in the X-axis direction (the horizontal direction) and the acceptable angle θlimit in the Y-axis direction (the vertical direction) have a large value, and are substantially equal (preferably equal) to each other. Therefore, even if the unit cells (the incident-side unit cells C2 in) on the incident surface S2in each have the above-described anisotropic shape, and the incident angle θin2 of the incident light L2 in onto the fly-eye lens 152I disposed in the following stage from the fly-eye lens 151 disposed in the preceding stage is oriented along the minor-axis direction (the Y-axis direction), the incident angle θin2 easily falls within a range equal to or smaller than the predetermined acceptable angle θlimit. As a result, even if one of laser light having a FFP with a wide divergent angle in the X-axis direction and laser light having an FFP with a wide divergent angle in the Y-axis direction enters as the incident light L2 in, a light amount loss is less likely to occur (for example, refer to FIG. 32A). Therefore, when a stage (in this case, the reflective liquid crystal device 21) following the fly-eye lens 152I is irradiated with the outgoing light L2out (illumination light) from the fly-eye lens 152I, a light amount loss is allowed to be reduced (light use efficiency is improvable).

(Modifications 7 and 8)

Figure 33A:
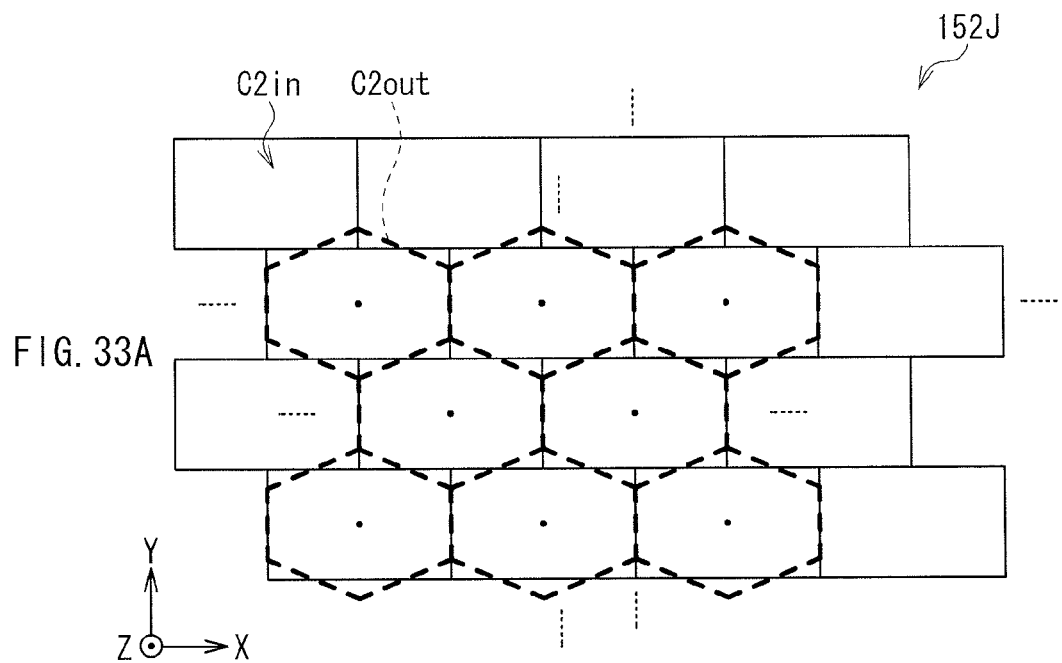
FIGS. 33A and 33B are schematic views illustrating configuration examples of fly-eye lenses disposed in a following stage according to Modifications 7 and 8, respectively.
Figure 33B:
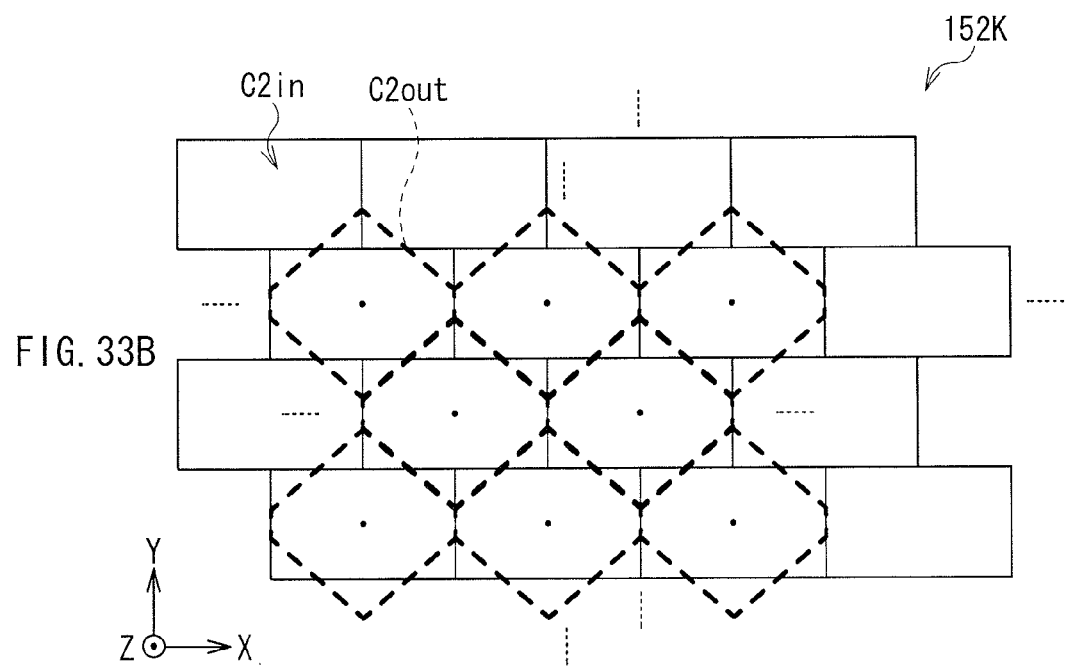

FIG. 33A schematically illustrates a configuration example of a fly-eye lens (a fly-eye lens 152J) disposed in a following stage according to Modification 7. Moreover, FIG. 33B schematically illustrates a configuration example of a fly-eye lens (a fly-eye lens 152K) disposed in a following stage according to Modification 8. Each of these fly-eye lenses 152J and 152K also corresponds to a specific example of the "second uniformization optical member" in the disclosure.

In the fly-eye lenses 152J and 152K according to Modifications 7 and 8, as with the fly-eye lens 152H in the fourth embodiment, a plurality of incident-side unit cells C2in on the light-incident surface S2in and a plurality of exit-side unit cells C2out on the light-exit surface S2out are independently provided.

Moreover, as with the fly-eye lens 152H, the incident-side unit cells C2 in are arranged without space in a matrix form on the light-incident surface S2in, and the exit-side unit cells C2out are closely arranged without space on the light-exit surface S2out. More specifically, adjacent rows of the incident-side unit cells C2 in along the Y-axis direction are shifted from each other (alternately) by a pitch of about ½ (preferably, a pitch of ½). Moreover, adjacent rows of the exit-side unit cells C2out along both the X-axis direction and the Y-axis direction are shifted from each other (alternately) by a pitch of about ½h (preferably, a pitch of ½). Then, each of the incident-side unit cells C2in and each of the exit-side unit cells C2out facing each other are so arranged as to allow central points of the incident-side unit cell C2in and the exit-side unit cell C2out to substantially coincide with each other (preferably, coincide with each other).

Moreover, as with the fly-eye lens 152H, while each of the incident-side unit cells C2in has an anisotropic shape (a rectangular shape) having the major-axis direction along the X-axis direction and the minor-axis direction along the Y-axis direction, each of the exit-side unit cells C2out has a shape extending along both the X-axis direction and the Y-axis direction. More specifically, compared to the incident-side unit cells C2in (with an anisotropic shape), each of the exit-side unit cells C2out has a substantially isotropic (preferably, isotropic) shape along the X-axis direction and the Y-axis direction.

However, in the fly-eye lenses 152J and 152K, unlike the fly-eye lens 152H, each of the exit-side unit cells C2out has a hexagonal shape. It is to be noted that, in the fly-eye lens 152K, compared to the fly-eye lens 152J, a length in the X-axis direction and a length in the Y-axis direction are closer to each other (an aspect ratio is closer to 1), and the hexagonal shape in the exit-side unit cell C2out is a more isotropic shape.

Figure 34A:
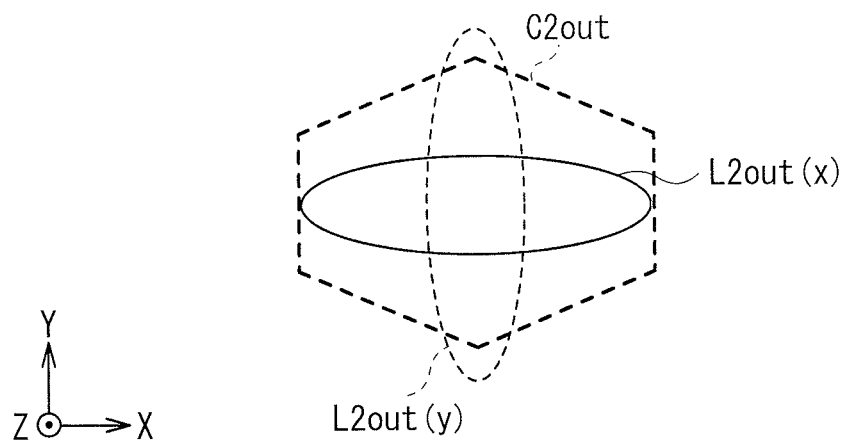
FIGS. 34A and 34B are schematic views illustrating functions of the fly-eye lenses disposed in the following stage according to Modifications 7 and 8, respectively.
Figure 34B:
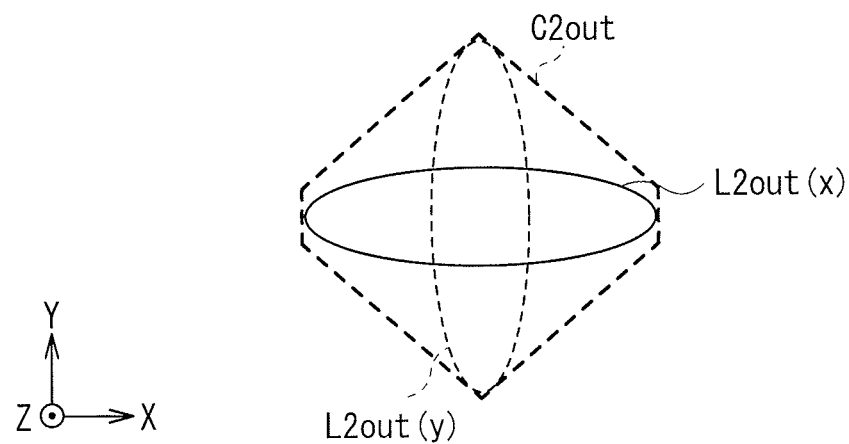

Also in Modifications 7 and 8 using the fly-eye lenses 152J and 152K with these configurations, respectively, effects similar to those of the fourth embodiment are obtainable by functions similar to those of the fourth embodiment. In other words, both the acceptable angle θlimit in the X-axis direction (the horizontal direction) and the acceptable angle θlimit in the Y-axis direction (the vertical direction) have a large value, and are substantially equal (preferably equal) to each other. Therefore, even if the unit cells (the incident-side unit cells C2 in) on the incident surface S2in each have the above-described anisotropic shape, and the incident angle θin2 of the incident light L2in onto the fly-eye lens 152J or 152K disposed in the following stage from the fly-eye lens 151 disposed in the preceding stage is oriented along the minor-axis direction (the Y-axis direction), the incident angle θin2 easily falls within a range equal to or smaller than the predetermined acceptable angle θlimit. As a result, even if one of laser light having a FFP with a wide divergent angle in the X-axis direction and laser light having an FFP with a wide divergent angle in the Y-axis direction enters as the incident light L2in a light amount loss is less likely to occur (Modification 7: for example, refer to FIG. 34A, Modification 8: for example, refer to FIG. 34B). Therefore, when a stage (the reflective liquid crystal device 21) following the fly-eye lens 152J or 152K is irradiated with the outgoing light L2out (illumination light) from the fly-eye lens 152J or 152K, a light amount loss is allowed to be reduced (light use efficiency is improvable).

It is to be noted that, as described above, compared to the fly-eye lens 152J, in the fly-eye lens 152K, the hexagonal shape of each of the exit-side unit cells C2out is a more isotropic shape. Therefore, it can be said that, in the fly-eye lens 152K, compared to the fly-eye lens 152J, a light amount loss is allowed to be further reduced (light use efficiency is further improvable).

Fifth Embodiment

[Configuration of Display Unit 3H]

Figure 35:
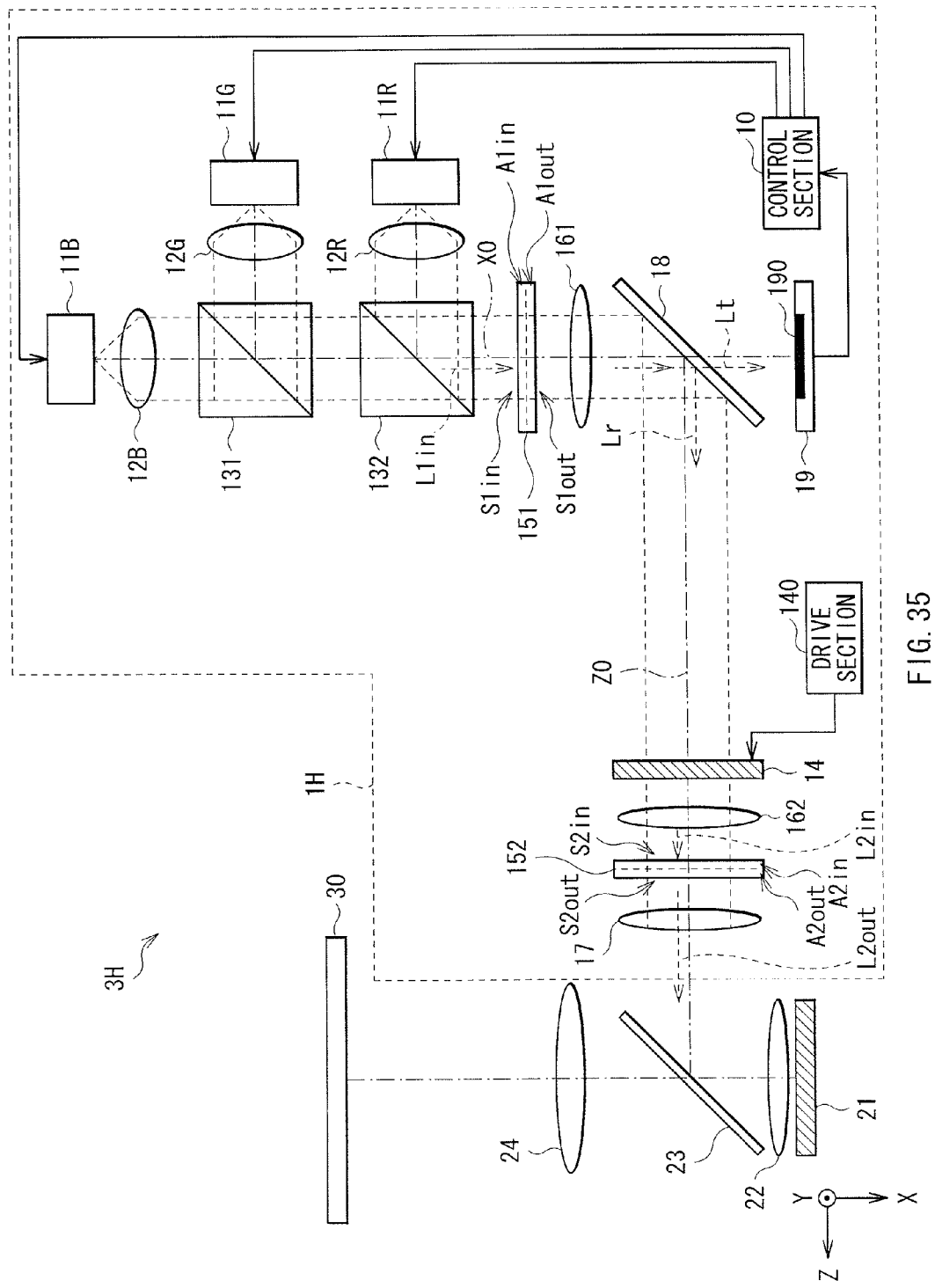
FIG. 35 is a schematic view illustrating an entire configuration example of a display unit according to a fifth embodiment.
Figure 36:
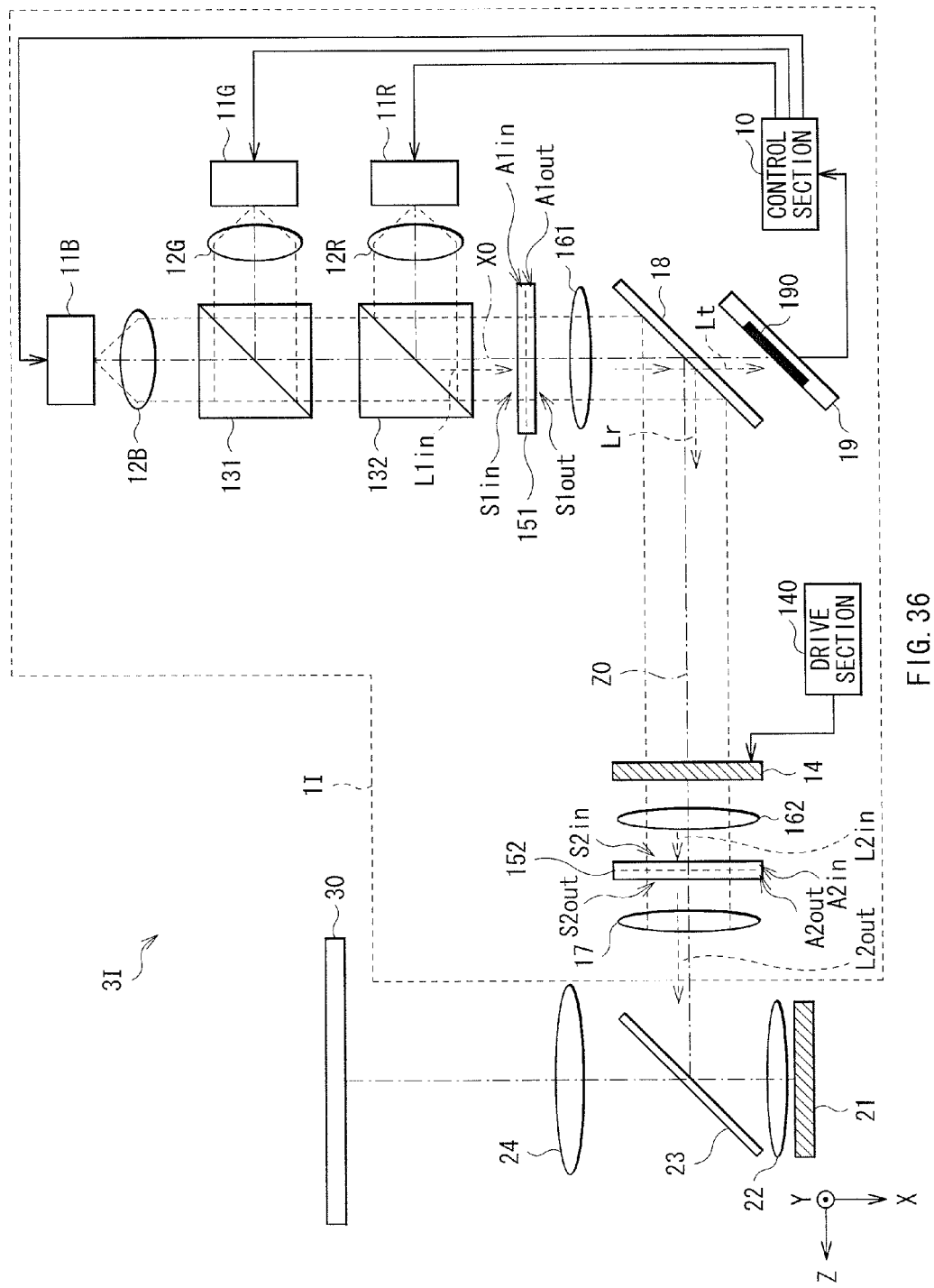
FIG. 36 is a schematic view illustrating another entire configuration example of the display unit according to the fifth embodiment.

FIG. 35 schematically illustrates a configuration example of a display unit (a display unit 3H) according to a fifth embodiment of the disclosure. Moreover, FIG. 36 schematically illustrates a configuration example of another display unit (a display unit 3I) according to this embodiment. These display units 3H and 3I each have a configuration similar to that of the display unit 3 illustrated in FIG. 1, except that instead of the illumination device 1, the display units 3H and 3I include illumination devices 1H and 1I, respectively. It is to be noted that like components are denoted by like numerals as of the first to fourth embodiments and the like and will not be further described.

(Illumination Device 1H)

The illumination device 1H has a configuration similar to that of the illumination device 1 illustrated in FIG. 1, except that directions of optical axes of some optical systems are changed (rotated by 90°), and a partially transmissive mirror 18, a light-receiving device 19, and a control section 10 are further included.

In this case, more specifically, changing the directions of the optical axes of some optical systems means orienting, in the X-axis direction, optical axes (optical axes X0) of the blue laser 11B, the coupling lens 12B, the dichroic prisms 131 and 132, the fly-eye lens 151, and the sub-condenser lens 161. In other words, while, in the illumination device 1, the optical axes (the optical axes Z0) of these optical systems are oriented in a Z-axis direction, in the illumination device 1H, the optical axes of these optical systems are rotated by 90° to be oriented in the X-axis direction. It is to be noted that, while, in the illumination device 1, optical-axis directions of the red laser 11R, the green laser 11G, and the coupling lenses 12R and 12G are oriented in the X-axis direction, in the illumination device 1H, the optical-axis directions of them are rotated by 90° to be oriented in the Z-axis direction.

The partially transmissive mirror 18 is disposed on an optical path between the sub-condenser lens 161 and the optical device 14. The partially transmissive mirror 18 has a function of reflecting most of a light flux incident thereon from the fly-eye lens 151 to emit the light flux as reflected light Lr toward the optical device 14 and allowing a part of the incident light flux to pass therethrough, and then emitting the incident light flux as transmitted light Lt toward the light-receiving device 19.

The light-receiving device 19 is a device receiving the light flux (the transmitted light Lt) passing through the partially transmissive mirror 18 on a light-receiving surface 190 thereof, and functions as a light amount detector detecting (monitoring) a light amount (a received light amount) of the light flux. In this embodiment, the light-receiving device 19 is disposed on an optical path in a stage following the fly-eye lens 151. More specifically, in an example illustrated in FIG. 35, the light-receiving device 19 is disposed on an optical path between the fly-eye lens 151 and the fly-eye lens 152. More specifically, the light-receiving device 19 is disposed on an optical path of the transmitted light Lt passing through the partially transmissive mirror 18 between the fly-eye lens 151 and the optical device 14 (between the sub-condenser lens 161 and the optical device 14).

It is to be noted that, in such a light-receiving device 19, to prevent detection of excessive light including stray light in the optical path, reflected light from the reflective liquid crystal device 21, and the like, an area of the light-receiving surface 190 is so set as to be sufficiently smaller than a light flux area of the transmitted light Lt. Moreover, in the light-receiving device 19 in the illumination device 1H, unlike the light-receiving device 19 in the illumination device 1I which will be described later, a direction of a normal to the light-receiving surface 190 (the X-axis direction) is so adjusted as to coincide with the directions of the optical axes X0 of the above-described some optical systems (the X-axis direction).

The control section 10 is a section (an autopower controller) controlling amounts of outgoing light in the red laser 11R, the green laser 11G, and the blue laser 11B based on the light amount of the light flux received by the light-receiving device 19 (the received light amount). More specifically, the control section 10 performs control on the amounts of outgoing light in the red laser 11R, the green laser 11G, and the blue laser 11B to keep the amounts of outgoing light substantially uniform (preferably uniform). At this time, more specifically, for example, the control section 10 feeds a detected light amount back to each of the red laser 11R, the green laser 11G, and the blue laser 11B, and performs I-V (current-voltage) conversion, and then controls a voltage of each laser light source.

(Illumination Device 1I)

As with the above-described illumination device 1H, the illumination device 1I also has a configuration similar to that of the illumination device 1, except that directions of optical axes of some optical systems are changed (rotated by 90°), and the partially transmissive mirror 18, the light-receiving device 19, and the control section 10 are further included.

However, in the light-receiving device 19 in the illumination device 1I, unlike the light-receiving device 19 in the illumination device 1H, the normal to the light-receiving surface 190 is inclined with respect to the optical axis X0. In other words, the direction of the normal to the light-receiving surface 190 is so set as to be different from the direction of the optical axis X0 (X-axis direction) in the above-described some optical systems. More specifically, in an example illustrated in FIG. 36, the light-receiving surface 190 is so set as to be substantially parallel to a reflective surface (a partially transmissive surface) of the partially transmissive mirror 18.

[Functions and Effects of Display Units 3H and 3I]

Also in the display units 3H and 3I (the illumination devices 1H and 1I) according to the embodiment, basically, effects similar to those of the display unit 3 (the illumination device 1) are obtainable by functions similar to those of the display unit 3 (the illumination device 1). In other words, production of interference fringes and speckle noise is allowed to be reduced.

Moreover, in these illumination devices 1H and 1I, laser light (transmitted light Lt) which is emitted from the red laser 11R, the green laser 11G, and the blue laser 11B and then partially passes through the partially transmissive mirror 18 is received by the light-receiving device 19. Then, the control section 10 controls the amounts of outgoing light in the red laser 11R, the green laser 11G, and the blue laser 11B based on the light amount of the transmitted light Lt received (the received light amount). More specifically, the control section 10 performs control on the amounts of outgoing light in the red laser 11R, the green laser 11G, and the blue laser 11B to keep the amounts of outgoing light substantially uniform (preferably uniform). Thus, emission operations in the red laser 11R, the green laser 11G, and the blue laser 11B are stabilized, and as a result, color reproducibility when displaying an image is improved, and color unevenness or flicker is reduced to improve display image quality.

In the case where respective laser light (red laser light, green laser light, and blue laser light) is sequentially emitted in a time-divisional manner (in the case of a time-divisional illumination method), it is not necessary to provide a light-receiving device for each color, and, as with the embodiment, it is only necessary to provide one light-receiving device (the light-receiving device 19). However, instead of this, it is necessary to align axes of incident light fluxes of each color. In a configuration in related art, it is necessary to severely (with high accuracy) adjust optical path synthesis and optical axis synthesis between light sources.

In the embodiment, the light-receiving device 19 is disposed on an optical path in a stage following the fly-eye lens 151, that is, at a position exhibiting a light amount distribution substantially uniformized by the fly-eye lens 151. Therefore, the above-described highly accurate optical axis adjustment or the like is not necessary, and variations in the received light amount in the light-receiving device 19 are suppressed. As a result, emission operations in the respective laser light sources are further stabilized, and display image quality is further improved. This point will be described in detail below in comparison with a comparative example.

Comparative Example 3

Figure 37:
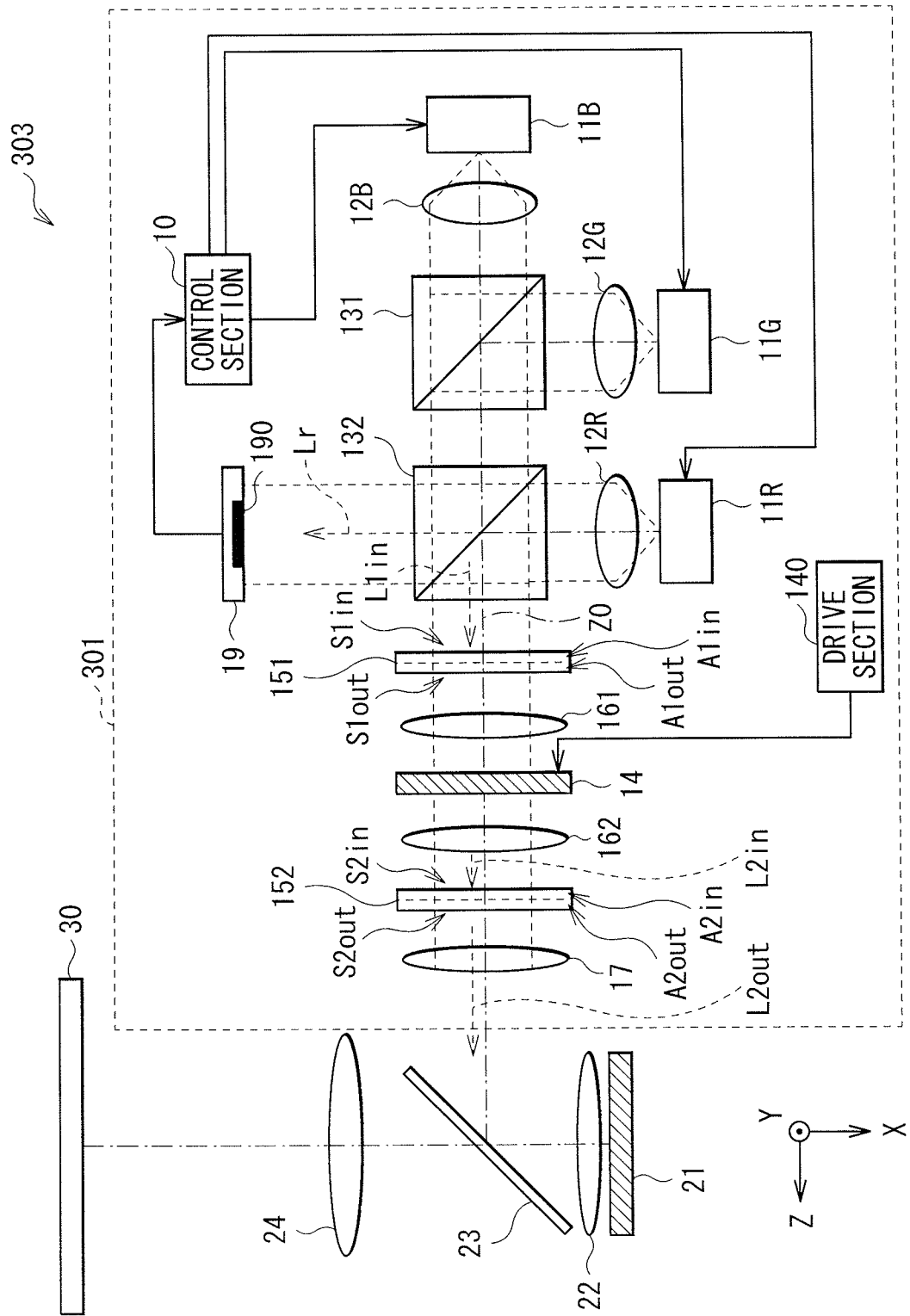
FIG. 37 is a schematic view illustrating an entire configuration of a display unit according to Comparative Example 3 with respect to the fifth embodiment.

FIG. 37 schematically illustrates a configuration of a display unit (a display unit 303) according to a comparative example (Comparative Example 3) with respect to the embodiment. The display unit 303 has a configuration similar to that of the display unit 3 illustrated in FIG. 1, except that an illumination device 301 which will be described below is included instead of the illumination device 1.

The illumination device 301 has a configuration similar to that of the illumination device 1 illustrated in FIG. 1, except that as with the illumination devices 1H and 1I in the embodiment, the light-receiving device 19 and the control section 10 are further included. However, in the illumination device 301, unlike the illumination devices 1H and 1I, the light-receiving device 19 is disposed on an optical path in a stage preceding the fly-eye lens 151 (more specifically, in this example, on an optical path of the reflected light Lr reflected by the dichroic prism 132).

Figure 38:
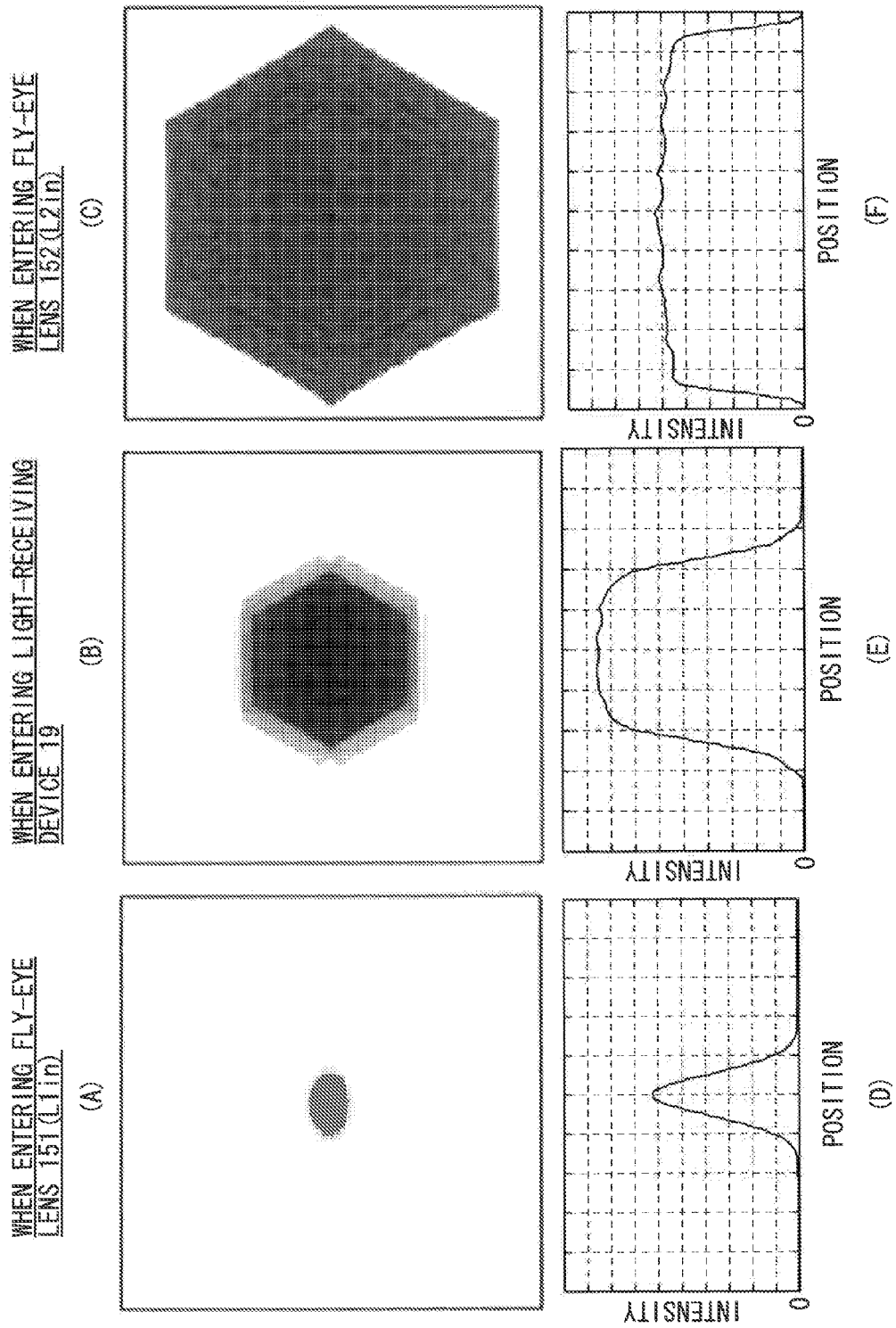
FIG. 38 is a diagram illustrating a light amount distribution example for describing a function in the fifth embodiment.

FIG. 38 illustrates an example of a light amount distribution of a light flux at each position on the optical path in each of the illumination devices 1H and 1I. More specifically, parts (A) and (D) in FIG. 38 illustrate a light amount distribution example of a light flux when the light flux enters the fly-eye lens 151 (the incident light L1in), parts (B) and (E) in FIG. 38 illustrate a light amount distribution example of the light flux when the light flux enters the light-receiving device 19, and parts (C) and (F) in FIG. 38 illustrate a light amount distribution example of the light flux when the light flux enters the fly-eye lens 152 (the incident light L2 in). Moreover, each of the parts (A) to (C) in FIG. 38 illustrates a two-dimensional light amount distribution on a section of the light flux, and the parts (D) to (F) in FIG. 38 illustrate light amount distributions along a one-dimensional direction (in this case, the horizontal direction) passing through centers of the light amount distributions in each of the parts (A) to (C) in FIG. 38, respectively.

In the illumination device 301 according to the above-described Comparative Example 3, the light-receiving device 19 is disposed on the optical path in the stage preceding the fly-eye lens 151. Therefore, for example, a light amount distribution of the light flux received by the light-receiving device 19 is similar to a light amount distribution when laser light is emitted, that is, a Gaussian distribution as illustrated in the parts (A) and (D) in FIG. 38. In other words, in Comparative Example 3, the received light amount distribution in the light-receiving device 19 is nonuniform.

Present Embodiment

On the other hand, in the illumination devices 1H and 1I according to the present embodiment, the light-receiving device 19 is disposed in an optical path in the stage following the fly-eye lens 151. In other words, after the light amount distribution is substantially uniformized in the fly-eye lens 151, a light reception operation is performed in the light-receiving device 19. Therefore, for example, as illustrated in an example in the parts (B) and (E) in FIG. 38 or the parts (C) and (F) in FIG. 38 (examples in FIGS. 35 and 36 correspond to the parts (B) and (E) in FIG. 38), the light amount distribution of the light flux received by the light-receiving device 19 (the received light amount distribution) is substantially uniform, unlike the above-described Comparative Example 3.

It is to be noted that, in examples in FIG. 38, the unit cells in the fly-eye lens 151 each have a regular hexagonal shape. Typically, in the case where the unit cells in the fly-eye lens is closely arranged, as the shape of each unit cell, three patterns including a triangular shape, a rectangular shape, and a hexagonal shape are used, and in this case, the unit cells each have a regular hexagonal shape, because a light flux shape of the incident light L2in onto the fly-eye lens 152 disposed in the following stage is made as close to a circular shape as possible. Therefore, in a stage in the part (A) in FIG. 38, the light amount distribution has a circular shape; however, as illustrated in the parts (B) and (C) in FIG. 38, the light amount distribution is gradually changed into a regular hexagonal light amount distribution while light propagates along the optical path through the fly-eye lens 151.

Thus, in the embodiment, the light-receiving device 19 is disposed on the optical path in the stage following the fly-eye lens 151; therefore, influences of various disturbances which will be described later are suppressed, and highly accurate optical axis adjustment or the like is not necessary. Accordingly, variations in the received light amount in the light-receiving device 19 are suppressed, and the emission operations in the respective laser light sources are further stabilized, and display image quality is further improvable. More specifically, variations in the light amount of illumination light emitted from the illumination device 1H or 1I are allowed to be reduced, and variations in a mixture ratio of laser light of respective colors are suppressed to allow desired color balance (white balance) to be maintained. Moreover, since the above-described highly accurate optical axis adjustment is not necessary, it is possible to remarkably improve an optical axis adjustment operation in product design.

Moreover, since the light-receiving device 19 is disposed on the optical path between the fly-eye lens 151 and the fly-eye lens 152 (between the fly-eye lens 151 and the optical device 14), the light reception operation in the light-receiving device 19 is allowed to be performed without being affected by variations in the light amount distribution due to microvibration of the optical device 14. Therefore, compared to the case where the light-receiving device 19 is disposed on the optical path in the stage following the optical device 14, variations in the received light amount are further suppressed, and a further improvement in display image quality is achievable.

It is to be noted that such effects in the embodiment lead to a great advantage in the case where, as with the embodiment, a laser is used as a light source. In other words, first, in the case where an optical system as a projector is downsized, using the laser as the light source brings a great advantage. More specifically, since the laser has high directivity, beams of light are collimated into parallel beams by a collimator lens to allow the light to efficiently propagate through a small space. On the other hand, in the case where an LED is used as the light source, the LED is a surface-emitting light source, and has high diffusivity; therefore, it is difficult to narrow light. On the contrary, in terms of detection of a light amount, in the case where light is spread disturbances when a part of a light flux is monitored are less affected (variations in the received light amount are small). Thus, it can be said that since the light flux is narrowed with use of the laser light source, it becomes difficult to detect the light amount; therefore, in the embodiment, both downsizing of the optical system and suppression of variations in the received light amount are achievable through contriving a position where the light amount detection is performed (a position where the light-receiving device 19 is arranged).

Moreover, specifically in the illumination device 1I, the normal to the light-receiving surface 190 in the light-receiving device 19 is inclined with respect to the optical axis X0; therefore, the received light amount is allowed to be reduced according to the magnitude of an inclination angle of the normal to the light-receiving surface 190, and a dynamic range in the received light amount is adjustable.

EXAMPLES

Examples (Examples 1 and 2) of the fifth embodiment will be described in detail below in comparison with the above-described Comparative Example 3. It is to be noted that Example 1 which will be described below corresponds to an example of the configuration of the illumination device 1I (the display unit 3I) illustrated in FIG. 36, and Example 2 corresponds to an example of the configuration of the illumination device 1H (the display unit 3H) illustrated in FIG. 35.

Figure 40A:
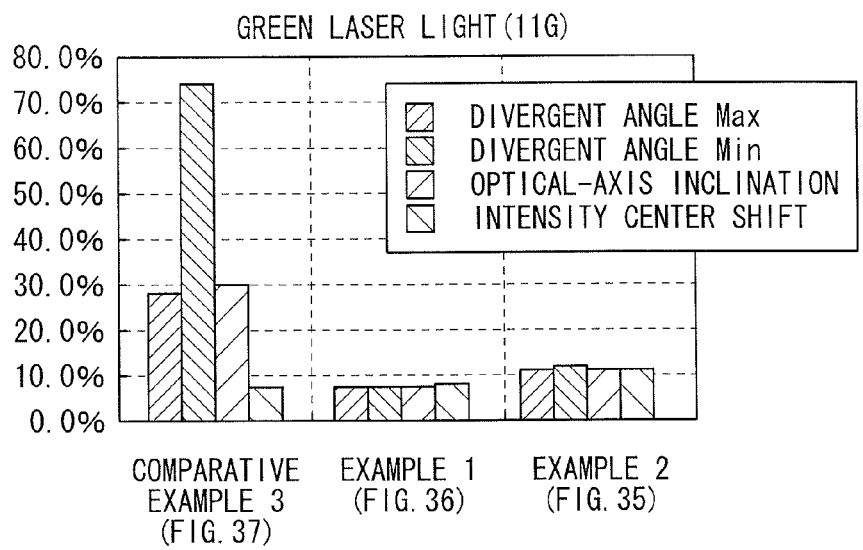
FIGS. 40A and 40B are plots of the examples of the received light amounts illustrated in FIG. 39.
Figure 40B:
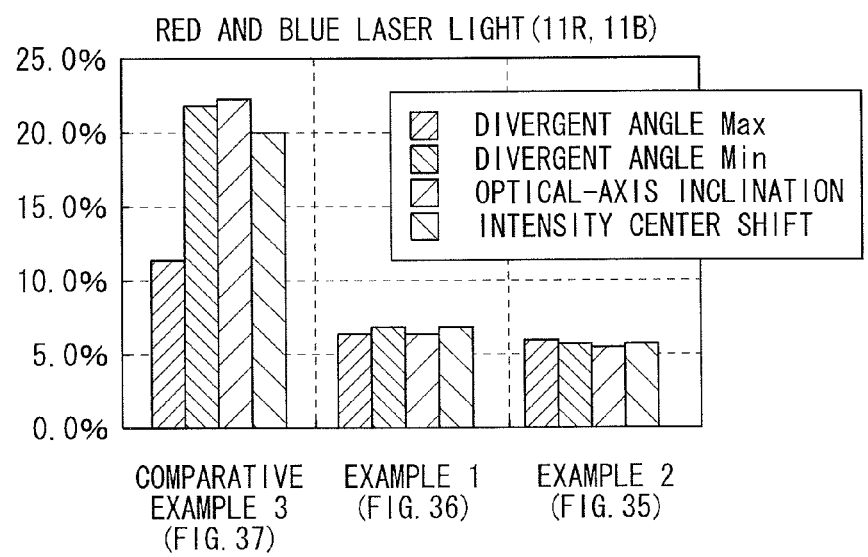
Figure 42:
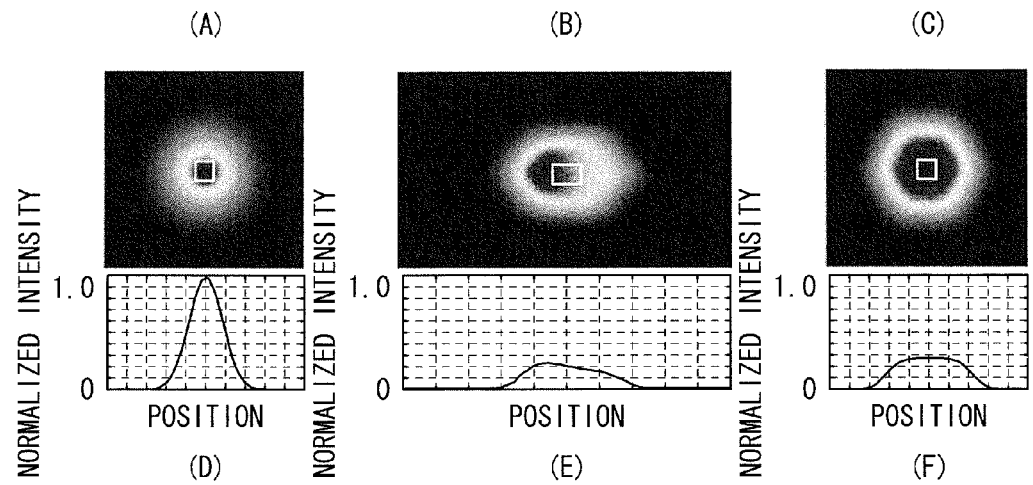
FIG. 42 is a diagram illustrating examples of received light amount distributions in Examples 1 and 2 and Comparative Example 3.
Figure 43:
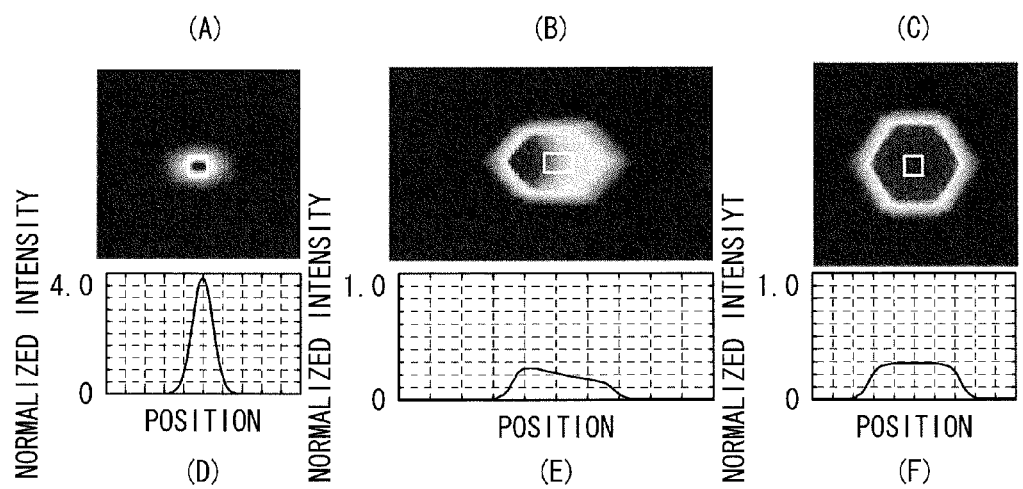
FIG. 43 is a diagram illustrating other examples of the received light amount distributions of Examples 1 and 2 and Comparative Example 3.
Figure 46:
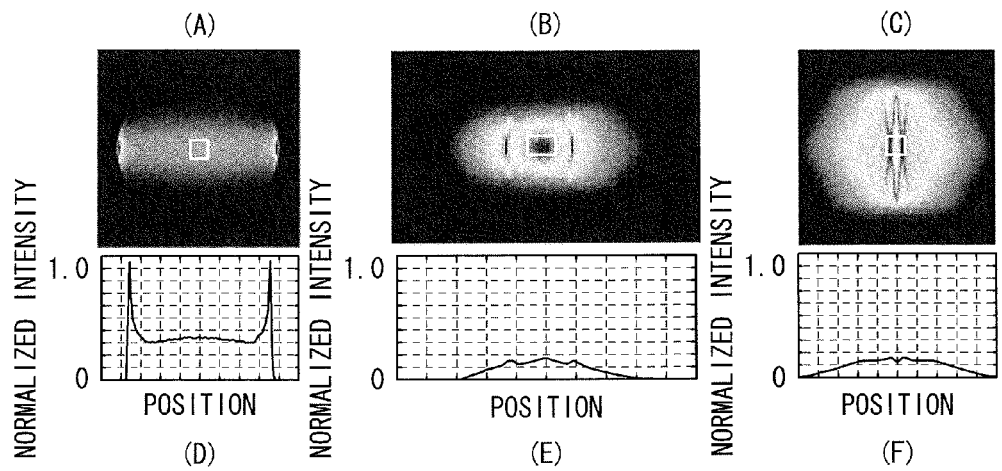
FIG. 46 is a diagram illustrating still further examples of the received light amount distributions of Examples 1 and 2 and Comparative Example 3.
Figure 47:
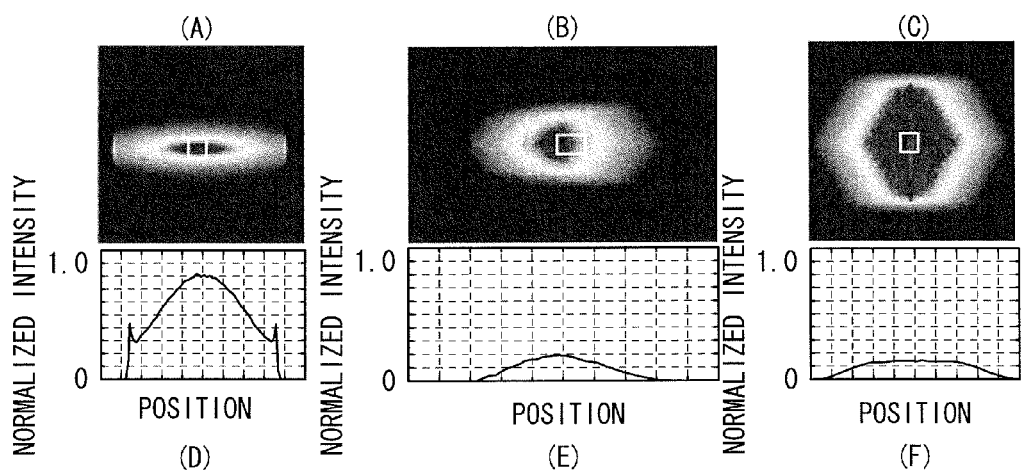
FIG. 47 is a diagram illustrating still examples of the received light amount distributions of Examples 1 and 2 and Comparative Example 3.
Figure 48:
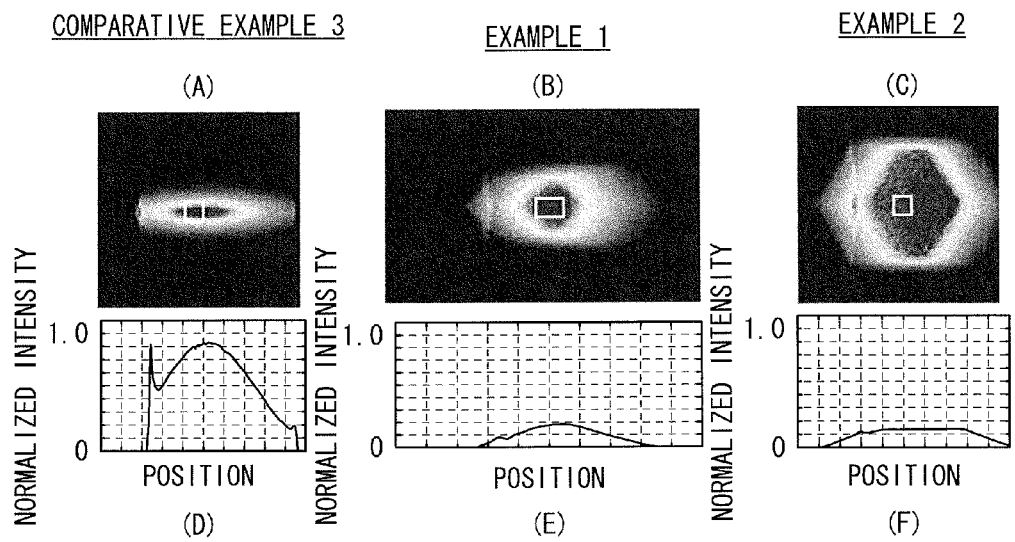
FIG. 48 is a diagram illustrating still examples of the received light amount distributions of Examples 1 and 2 and Comparative Example 3.
Figure 49:
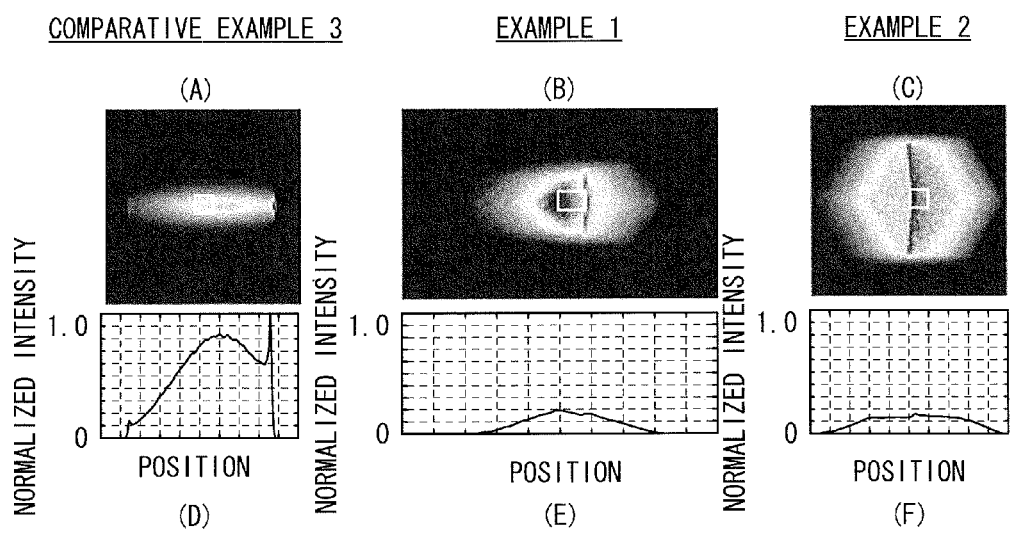
FIG. 49 is a diagram illustrating still examples of the received light amount distributions of Examples 1 and 2 and Comparative Example 3.

FIG. 39 illustrates, in tabular form, examples of the received light amounts when various optical parameters varied in Examples 1 and 2 and Comparative Example 3, and FIGS. 40A and 40B illustrate plots of the examples of the received light amounts illustrated in FIG. 39. FIG. 40A illustrates a result in the case of green laser light (the green laser 11G), and FIG. 40B illustrates a result in the case of red and blue laser light (the red laser 11R and the blue laser 11B). It is to be noted that FIGS. 39, 40A, and 40B illustrate the received light amounts with reference to a light amount at the time of light emission from the laser light source (regarded as 100%).

Moreover, FIG. 41 illustrates, in tabular form, setting conditions of optical parameters in respective examples (respective specific examples in Examples 1 and 2 and Comparative Example 3) and the like. FIGS. 42 to 49 illustrate examples of the received light amount distributions in the respective specific examples illustrated in FIG. 41. It is to be noted that, in FIGS. 42 and 49, parts (A) and (D) correspond to Comparative Example 3, parts (B) and (E) correspond to Example 1, and parts (C) and (F) correspond to Example 2. Moreover, in FIGS. 42 to 49, the parts (A) to (C) each illustrate a two-dimensional light amount distribution on a section of a light flux, and the parts (D) and (F) illustrate light amount distributions along a one-dimensional direction (in this case, the horizontal direction) passing through centers of the light amount distributions in the parts (A) to (C), respectively. It is to be noted that, in FIGS. 42 to 49, a white frame illustrated in each of the parts (A) to (C) represents an effective light-receiving surface (an effective region of the light-receiving surface 190; for example, about 0.5 mm×0.5 mm) in the light-receiving device 19.

In this case, specific conditions (calculation conditions in simulation) in Examples 1 and 2 and Comparative Example 3 are as follows. It is to be noted that "Max" and "Min" in a divergent angle mean a state where the divergent angle had a maximum value and a state where the divergent angle had a minimum value, respectively. Moreover, "optical-axis inclination" means an angle of inclination of a light flux caused by shift or the like of the laser, the optical system, or the light-receiving device 19 by external impact, and in this case, the "optical-axis inclination" represents an inclination angle of a light flux after coupling caused by shift in an in-plane direction of an emission surface of the laser. Further, "intensity center shift" means a shift amount of a peak position in a light amount distribution (a Gaussian distribution) of laser light, and in this case, the "intensity center shift" represents an inclination angle in a rotational direction with respect to an optical axis of the laser. Variations in the divergent angle, the optical-axis inclination, and the intensity center shift are caused by variations in the received light amount.

(Green laser 11G)
Kind of laser: SHG (Second Harmonic Generation) laser
Divergent angle Min of laser: 20 mrad (horizontal direction), 10 mrad (vertical direction)
Divergent angle Max of laser: 25 mrad (horizontal direction), 30 mrad (vertical direction)
Use of a coupling lens 12G with a focal length of 50 mm
Optical-axis inclination: 3.5°
Intensity central shift: 2°
(Red laser 11R and blue laser 11B)
Kind of laser: Can package laser
Divergent angle Min of laser: 25° (horizontal direction), 5° (vertical direction)
Divergent angle Max of laser: 40° (horizontal direction), 10° (vertical direction)

Use of coupling lenses 12R and 12G with a focal length of 3 mm
Optical-axis inclination: 3.5°
Intensity central shift: 5°
(Others)
Use of the fly-eye lens 151 with a focal length of 1.5 mm
Examples 1 and 2: Receiving light at a position located at a distance of 10 mm from the fly-eye lens 151
Example 1: Inclination angle of the normal to the light-receiving surface 190 with respect to the optical axis X0=45°
Divergent angle of laser: a divergent angle of a typical laser diode is assumed
Optical-axis inclination and intensity center shift: a shift amount in the case where the lasers are mounted with mechanical accuracy without adjusting the lasers, or a shift amount by an external factor The following can be said from Examples 1 and 2 and Comparative Example 3 illustrated in FIGS. 39 to 49 (specifically, FIGS. 39 and 40). Compared to Comparative Example 3, in Examples 1 and 2, it was clear that the light amount was stably detectable (variations in the received light amount were suppressed). More specifically, in Comparative Example 3, variations in the received light amount by a difference between the divergent angles of the lasers, the optical-axis inclination, an intensity center shift, or the like were extremely large. For example, in Comparative Example 3 in the part (A) in FIG. 40, the received light amount was varied from 8% to 74%, that is, was increased by about 9 times. Accordingly, in Comparative Example 3, the above-described highly accurate optical axis adjustment or the like was necessary. On the other hand, in Examples 1 and 2, although such highly accurate optical axis adjustment or the like was not performed, the received light amount hardly varied; therefore, it was clear that such adjustment was not necessary. Therefore, since highly accurate optical axis adjustment was not necessary in Examples 1 and 2, it was possible to remarkably improve the optical axis adjustment operation in product design.

Moreover, it was clear from these results that, when shift sensitivity was high (the received light amount largely varied by a small shift) in addition to whether adjustment was necessary or not, an issue might arise even after adjustment. In other words, as with Comparative Example 3, when the received light amount in the light-receiving device 19 was largely varied in spite of a uniform outgoing light amount of the laser, a system for maintaining the outgoing light amount uniform by APC (Auto Power Control; closed-loop process) might be broken. As a result, it was difficult to appropriately monitor the light amount, thereby leading to degradation in brightness or color balance. On the other hand, in Examples 1 and 2, variations in the light amount in illumination light was allowed to be reduced (brightness was allowed to be maintained substantially uniform), and desired color balance was allowed to be maintained.

(Other Modifications)

Although the technology of the present disclosure is described referring to the embodiment and the modification, the technology is not limited thereto, and may be variously modified.

For example, in the fourth embodiment and the modifications thereof (Modifications 6 to 8), a case where each of the exit-side unit cells C2out (second unit cells) in the fly-eye lens disposed in the following stage has a rhombic shape, a cross shape, or a hexagonal shape is described; however, the shape of each of the second unit cells is not limited thereto. The second unit cells each may have any other shape, as long as the second unit cells each have a shape extending along both the X-axis direction and the Y-axis direction (a substantially isotropic (preferably isotropic) shape along the X-axis direction and the Y-axis direction, compared to the incident-side unit cells C2in (first unit cells)).

Moreover, in the above-described embodiments and the like, a case where the "first and second uniformization optical members" in the disclosure is configured of the fly-eye lenses is described as an example; however, the uniformization optical members each may be configured of any other optical member (for example, a rod integrator).

Further, a case where the optical devices 14, 14A, and 14B described in the above-described embodiments and the like each have a corrugated configuration or an inclined-surface configuration on the light-exit surface thereof is described; however, the optical device is not limited thereto. For example, the optical device may have a corrugated configuration or an inclined-surface configuration formed on the light-incident surface thereof or on both the light-incident surface and the light-exit surface thereof.

In the above-described embodiments and the like, a case where a "first direction" and a "second direction" in the present disclosure are orthogonal to each other (a case where the horizontal direction (the X-axis direction) and the vertical direction (the Y-axis direction) are used) is described as an example; however, the technology is not limited thereto. The "first direction" and the "second direction" may not be orthogonal to each other.

In the above-described embodiments and the like, a case where a plurality of kinds (red, green, and blue) of light sources are all laser light sources is described; however, the technology is not limited thereto, and one or more of the plurality of kinds of light sources may be laser light sources. In other words, a combination of a laser light source and any other light source (for example, an LED) may be included in the light source section.

In the above-described embodiments and the like, a case where the light modulation device is the reflective liquid crystal device is described as an example; however, the technology is not limited thereto. Alternatively, the light modulation device may be, for example, a transmissive liquid crystal device, or a light modulation device other than the liquid crystal devices (for example, a DMD (Digital Micromirror Device).

In the above-described embodiments and the like, a case where three kinds of light sources emitting light of different wavelengths are used is described; however, for example, one kind, two kinds, or four or more kinds of light sources may be used, instead of the three kinds of light sources.

In the above-described embodiments and the like, respective components (optical systems) of the illumination device and the display unit are specifically described; however, it is not necessary to include all of the components, or other components may be further included. More specifically, for example, dichroic mirrors may be included, instead of the dichroic prisms 131 and 132.

In the above-described embodiments and the like, the projection display unit configured through including the projection optical system (the projection lens) which projects, onto the screen, light modulated by the light modulation device is described; however, the technology is also applicable to a direct-view display unit and the like.

It is to be noted that the technology may have the following confirmations.

(1) An illumination device including:
a light source section including a laser light source;
a first uniformization optical member receiving light from the light source section;
a second uniformization optical member receiving light from the first uniformization optical member;
an optical device disposed on an optical path of outgoing light from the light source section; and
a drive section vibrating the optical device.

(2) The illumination device according to (1), in which the optical device has a first optical surface emitting laser light incident thereon while converging the laser light and a second optical surface emitting laser light incident thereon while diverging the laser light.

(3) The illumination device according to (2), in which
each of the first and second uniformization optical members includes a plurality of unit cells which are two-dimensionally arranged, and
extending directions of the first optical surface and the second optical surface and an arrangement direction of the unit cells are inclined with respect to each other.

(4) The illumination device according to (2) or (3), in which the first optical surface is a convex-curved surface, and the second optical surface is a concave-curved surface.

(5) The illumination device according to any one of (2) to (4), in which a pitch of the first optical surface and a pitch of the second optical surface are different from each other.

(6) The illumination device according to any one of (1) to (5), in which the optical device is disposed on an optical path between the first uniformization optical member and the second uniformization optical member.

(7) The illumination device according to (6), in which
the second uniformization optical member includes a plurality of unit cells which are two-dimensionally arranged, and
an expression [1] is satisfied:

$$\{6\times f\times\tan(\theta f)\} > Pf \qquad [1]$$

where f is a focal length of the unit cell in the second uniformization optical member, Pf is a pitch of the unit cell in the second uniformization optical member, θf is a marginal ray angle in a light flux emitted from the optical device to enter the second uniformization optical member.

(8) The illumination device according to (7), in which
each of the unit cells in the second uniformization optical member has an anisotropic shape with a major-axis direction and a minor-axis direction, and
the expression [1] is satisfied for both the major-axis direction and the minor-axis direction.

(9) The illumination device according to (8), in which
the optical device has a first optical surface emitting laser light incident thereon while converging the laser light and a second optical surface emitting laser light incident thereon while diverging the laser light,
extending directions of the first optical surface and the second optical surface and an arrangement direction of the unit cells are inclined with respect to each other at an inclination angle α, and
an expression [2] and an expression [3] are further satisfied, where a pitch along the major-axis direction of the unit cell in the second uniformization optical member is the Pf, and an aspect ratio in the unit cell in the second uniformization optical member is X:Y (X>Y):

$$\{6\times f\times\tan(\theta f\times\sin\alpha)\} > Pf \qquad [2], \text{ and}$$

$$\{6\times f\times\tan(\theta f\times\cos\alpha)\} > \{(Y/X)\times Pf\} \qquad [3].$$

(10) The illumination device according to (9), in which an expression [4] is further satisfied:

$$\{f\times\tan(\theta f\times\cos\alpha)\} < \{(\tfrac{1}{2})\times(Y/X)\times Pf\} \qquad [4].$$

(11) The illumination device according to any one of (6) to (10), in which
a pair of lenses having positive power are disposed on an optical path between the first uniformization optical member and the second uniformization optical member, and the optical device is disposed on an optical path between the pair of lenses.

(12) The illumination device according to any one of (1) to (5), in which the optical device is disposed on an optical path on a light-incident side of the first uniformization optical member or on an optical path on a light-exit side of the second uniformization optical member.

(13) The illumination device according to any one of (1) to (12), in which
the second uniformization optical member separately includes a plurality of first unit cells arranged on a light-incident surface thereof and a plurality of second unit cells arranged on a light-exit surface thereof,
each of the first unit cells has an anisotropic shape with a major-axis direction along a first direction and a minor-axis direction along a second direction, and
each of the second unit cells has a shape extending along both the first direction and the second direction.

(14) The illumination device according to (13), in which each of the second unit cells has a substantially isotropic shape along the first direction and the second direction, compared to the first unit cells.

(15) The illumination device according to (13) or (14), in which
the plurality of first unit cells are two-dimensionally arranged without space on the light-incident surface, and
the plurality of second unit cells are two-dimensionally arranged without space on the light-exit surface.

(16) The illumination device according to (15), in which adjacent rows of the first unit cells in the second uniformization optical member are shifted from each other along the first direction or the second direction on the light-incident surface of the second uniformization optical member.

(17) The illumination device according to (15) or (16), in which each of the first unit cells and each of the second unit cells facing each other are so arranged as to allow a central point of the first unit cell and a central point of the second unit cell to substantially coincide with each other.

(18) The illumination device according to any one of (13) to (17), in which the first uniformization optical member includes a plurality of common unit cells which are provided in common on a light-incident surface and a light-exit surface of the first uniformization optical member.

(19) The illumination device according to any one of (1) to (18), further including:
a light-receiving device disposed on an optical path in a stage following the first uniformization optical member; and
a control section controlling an outgoing light amount in the laser light source based on a light amount of a light flux received by the light-receiving device.

(20) The illumination device according to (19), in which the light-receiving device is disposed on an optical path between the first uniformization optical member and the second uniformization optical member.

(21) The illumination device according to (20), in which the light-receiving device is disposed in a stage preceding the optical device.

(22) A display unit including:
an illumination device emitting illumination light; and
a light modulation device modulating the illumination light, based on an image signal,
in which the illumination device includes
a light source section including a laser light source,
a first uniformization optical member receiving light from the light source section,
a second uniformization optical member receiving light from the first uniformization optical member,
an optical device disposed on an optical path of outgoing light from the light source section, and
a drive section vibrating the optical device.

(23) The display unit according to (22), further including a projection optical system projecting the illumination light modulated by the light modulation device onto a projection surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination device comprising:
a light source section including a laser light source;
a first uniformization optical member receiving light from the light source section;
a second uniformization optical member receiving light from the first uniformization optical member;
an optical device disposed on an optical path of outgoing light from the light source section; and
a drive section vibrating the optical device;
wherein the optical device is disposed on an optical path between the first uniformization optical member and the second uniformization optical member; and
wherein the second uniformization optical member includes a plurality of unit cells which are two-dimensionally arranged, and
an expression (1) is satisfied:

$$\{6 \times f \times \tan(\theta f)\} > Pf \tag{1}$$

where f is a focal length of the unit cell in the second uniformization optical member, $Pf$ is a pitch of the unit cell in the second uniformization optical member, $\theta f$ is a marginal ray angle in a light flux emitted from the optical device to enter the second uniformization optical member.

2. The illumination device according to claim 1, wherein the optical device has a first optical surface emitting laser light incident thereon while converging the laser light and a second optical surface emitting laser light incident thereon while diverging the laser light.

3. The illumination device according to claim 2, wherein each of the first and second uniformization optical members includes a plurality of unit cells which are two-dimensionally arranged, and
extending directions of the first optical surface and the second optical surface and an arrangement direction of the unit cells are inclined with respect to each other.

4. The illumination device according to claim 2, wherein the first optical surface is a convex-curved surface, and the second optical surface is a concave-curved surface.

5. The illumination device according to claim 2, wherein a pitch of the first optical surface and a pitch of the second optical surface are different from each other.

6. The illumination device according to claim 1, wherein each of the unit cells in the second uniformization optical member has an anisotropic shape with a major-axis direction and a minor-axis direction, and
the expression (1) is satisfied for both the major-axis direction and the minor-axis direction.

7. The illumination device according to claim 6, wherein the optical device has a first optical surface emitting laser light incident thereon while converging the laser light and a second optical surface emitting laser light incident thereon while diverging the laser light, extending directions of the first optical surface and the second optical surface and an arrangement direction of the unit cells are inclined with respect to each other at an inclination angle α, and an expression (2) and an expression (3) are further satisfied, where a pitch along the major-axis direction of the unit cell in the second uniformization optical member is the Pf, and an aspect ratio in the unit cell in the second uniformization optical member is X:Y (X>Y):

$$\{6 \times f \times \tan(\theta f \times \sin \alpha)\} > Pf \quad (2), \text{ and}$$

$$\{6 \times f \times \tan(\theta f \times \cos \alpha)\} > \{(Y/X) \times Pf\} \quad (3).$$

8. The illumination device according to claim 7, wherein an expression (4) is further satisfied:

$$\{f \times \tan(\theta f \times \cos \alpha)\} < \{(\tfrac{1}{2}) \times (Y/X) \times Pf\} \quad (4).$$

9. The illumination device according to claim 1, wherein
a pair of lenses having positive power are disposed on an optical path between the first uniformization optical member and the second uniformization optical member, and the optical device is disposed on an optical path between the pair of lenses.

10. The illumination device according to claim 1, wherein the optical device is disposed on an optical path on a light-incident side of the first uniformization optical member or on an optical path on a light-exit side of the second uniformization optical member.

11. A display unit comprising the illumination device according to claim 1, the illumination device emitting illumination light, and a light modulation device modulating the illumination light, based on an image signal.

12. The display unit according to claim 11, further comprising a projection optical system projecting the illumination light modulated by the light modulation device onto a projection surface.

13. An illumination device comprising:
a light source section including a laser light source;
a first uniformization optical member receiving light from the light source section;
a second uniformization optical member receiving light from the first uniformization optical member;
an optical device disposed on an optical path of outgoing light from the light source section; and
a drive section vibrating the optical device, wherein
the second uniformization optical member separately includes a plurality of first unit cells arranged on a light-incident surface thereof and a plurality of second unit cells arranged on a light-exit surface thereof,
each of the first unit cells has an anisotropic shape with a major-axis direction along a first direction and a minor-axis direction along a second direction, and
each of the second unit cells has a shape extending along both the first direction and the second direction.

14. The illumination device according to claim 13, wherein each of the second unit cells has a substantially isotropic shape along the first direction and the second direction, compared to the first unit cells.

15. The illumination device according to claim 13, wherein
the plurality of first unit cells are two-dimensionally arranged without space on the light-incident surface, and
the plurality of second unit cells are two-dimensionally arranged without space on the light-exit surface.

16. The illumination device according to claim 15, wherein adjacent rows of the first unit cells in the second uniformization optical member are shifted from each other along the first direction or the second direction on the light-incident surface of the second uniformization optical member.

17. The illumination device according to claim 15, wherein each of the first unit cells and each of the second unit cells facing each other are so arranged as to allow a central point of the first unit cell and a central point of the second unit cell to substantially coincide with each other.

18. The illumination device according to claim 13, wherein
the first uniformization optical member includes a plurality of common unit cells which are provided in common on a light-incident surface and a light-exit surface of the first uniformization optical member.

19. A display unit comprising the illumination device according to claim 13, the illumination device emitting illumination light, and a light modulation device modulating the illumination light, based on an image signal.

20. The display unit according to claim 19, further comprising a projection optical system projecting the illumination light modulated by the light modulation device onto a projection surface.

21. An illumination device comprising:
a light source section including a laser light source;
a first uniformization optical member receiving light from the light source section;
a second uniformization optical member receiving light from the first uniformization optical member;
an optical device disposed on an optical path of outgoing light from the light source section;
a drive section vibrating the optical device;
a light-receiving device disposed on an optical path in a stage following the first uniformization optical member; and
a control section controlling an outgoing light amount in the laser light source based on a light amount of a light flux received by the light-receiving device.

22. The illumination device according to claim 21, wherein the light-receiving device is disposed on an optical path between the first uniformization optical member and the second uniformization optical member.

23. The illumination device according to claim 22, wherein the light-receiving device is disposed in a stage preceding the optical device.

24. A display unit comprising the illumination device according to claim 21, the illumination device emitting illumination light, and a light modulation device modulating the illumination light, based on an image signal.

25. The display unit according to claim 24, further comprising a projection optical system projecting the illumination light modulated by the light modulation device onto a projection surface.

* * * * *